(12) United States Patent
Forney et al.

(10) Patent No.: US 8,667,017 B1
(45) Date of Patent: Mar. 4, 2014

(54) METHOD FOR PORTAL-BASED COLLABORATIVE PROCESS MANAGEMENT AND INFORMATION ACCESS

(75) Inventors: Paul W. Forney, Laguna Hills, CA (US); Warren T. Ratcliff, Jr., Parrish, FL (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 13/037,221

(22) Filed: Feb. 28, 2011

Related U.S. Application Data

(63) Continuation of application No. 11/338,873, filed on Jan. 23, 2006, now abandoned.

(60) Provisional application No. 60/646,004, filed on Jan. 21, 2005.

(51) Int. Cl.
*G06F 7/00* (2006.01)
*G06F 17/30* (2006.01)

(52) U.S. Cl.
USPC .......................................... 707/782; 707/785

(58) Field of Classification Search
USPC .......... 707/634, 782, 785; 715/771, 808, 831; 345/582
See application file for complete search history.

(56) References Cited

U.S. PATENT DOCUMENTS

| | | | |
|---|---|---|---|
| 5,812,394 A * | 9/1998 | Lewis et al. ..................... | 700/17 |
| 6,145,088 A * | 11/2000 | Stevens ............................ | 714/2 |
| 7,987,228 B2 * | 7/2011 | McKeown et al. ............ | 709/202 |
| 2002/0067370 A1 * | 6/2002 | Forney et al. ................. | 345/742 |
| 2002/0069172 A1 * | 6/2002 | Omshehe et al. ............. | 705/51 |
| 2002/0198813 A1 * | 12/2002 | Patterson et al. .............. | 705/36 |
| 2006/0020626 A1 * | 1/2006 | Berwanger ................ | 707/104.1 |
| 2007/0204623 A1 * | 9/2007 | Rollins, III ..................... | 60/772 |
| 2008/0235055 A1 * | 9/2008 | Mattingly et al. ................ | 705/3 |

* cited by examiner

*Primary Examiner* — Jacob F Bétit
*Assistant Examiner* — Bao Tran
(74) *Attorney, Agent, or Firm* — Edward S. Jarmolowicz, Esq.

(57) ABSTRACT

A method for collaborative management of a process is disclosed herein. The method includes electronically creating a declaration document containing information relating to one or more characteristics of an equipment unit involved in effecting the process. The method further includes electronically creating, at least partially based upon the information contained within the declaration document, an instruction document prescribing changes in one or more operational parameters of the equipment unit. The declaration document may be created by an operator of the equipment unit and the instruction document may be created by a user entity having electronic access to the declaration document.

11 Claims, 81 Drawing Sheets

| OPERATION | Inst or Decl is not Current and not within Deadband period | ROLE | | REQUIRED OPERATION STATE | | | | | | REQUIRED DOCUMENT STATE | | | |
|---|---|---|---|---|---|---|---|---|---|---|---|---|---|
| | | Operator assigned to Unit | System Dispatcher | UnAck. | Ack. | Forced Accept Pending | Accepted / Accepted By Sender | Rejected | Aborted | Operation Pending | Accepted | Cancelled | Rejected |
| Create Instruction | n/a | | ✓ | Not applicable | | | | | | Not applicable | | | |
| Accept Instruction | | ✓ | | ✓ | | | | | | ✓ | | | |
| | | ✓ | ✓ | | ✓ | | | | | ✓ | | | |
| | | | ✓ | | | ✓ | | | | ✓ | | | |
| Reject Instruction | ✓ | ✓ | | ✓ | | | | | | ✓ | | | |
| | ✓ | ✓ | | | ✓ | | | | | ✓ | | | |
| Amend Instruction | ✓ | | ✓ | | | | ✓ | | | | ✓ | | |
| Cancel Instruction | ✓ | | ✓ | | | | ✓ | | | | ✓ | | |
| View Instruction | | ✓ | ✓ | Any operation state | | | | | | Any document state | | | |
| Create Declaration | n/a | ✓ | | Not applicable | | | | | | Not applicable | | | |
| Accept Declaration | | | ✓ | ✓ | | | | | | ✓ | | | |
| | | | ✓ | | ✓ | | | | | ✓ | | | |
| | | ✓ | | | | ✓ | | | | ✓ | | | |
| | | ✓ | | | | | | | | ✓ | | | |
| Reject Declaration | ✓ | | ✓ | ✓ | | | | | | ✓ | | | |
| Reject Declaration | ✓ | | ✓ | | ✓ | | | | | ✓ | | | |
| Amend Declaration | ✓ | ✓ | | | | | ✓ | | | | ✓ | | |
| Cancel Declaration | ✓ | ✓ | | | | | ✓ | | | | ✓ | | |
| View Declaration | | ✓ | ✓ | Any operation state | | | | | | Any document state | | | |

FIGURE 8

INSTRUCTIONS

| CATEGORY | DEFINING CRITERIA | DATA SOURCE | PERMITTED OPERATIONS |
|---|---|---|---|
| Unaccepted | Document State = OperationPending | DataStore (stored procedure) | Accept/Reject Instruction<br>• If user is the operator for this unit and current operation state IS NOT ForcedAcceptPending<br>• <OR> If user is dispatcher and current operation state IS ForcedAcceptPending<br>View Instruction<br>• If Accept/Reject is not permitted |
| Pending | The unit object determines if an instruction is pending or current and in the process may change the start time and start load to meet unit operating objectives. This determination cannot be made by the EDL SV Application. | Unit Object (via LMX) | Amend/Cancel Instruction<br>• If the user is a dispatcher <AND> StartTime IS NOT within activation deadband<br>View Instruction<br>• If Amend/Cancel is not permitted<br>Note: The Amend/Cancel page must be initialized from instruction returned by unit object |
| Current | The unit object determines if an instruction is pending or current. | Unit Object (via LMX) | View Instruction |
| Expired | Document State = Accepted AND EndTime < Now( ) | DataStore (stored procedure) | View Instruction |
| Declined | Document State = Cancelled OR Rejected | DataStore (stored procedure) | View Instruction |

DECLARATIONS

| CATEGORY | DEFINING CRITERIA | DATA SOURCE | PERMITTED OPERATIONS |
|---|---|---|---|
| Unaccepted | Document State = OperationPending | DataStore (stored procedure) | Accept/Reject Declaration<br>• If user is a dispatcher <AND> operation state IS NOT ForcedAcceptPending<br>• If user is operator for this unit <AND> the operation state IS ForcedAcceptPending<br>View Declaration<br>• If Accept/Reject is not permitted |
| Pending | The unit object determines if a declaration is pending or current. This determination cannot be made by the EDL SV Application. | Unit Object (via LMX) | Amend/Cancel Declaration<br>• If the user is operator for this unit <AND> StartTime IS NOT within activation deadband<br>View Declaration<br>• If Amend/Cancel is not permitted<br>Note: The Amend/Cancel page must be initialized from declaration returned by unit object |
| Current | The unit object determines if a declaration is pending or current. | Unit Object (via LMX) | View Declaration |
| Expired | Document State = Accepted <AND> EffectiveTime < EffectiveTime of the Current Declaration | DataStore (stored procedure) | View Declaration |
| Declined | Document State = Cancelled OR Rejected | DataStore (stored procedure) | View Declaration |

| Unit_001 DevSum | Most Recent | This Shift | Prev. Shift | Cur. Day |
|---|---|---|---|---|
| Deviation (MWh) | 0.28 | 5.19 | 22.73 | 27.91 |
| Cost of Deviation ($) | $5.51 | $65.41 | $384.02 | $469.43 |
| Transgression (MWh) | 0.16 | 2.70 | 12.22 | 15.01 |
| Cost of Transgression ($) | $3.16 | $46.07 | $206.58 | $252.95 |
| Excursion (MWh) | 0.42 | 7.07 | 34.96 | 42.02 |
| Cost of Excursion ($) | $9.98 | $131.30 | $590.59 | $721.92 |

METHOD FOR PORTAL-BASED COLLABORATIVE PROCESS MANAGEMENT AND INFORMATION ACCESS

CROSS-REFERENCE TO RELATED APPLICATIONS

This application is a Continuation of and claims priority to U.S. Utility patent application Ser. No. 11/338,873, entitled SYSTEM AND METHOD FOR PORTAL-BASED COLLABORATIVE PROCESS MANAGEMENT AND INFORMATION ACCESS, filed Jan. 23, 2006, which claims priority under 35 U.S.C. §119(e) to U.S. Provisional Patent Application Ser. No. 60/646,004, entitled SYSTEM AND METHOD FOR PORTAL-BASED COLLABORATIVE PROCESS MANAGEMENT AND INFORMATION ACCESS, filed Jan. 21, 2005. This application is related to copending application Ser. No. 09/955,473, entitled EXTENSIBLE MANUFACTURING/PROCESS CONTROL INFORMATION PORTAL SERVER, and to U.S. Utility patent application Ser. No. 10/964,825, now U.S. Pat. No. 7,171,316, entitled FLOW ASSURANCE MONITORING. The content of each of these applications is hereby incorporated by reference herein in its entirety for all purposes.

FIELD OF THE INVENTION

The present invention generally relates to the field of computerized manufacturing and process control networks and systems. More particularly, but not exclusively, the present invention relates to systems and methods for collaborative process management and information access using a portal-based system architecture.

BACKGROUND

Significant advances in industrial process control technology have vastly improved all aspects of factory and plant operation. Before the introduction of today's modern industrial process control systems, industrial processes were operated/controlled by humans and rudimentary mechanical controls. As a consequence, the complexity and degree of control over a process was limited by the speed with which one or more people could ascertain a present status of various process state variables, compare the current status to a desired operating level, calculate a corrective action (if needed), and implement a change to a control point to affect a change to a state variable.

Improvements to process control technology have enabled vastly larger and more complex industrial processes to be controlled via programmed control processors. Control processors execute control programs that read process status variables and execute control algorithms based upon the status variable data and desired set point information to render output values for the control points in industrial processes. Such control processors and programs support a substantially self-running industrial process (once set points are established).

Notwithstanding the ability of industrial processes to operate under the control of programmed process controllers at previously established set points without intervention, supervisory control and monitoring of control processors and their associated processes is desirable. Such oversight is provided by both humans and higher-level control programs at an application/human interface layer of a multilevel process control network. Such oversight is generally desired to verify proper execution of the controlled process under the lower-level process controllers and to configure the set points of the controlled process.

Various data input/output servers, including for example data access servers, facilitate placing process control data (both reading and writing) within reach of a variety of higher-level monitor/control client applications. During the course of operation, process controllers generate status and control information concerning associated processes. The controllers' process status and control information is stored within process control databases and/or distributed to a number of locations within the process control network. Other process information is generated/stored within field devices (e.g., intelligent transmitters) having digital data communication capabilities. The process information is retrieved from the process control databases and field devices by data access servers for further processing/use by the process control system. For example, the data access servers provide the retrieved information to a variety of client applications providing high-level control and monitoring (both human and computerized) services.

In systems containing data input/output servers, the high-level control and monitoring applications rely upon the proper operation of the servers to provide the data upon which such applications rely for decision making. The information includes real-time process variable values, alarms, etc. Data input/output servers are implemented in a number of forms. In some systems, a single data access server operates upon a single node on a computer network from which higher-level supervisory control is implemented. In other systems, multiple data access servers are located upon a local area network, and the multiple data access servers are accessed by supervisory-level applications running on other nodes on a local control network. In yet other systems, access to process control information/resources is achieved via temporary sessions established via a wide area network link. One particular example is data access provided via an Internet/intranet portal server.

A portal site is an Internet/intranet site that provides access to a variety of information from potentially many sources. Portal sites, referred to as vertical portals, are sometimes designed to provide access to a particular type of information. Portal servers handle user traffic at portal sites and provide user access over the Internet/intranet to the variety of data sources exposed by the portal site. Users generally access the portal site via remote computers executing general browser software such as the well known MICROSOFT INTERNET EXPLORER. Through the browsers the users access the data sources exposed by the portal site/server.

Portal servers provide a wide variety of services. One example of such a service is "content accessibility" that facilitates connectivity to information sources and content providers. Content includes: online documents, libraries, databases, and government information. Such content can be located over a wide geographic area, but is connected via a network structure (e.g., the Internet). Another example of a portal service is a search engine that enables users to locate particular information within a vast amount of available content. A portal server often maintains an index to enhance performance of searches. Another portal service is visualization of available services (e.g., displaying various features available to users). A second aspect of visualization is displaying documents and information retrieved at the request of a user. Yet another portal server function is providing access to users from many parts of the world via the World Wide Web. Such access includes both domestic and foreign users. A last example of a portal function is support for personalization. A portal is used by many different people for many purposes. Portal servers store user profile information to enhance user experiences.

An advantage of a portal server approach to accessing process control information/resources is the ability of users to gain access from virtually any location in the world. Such access enables specialists (both human and programmed) to obtain access to and provide supervisory services without having to be physically present on the manufacturing/industrial plant. Such accessibility can save an enterprise considerable time and costs and avoid travel delays. Wide area network access of the type supported by a portal server also enables centralized, coordinated and highly integrated control of an enterprise spread over a relatively wide geographic area. Notwithstanding the significant benefits of providing Web access to a process control network, significant challenges are faced with regard to connecting such systems to the manufacturing/process control systems with which they communicate, and there is a substantial cost in time and effort to link the various resources to manufacturing/process control information portal servers.

Yet another obstacle in the deployment and maintenance of manufacturing/process control information portal servers is the presence of a wide variety of information types. Installing a new portal server when a new data transmission protocol or format is needed can greatly disrupt operation of the manufacturing/process control system for which it provides its services.

Typical portal sites/servers are designed to provide virtually the same resources to a very large audience. In a process control environment, information sources and types are tailored to many different and significantly smaller groups of individuals. The various information types require different handlers. Even within an enterprise, persons having differing roles will have an interest in viewing data of differing types from differing sources.

A portal server unhindered by these types of limitations is disclosed in the first of the above-referenced copending patent applications. In particular, the application discloses a flexible manufacturing/process control information provider architecture. This flexibility is achieved through a user-configurable manufacturing/process control information portal server that comprises multiple selectable data types (handlers) and data sources that a particular selected data handler accommodates. A user configures the portal server to deliver manufacturing/process control information associated with a controlled process environment such as a food processing plant floor or an oil refinery reactor to the user via a browser client over the Internet or a corporate intranet.

Furthermore, the application describes an extensible architecture that enables adding new components to the portal server. Such extensions include new data sources, new data types, and new generic data handlers. The new architecture enables a user to select particular ones of the available data handlers and then their associated data sources thereby facilitating customizing the configuration of the portal server to the particular needs of the user.

Although this new architecture enables the presentation of individualized views to different users, it would be desirable to provide techniques capable of leveraging the architecture to facilitate various types of collaboration among such users. For example, in the electrical power generation industry it is necessary for communication to occur among various personnel in order to optimize the generation process. In this regard each generating unit within an electrical power plant is generally made up of a generator, a turbine (gas or steam) and a boiler for supplying steam to the steam turbine or making steam from the waste heat of a gas turbine. If any maintenance or operational issues exist which affect the performance of a generating unit, the operator of the unit will orally communicate those limitations to a dispatcher in the form of a declaration; that is, the unit operator declares the capabilities of the generating unit. The system dispatcher then attempts to generate an operating plan for loading each of the units throughout the day on the basis of these oral declarations. The loading plan is designed to service the load requirements in the relevant market in such a way that the power grid remains stable and applicable reserve requirements are met. The system dispatcher is also typically responsible for providing information to marketing personnel to facilitate the selling of power into the serviced and surrounding markets. Once the dispatcher has determined the appropriate loading levels, the relevant loading information is orally communicated to the generation unit operators as instructions.

Given the complexity of these typically telephonic conversations between operators, dispatchers and marketing personnel, there exists a substantial risk of misinterpreting and even missing relevant instructions. This mode of communication also limits the effectiveness of collaboration among operators and dispatchers since, for example, dispatchers are generally unaware of the extent to which operators have accepted and implemented instructions. Moreover, the lack of a mechanism for the systematic exchange of declarations and instructions and the capture of performance data precludes the efficient matching of power generation output to market-driven target performance levels.

SUMMARY

In one aspect, the present invention relates to a method for collaborative management of a process. The method includes electronically creating a declaration document containing information relating to one or more characteristics of an equipment unit involved in effecting the process. The method further includes electronically creating, at least partially based upon the information contained within the declaration document, an instruction document prescribing changes in one or more operational parameters of the equipment unit. In an exemplary embodiment the declaration document is created by an operator of the equipment unit and the instruction document is created by a user entity having electronic access to the declaration document.

Another aspect of the invention relates to a method for managing a power generation process. The method includes creating an electronic declaration containing information relating to one or more characteristics of an equipment unit involved in the power generation process. The method further includes creating, at least partially based upon the information contained within the electronic declaration, an electronic instruction prescribing a load change applicable to the equipment unit. In an exemplary embodiment the electronic declaration is created by an operator of the equipment unit and the electronic instruction is created by a dispatcher having electronic access to the electronic declaration.

The present invention also relates to a portal server framework. Consistent with this aspect of the invention, a portal server is configured to host at least an electronic dispatch and logging application capable of receiving electronic declarations of status of one or more equipment units and electronic instructions applicable to changes in operation of the one or more equipment units. The portal server framework further includes an orchestration component disposed to coordinate sending of the electronic declarations and electronic instructions between users of the portal framework.

Various additional aspects, features, and functions of the present invention are further described below in conjunction with the appended Drawings.

BRIEF DESCRIPTION OF THE DRAWINGS

For a better understanding of the nature of the features of the invention, reference should be made to the following detailed description taken in conjunction with the accompanying drawings, in which:

FIG. 8 is an operation decision table defining operations that can be performed on a document by operators or dispatchers, given a specific operation and document states.

FIG. 9 depicts a table illustrating the specific data source, defining criteria, and permitted operations for each category of instruction and declaration utilized within the context of the Intelligen application suite.

FIG. 15 is an Unaccepted Instructions and Declarations Page, hyperlinked to the "Welcome User" page of FIG. 14, which contains a list of instructions and declarations to be accepted or rejected by the user.

FIG. 19 shows a View History page in which are displayed a list of all instructions that have been entered into the Intelligen System.

FIG. 22 depicts a current declaration page that displays the declaration currently in effect in the selected generation unit.

FIG. 25 shows a user interface, defined by a View History page, through which are displayed a list of all declarations that have been entered into the Intelligen system.

FIG. 26 shows a user interface generated upon selection of a "Create Declarations" tab.

FIG. 31 shows an Amend/Cancel Instruction Page.

FIG. 35 depicts an Accept/Reject Declaration Page.

FIGS. 50-87 are various user interface and other diagrams to which reference will be made in describing various aspects of the inventive SuiteVoyager web portal and integrated load monitoring application.

DETAILED DESCRIPTION OF EMBODIMENTS

Introduction

Figure 1:
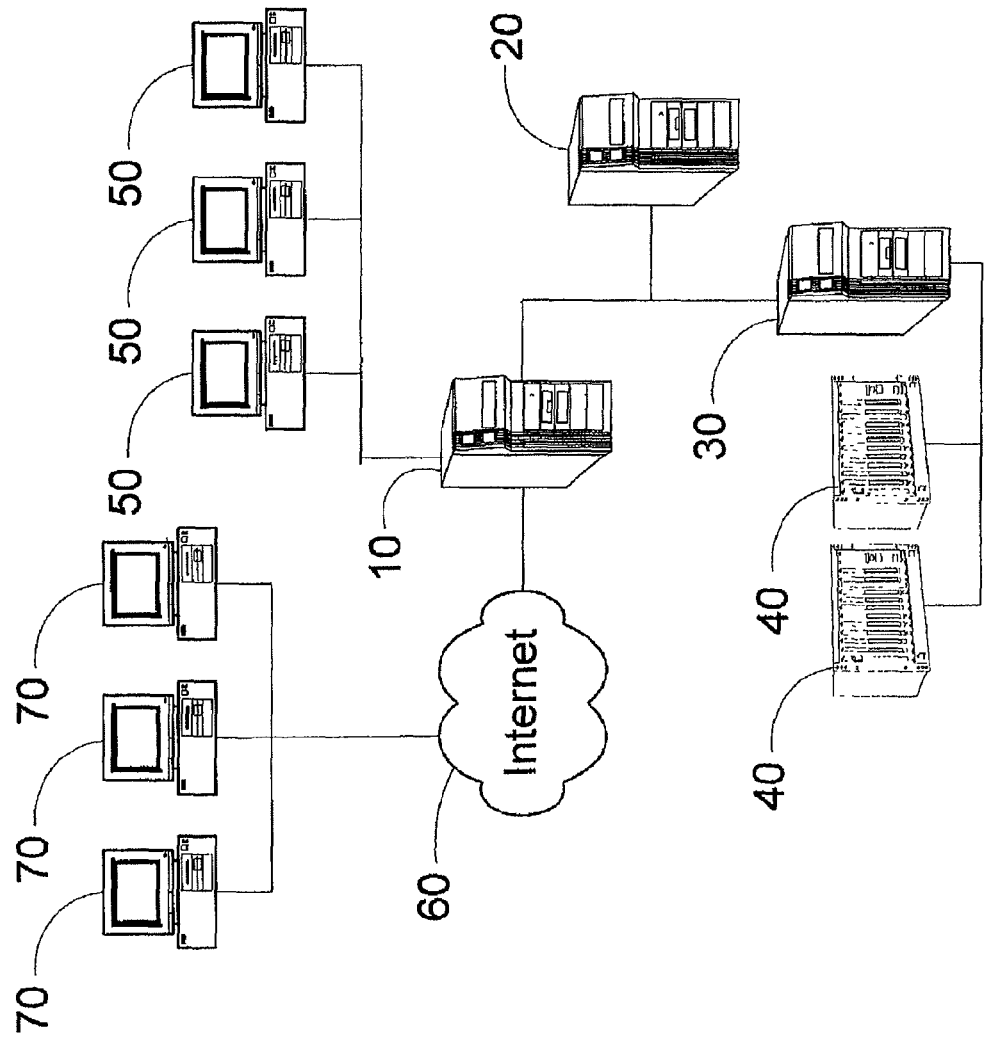
FIG. 1 schematically depicts an exemplary portal server arrangement of the present invention.

The present invention relates to a system and method for collaborative process management and information access using a portal-based system architecture. Embodiments of the invention may be utilized to address difficulties and inefficiencies arising in connection with the management of processes requiring communication among different systems and/or actors. In one exemplary embodiment disclosed herein, the principles of the invention may be employed to substantially reduce or eliminate various inefficiencies within the power generation industry; namely, inefficiencies resulting from reliance on the use of conventional techniques to enable communication between power grid dispatchers and individual generation unit operators.

In this embodiment an infrastructure is provided which permits real-time communication and document management to occur between such dispatchers and operators, which enhances opportunities for collaboratively eliminating power generation inefficiencies. As is described further below, individual unit operators provide grid dispatchers with electronic "declarations" of the state and capabilities of individual equipment units. In turn, grid dispatchers provide electronic "instructions" to grid operators concerning optimal operating levels of their respective equipment units. The disclosed embodiment of the inventive system logs and stores all of the instruction transactions and displays the most recently issued instructions. Although instructions will generally be created by the dispatcher, in certain circumstances the operator will have the ability to create an instructions as well. Arrangements are also made for market data to be utilized so that the financial costs of deviation from such optimal operating levels may be evaluated and displayed.

GLOSSARY OF TERMS

| Term | Definition |
| --- | --- |
| Accept Timeout | The maximum number of minutes in which an operation on an instruction or declaration must be accepted/rejected by the recipient |
| Acknowledge Timeout | The maximum number of minutes in which an operation on an instruction or declaration must be acknowledged (i.e. seen by recipient). |
| ArchestrA | An architecture for creating industrial automation products, applications and services. It includes an open industrial applications development platform on which customers, OEMs, systems integrators, third parties and Invensys can develop the most efficient and competitive production automation systems in the world. |
| BizTalk | Handles the orchestration (work flow) of Intelligen and provides an interface for Intelligen with the Live Communication Server. |
| Boundaries | The tolerance allowed for controlling the unit net output. The tolerance applied by the company is called the Revenue Boundary. If the company participates in an Open Market, a second (slightly looser) boundary is applied called the Market Boundary. TEP does not currently participate in an Open Market. |
| Clock | The system is configured to run periodically. |
| COM | Component Object Model, the Microsoft-paradigm to connect components. Microsoft has implemented the base technology for COM on the NT platform. A COM-object defines its interfaces. Components from different machines can be combined using DCOM. |
| Current Declaration | The declaration that is currently in effect for a unit. |
| Current Instruction | The instruction that is currently in effect for a unit. |
| DCOM | Distributed Common Object Model that allows communication and manipulation of objects over a network connection. Windows NT 4.0 is the first Microsoft operating system to support DCOM (formerly called NetworkOLE). |
| Deadband | A period of time specified in minutes. When the deadband is added to the accept timeout, the result is the number of minutes before an instruction or declaration becomes current when modifications are no longer allowed). |
| Declaration | A document created by a unit operator which informs the system dispatcher about the capabilities and limitations of a generation unit as of a specified point in time. In the Intelligen application this includes the Maximum Net Generation, Minimum Stable Generation, Ramp Rate categories (Warmth Categories), and AGC availability. |
| Declined Declaration | A declaration that has been rejected by a user or aborted by the system. |
| Declined Instruction | An instruction that has been rejected by a user or aborted by the system. |
| Deviations | Any operation outside of the Revenue boundary. The system calculates the impact to the company profits when the unit is operated outside the revenue boundary. If a Market boundary is applied, the deviation is calculated as the area between the Revenue Boundary and the Market Boundary. |
| Document | A set of attributes that represent either an operating instruction for a generating unit or a declaration of a generating unit's capability. |
| EDL | Electronic Dispatch and Logging - a communications application that provides the ability to electronically capture data passing between the dispatch organization and the plant operations organization. |
| Excursions | The sum of the deviations and transgressions. |
| Expired Declaration | An accepted declaration that became current and has since been replaced by another current declaration. |
| Expired Instruction | An accepted instruction that became current and has since been replaced by another current instruction. |
| Forced Accept Timeout | The number of minutes the sender has to accept an instruction or declaration after the Accept and Acknowledge Timeouts has expired. |
| ILM | Integrated Load Monitor - monitors (graphically) the performance of the unit/plant on the contracts that have been entered into - with real-time plant performance, as well as monitor the performance against market-prescribed rules. Excursions and deviations to instructed loads are also monitored and quantified in dollar terms |

GLOSSARY OF TERMS

| Term | Definition |
|---|---|
| Instruction | A document created by the system dispatcher to instruct the unit operator of the loading that should be placed on a generation unit for a given period of time. These include, for example, load change instructions, unit shutdown instructions and AGC-on instructions. |
| IPSec | Internet Protocol Security |
| LCS | Live Communication Server is an enterprise-ready instant messaging (IM) system, with presence awareness and an extensible platform that connects people, information, and business processes—enabling better decisions faster. |
| LMX | A message exchange that handles communications between disparate applications such as BizTalk, SuiteVoyager and Archestra. |
| Monetary Information | Price per MWh.—This is what the energy could be sold for or purchased on the open market. Generation Cost—The main component of this is fuel, manually entered |
| OPC | OLE for Process Computers—This is an industry standard for communication between control system of dissimilar manufacturers. |
| Pending Declaration | A declaration for a unit that has been accepted and scheduled to become the current declaration for the unit. |
| Pending Instruction | An instruction for a unit that has been accepted and scheduled to become the current instruction for the unit. |
| Performance Dashboard | This functionality monitors and summarizes the performance across the generating units and provides a summary on a daily, weekly and monthly basis for the defined Key Performance Indicators for the company. |
| Power Company Management (User) | The primary user is the VP of Generation. Other users include the plant managers. |
| Ramp Rate | The rate (MW/min) at which the turbine controls will increase or decrease the load. This value is used by EDL to calculate the Start Time or End Time of a load change instruction. The Performance Dashboard uses the Ramp Rate to calculate Spin. The allowable ramp rate is dictated by the manufacture of the turbine/boiler system. There are usually several (5 is common) ramp rates that take the unit from minimum power to its maximum power. These ramp rates are defined for intervals of the power range of the unit. The individual ramp rates can be dictated (limited) by many different components including the boiler, steam turbine, condenser, water heaters condensate pumps, de-aerator, to mention a few. |
| RTC | Real Time Communications |
| SIP | Session Initiation Protocol - a signaling protocol for Internet conferencing, telephony, presence, events notification and instant messaging |
| SOAP | Simple Object Access Protocol - a lightweight protocol for exchange of information in a decentralized, distributed environment. It is an XML based protocol that consists of three parts: an envelope that defines a framework for describing what is in a message and how to process it, a set of encoding rules for expressing instances of application-defined datatypes a convention for representing remote procedure calls and responses. |
| SuiteVoyager | Is a web portal that delivers real time and data base information to users using an internet browser. |
| System Dispatcher | Balances the network needs, profit targets, operating costs and unit capacities by determining the desired loading of each of the generator units. These actors are located in corporate offices, generally remote from the generating units. The System Dispatcher receives declarations made by the Unit operator and issues instructions to the unit operators for the operating requirements of the generation unit. |
| Target | The net output of the unit, as instructed by the dispatcher. |
| TLS | Transport Layer Security (derived from Secure Socket Layer, v3.0) |
| Transgressions | Any operation outside of the Market boundary. The system calculates the impact to the company profits when the unit is operated outside the Market boundary. |
| Warmth Category | A group of ramp rates that apply to the entire load range of the generating unit. The warm category is a group of five load ranges from minimum generation to maximum output with a corresponding ramp rate for each of those load ranges. |
| Windows Messenger | This is the live messaging client that is used on the client machines to allow Intelligen to send messages to the end users and to allow person-to-person "chat" between the users, either individually or in groups. Microsoft supports this product for enterprise use and includes the highly secure SIP protocol. |

Extensible Portal Server Architecture

The present invention may be best understood in light of the subject matter of the above-referenced co-pending U.S. application Ser. No. 09/955,473, which is summarized below with reference to FIGS. 1-2 and incorporated by reference. As is described herein, the co-pending application describes an extensible architecture for a portal server system capable of facilitating certain aspects of the collaborative process management system of the present invention.

The co-pending application discloses an extensible manufacturing/process control information portal server that enables users to visualize plant floor information coming from a variety of systems and databases (e.g., Wonderware's InTouch systems, InTouch/AlarmSuite alarm databases, I/O servers, and Industrial SQL) over the Internet or an intranet via a browser (e.g., IE 5). The disclosed extensible manufacturing/process control portal server supports interactive HTML pages in XML, applying an XSL transformation, and dynamically rendering VML on a client machine (as well as providing animation updates from live process data sources). The portal server allows users to generate ad hoc queries of a real-time process control SQL database to produce trends and reports viewable with a browser client such as MICROSOFT'S INTERNET EXPLORER. In addition, the portal server supports Internet enabled ActiveX controls and a SQL server report tool. The manufacturing/process control portal server supports bi-directional communications between browser-clients and a data provider associated with an observed manufacturing/process control system.

The disclosed exemplary manufacturing/process control information portal server provides a user configurable data handler and data source designation interface. First, a user designates a type of information (associated with a particular data handler). Second, the user designates a source of information of the selected information type. For example, a user can select an "alarm" data type/handler. Thereafter, the user selects a portion of the plant (i.e., an information source) for which data is supplied. Thereafter, the portal server is configured, through the instantiation of appropriate objects, to deliver the configured data to the requesting browser client. The user can be either human or a machine submitting appropriate commands to the portal server configuration facilities.

The exemplary manufacturing/process control information portal server incorporates an extensible portal server architecture enabling developer/users to extend the capabilities of the system. A first form of such extension comprises the ability of a user to re-configure the portal server to provide information from a designated resource. A second form of extending the portal server's capabilities is adding new data handlers to support new forms/formats of data that are used to provide information from connected sources.

The disclosed extensible manufacturing/process control portal server provides a highly flexible infrastructure for aggregating plant floor information (for client applications) and disseminating data back to, for example, a manufacturing plant floor. The access is provided to client-users via the Internet and intranets. The extensible architecture and technology allow users to add new data sources to the main portal server. The extensible architecture also facilitates adding new data handlers.

In general, the extensible architecture is facilitated by a set of generic interface definitions that facilitate the creation of source-specific and handler-specific object components. Each of the added components (handlers and sources) is carried out by an object class (or subclass) defined according to the set of generic interface definitions.

Turning to FIG. 1, an exemplary portal server arrangement is schematically depicted. A portal server 10 provides portal services to a manufacturing/process control environment. That environment consists of a database server 20 and a data access server 30. The data access server 30 in turn connects to process control equipment 40. The portal server 10 provides its services to browser clients at locally connected workstations 50 and, via the Internet 60 or a proprietary network, at remote workstations 70. The connected workstations 50 and remote workstations 70 connect to the resources of the portal server 10 via browser clients such as, for example, MICROSOFT's INTERNET EXPLORER.

Figure 2:
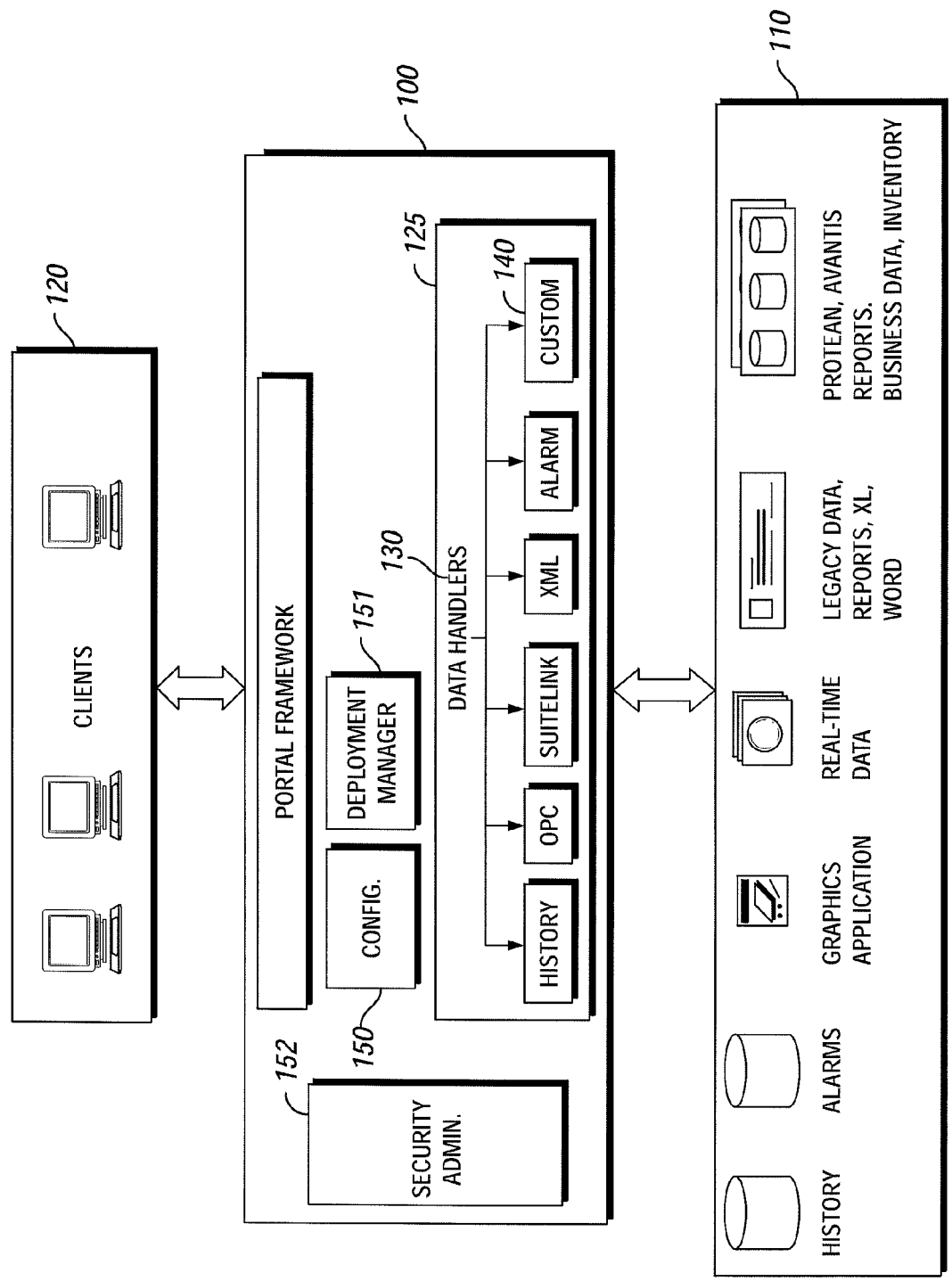
FIG. 2 illustratively depicts components of a first exemplary extensible portal server architecture.

Turning to FIG. 2, components of a first exemplary extensible portal server architecture are illustratively depicted. The portal server 100 is interposed between sources of manufacturing and process control information of various information types 110 and a set of browser clients 120. Such clients 120 can be thin clients running little or no application-specific software. The clients 120, executing browsers and generic browser support software, rely upon the processing capabilities of the portal server to provide the manufacturing and process control information in a browser-ready format. The browser clients 120 generate the corresponding display information and transmit user selections back to the portal server 100. The portal server 100 also provides a configuration interface that enables a user to add a new data source to a set of data sources from which the portal server 100 obtains data on behalf of the browser clients 120.

The information sources (typically servers—but not depicted in the Figure) of various types 110 supply information to the portal server 100 in a variety of formats. As indicated in FIG. 2, such types include history (archived process control information), alarms, graphics applications (e.g., trend graphs), real-time manufacturing/process control system data supporting remote monitoring of a system, and business information (generally stored within databases). The portal server includes a data access subsystem 125 that is responsible for retrieving and sending data (in real-time) between the portal server 100's browser client interface framework and an enterprise's sources of information (e.g., plant floor process control status and control information). The data access sub-system 125 comprises an extensible set of data handlers 130 that process the information rendered by the information sources 110 in specialized formats. The data handlers include, for example, history and alarm handlers. Other data handlers are associated with particular client data exchange protocol formats such as OPC, SuiteLink, and DDE. Another identified handler processes XML. A custom block 140 is intended to depict the extensibility of the set of data handlers 130 which supports the addition of new (custom) configurations of data handlers after initial installation. This is facilitated by an open architecture and a generic interface definition between the data handlers and a portal framework-client interface that renders web pages to the requesting clients based upon corresponding information provided by particular data sources via corresponding ones of the data handlers 130.

The portal server 100 includes a number of sub-systems. Configuration of the portal server, including user-configuration described herein, is supported by a configuration database 150. The configuration database includes a data_Providers table that stores connection information linking data providers (external data sources) to the portal server 100 that in turn connects to a requesting client. The data_providers table is accessed by a "Data Source Configuration" web page presented to users of the portal server 100. In an enhanced implementation a second configuration interface enables users to add new data handlers (for handling new data types) to the portal server system. When a new data handler is added to the portal server 100, a set of registration information is stored within a data handlers registry that is separate and distinct from the data_providers table maintained within the configuration database 150.

In some cases client browsers need plug-in components to view portal information. For example, if process graphics contain ActiveX components, then the ActiveX components need to be downloaded. This task is accomplished by a deployment manager 151. The deployment manager 151 combines all files that must be downloaded, registers the components on client machines, and initializes them.

A security administration sub-system 152 facilitates limiting access to particular resources. The security system 152 enforces access rights with regard to particular resources accessed by identified users. Other potential sub-systems include multi-language support and multi-user concurrent user license management.

Intelligent Portal Framework for Distributed Collaboration Environment

Figure 3:
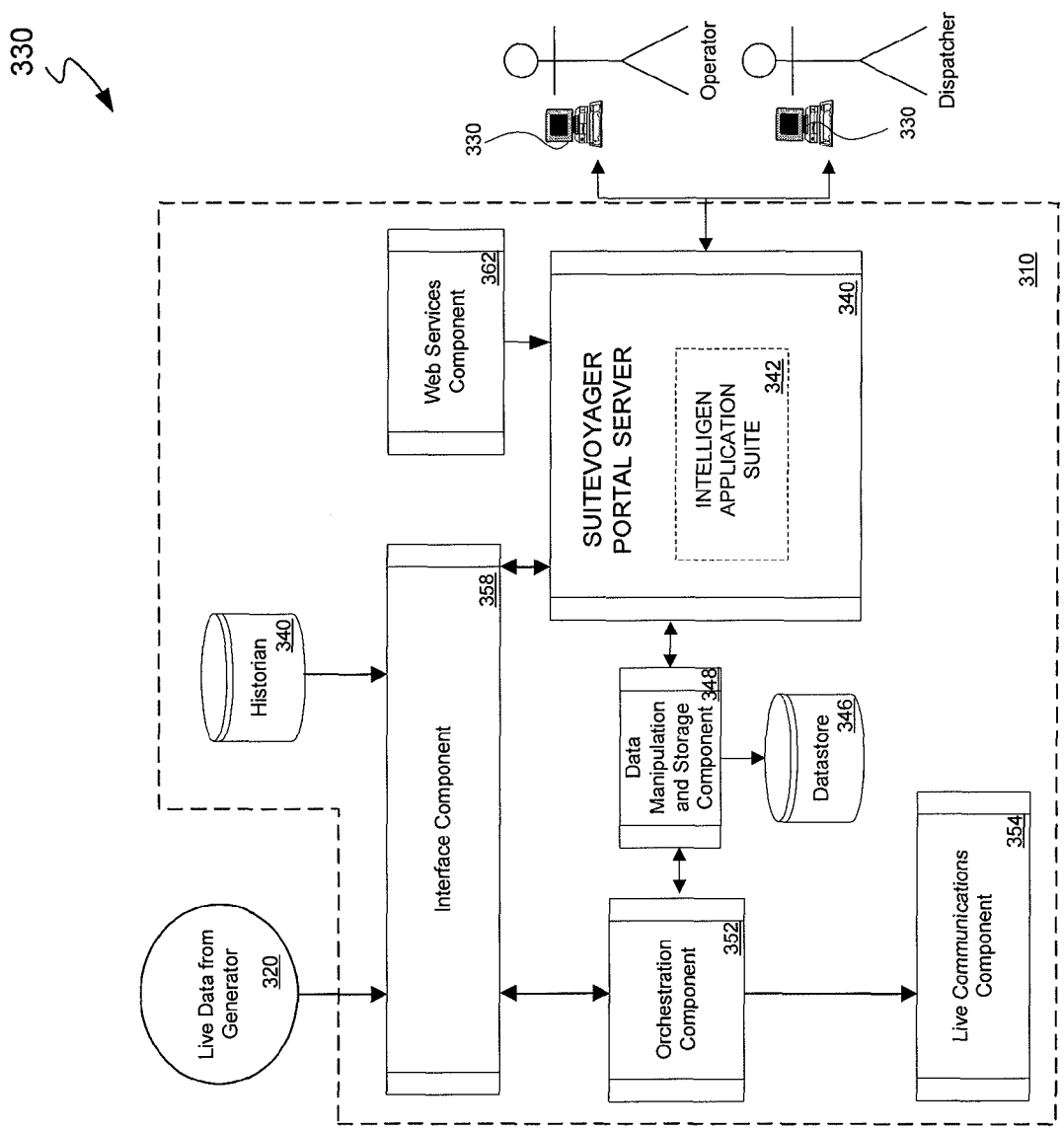
FIG. 3 illustratively represents a collaboration environment containing an intelligent portal framework of the present invention.

Turning now to FIG. 3, there is illustratively represented a collaboration environment 300 containing an intelligent portal framework 310 of the present invention. As will be apparent from the following discussion, the collaboration environment 300 incorporates certain aspects of the portal server architecture described above with reference to FIGS. 1 and 2. Although the collaboration environment 300 of FIG. 3 is described within the context of an exemplary power generation system, those skilled in the art will appreciate that the teachings of the present invention may also be applied in many other different types of process control and manufacturing environments. As shown, the portal framework 310 interfaces with sources of data 320 provided by units of power generation equipment (not shown) and browser clients 330. The clients 330, operated by an operator and a dispatcher as described more fully below, rely upon a portal server 340 within the portal framework 310 to provide power generation and related operational/financial information in a browser-ready format.

As shown in FIG. 3, the portal framework 310 further includes a historian 340, a datastore 346, a data manipulation and storage component 348, an orchestration component 352, a live communications component 354, an interface component 358 and a web services component 362. These components and the portal server 340 may be implemented as software executing on one or more computing devices.

As is discussed below, the portal server 340 supports an Intelligen application suite 342 which provides the primary interface through which operators and dispatchers can create, amend and cancel instructions and declarations. The application suite 342 also enables the monitoring of the performance of a generating unit against the declarations and instructions that have been issued.

The historian 402 stores current and historical readings regarding conditions and output of one of more unit generators being controlled by an operator. This information may comprise live data from sensors deployed in or proximate the unit generator(s) of interest.

Datastore 346 is used to store various data used or produced by orchestration component 352 and other components of the portal framework 310. For example, datastore 346 may store information capable of being used to graphically render actual and targeted equipment performance and to compute the costs associated with deviation from such targeted performance levels.

In general, data manipulation and storage component 348 places data from the various components into data structures that can be used by other components. The components used in the portal framework 310 may use proprietary and/or diverse data formats such that the data needs to be restructured before another component of the framework 310 can operate on the data. For instance, historian 340 may store the current and recent generator data in a data format that cannot be used natively by application programs hosted by the portal server 340. Consequently, data manipulation component 408 may retrieve the current and/or historical generator data and reformat that data into a data structure that can be used by such application programs.

Data manipulation component 348 also may perform processing on the current and/or historical data retrieved from historian 340 before making this data available to other components of the framework 310. The processing may be used to insure the reliability and enhance the speed of the calculations performed by these other components.

Orchestration component 352 coordinates the sending of declarations and instructions between users of the portal framework 310. Orchestration component 352 also may coordinate and schedule the operations of other components and the transfer of data between components in the system. For instance, orchestration component 352 may instruct data manipulation component 348 when to begin accessing data in historian 340.

Figure 4A:
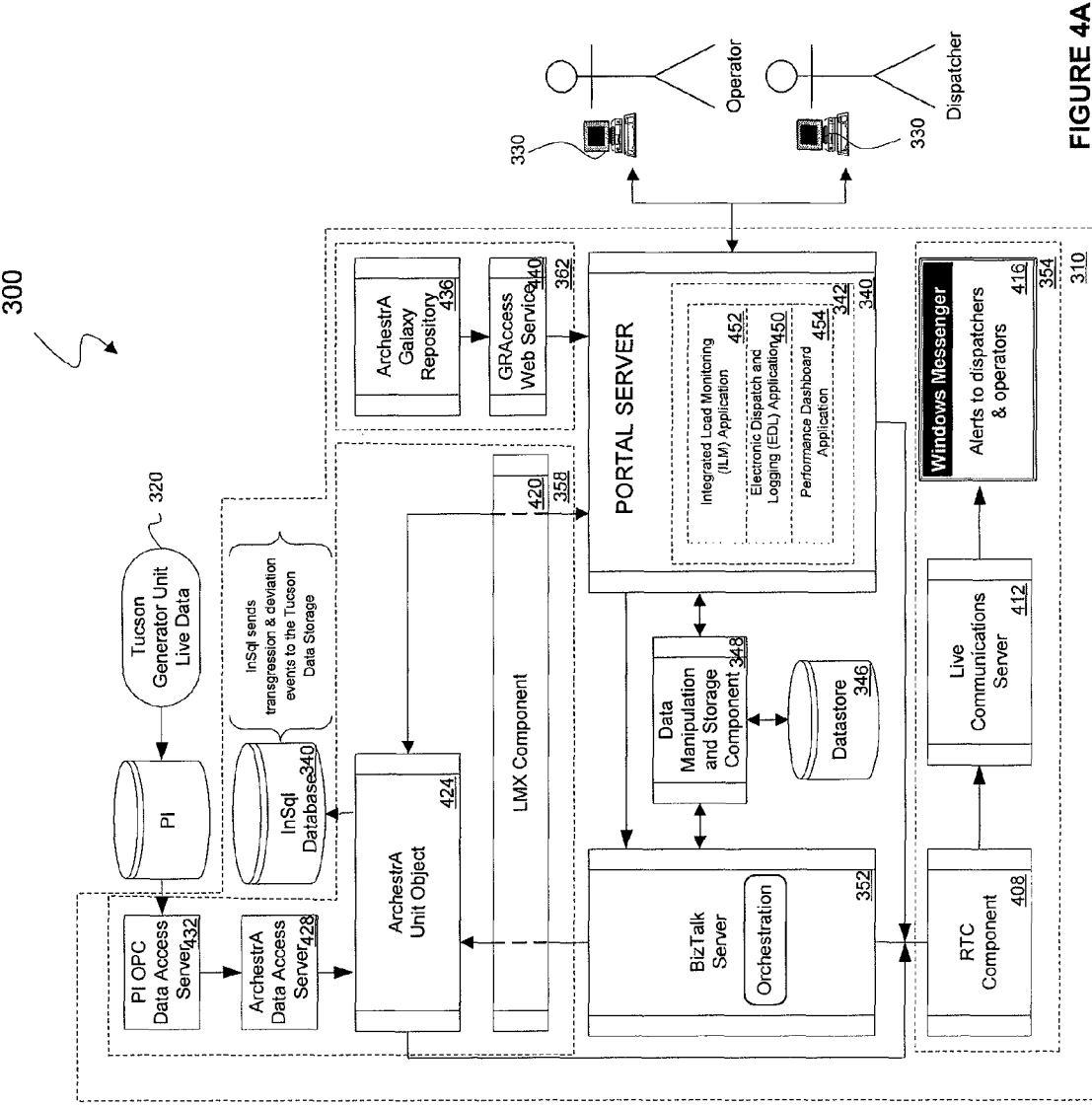
FIG. 4A provides a more detailed representation of an exemplary implementation of the collaboration environment.

FIG. 4A provides a more detailed representation of an exemplary implementation of the collaboration environment 300. In the embodiment of FIG. 4A, the intelligent portal framework 310 is implemented consistently with the ArchestrA Collaboration Environment ("ACE") developed by the assignee of the present invention. ACE is designed to support innovations in adaptive collaboration among operators, dispatchers and the power generation system.

As shown in FIG. 4A, the live communications component 354 is comprised of a real-time communications (RTC) component 408, a live communications server 412 and a Windows messenger module 416. The interface component 358 is comprised of a local message exchange (LMX) component 420, an ArchestrA unit object 424, an ArchestrA data access server 428, and a PI OPC data access server 432. In addition, the web service component 362 includes an ArchestrA Galaxy Repository 436 and a GRAccess Web Service 440.

Referring again to FIG. 4A, the Intelligen application suite 342 is seen to include an Electronic Dispatch and Logging (EDL) application 450, an integrated load monitoring (ILM) application 452, and a performance dashboard application 454. The EDL application 450 provides the primary interface by which operators and dispatchers can create, amend and cancel instructions and declarations. In this regard the EDL application 450 provides the real-time capability to electronically transmit and capture instructions sent to generating unit operators, and to electronically transmit and capture generating unit declaration changes (unit capacity) sent to system dispatchers.

In the exemplary embodiment the EDL application 450 primarily pertains to the creation and management of instructions for unit operators and of declarations of unit capability for system dispatchers. For both instructions and declarations, the EDL application 450 supports viewing the currently active instruction or declaration, pending instructions or declarations, and instruction and declaration history. The EDL application 450 also supports querying instruction and declaration history, creating new instructions and declarations, amending instructions and declarations, and canceling instructions and declarations.

Figure 5A:
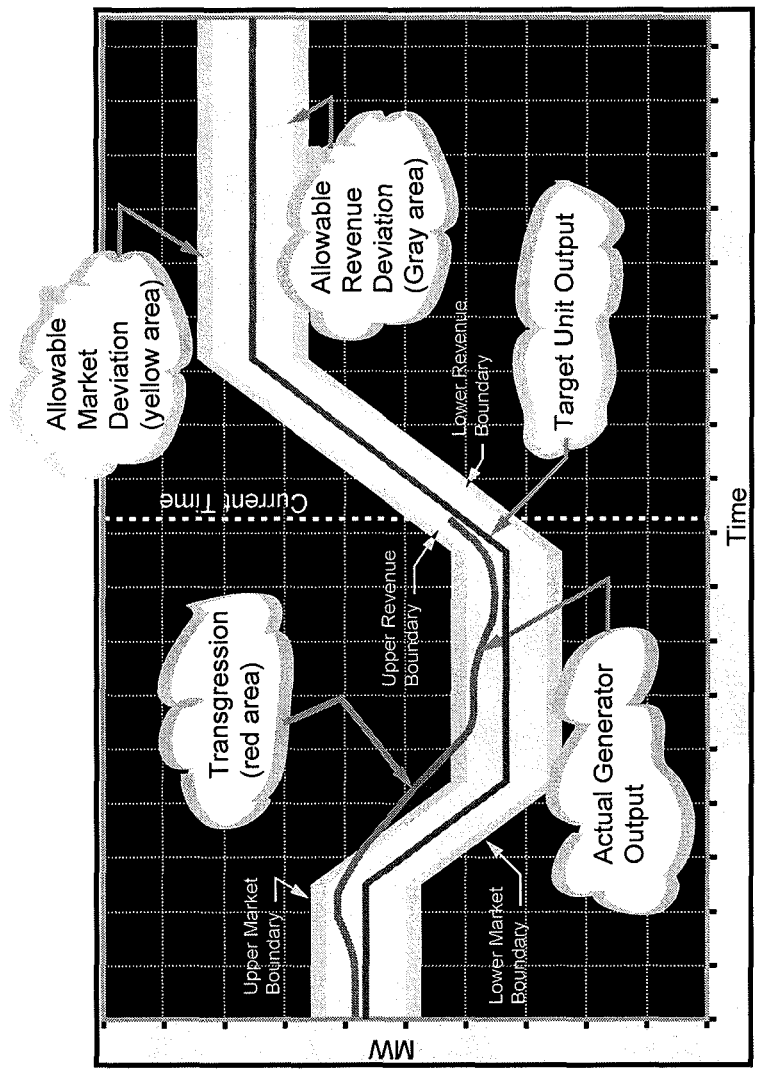
FIGS. 5A and 5B illustrate views a graphical display, generated by an integrated load monitoring (ILM) application of the Intelligen application suite, of the real-time performance of a generating unit as a function of the last operating instructions sent to the unit.
Figure 5B:
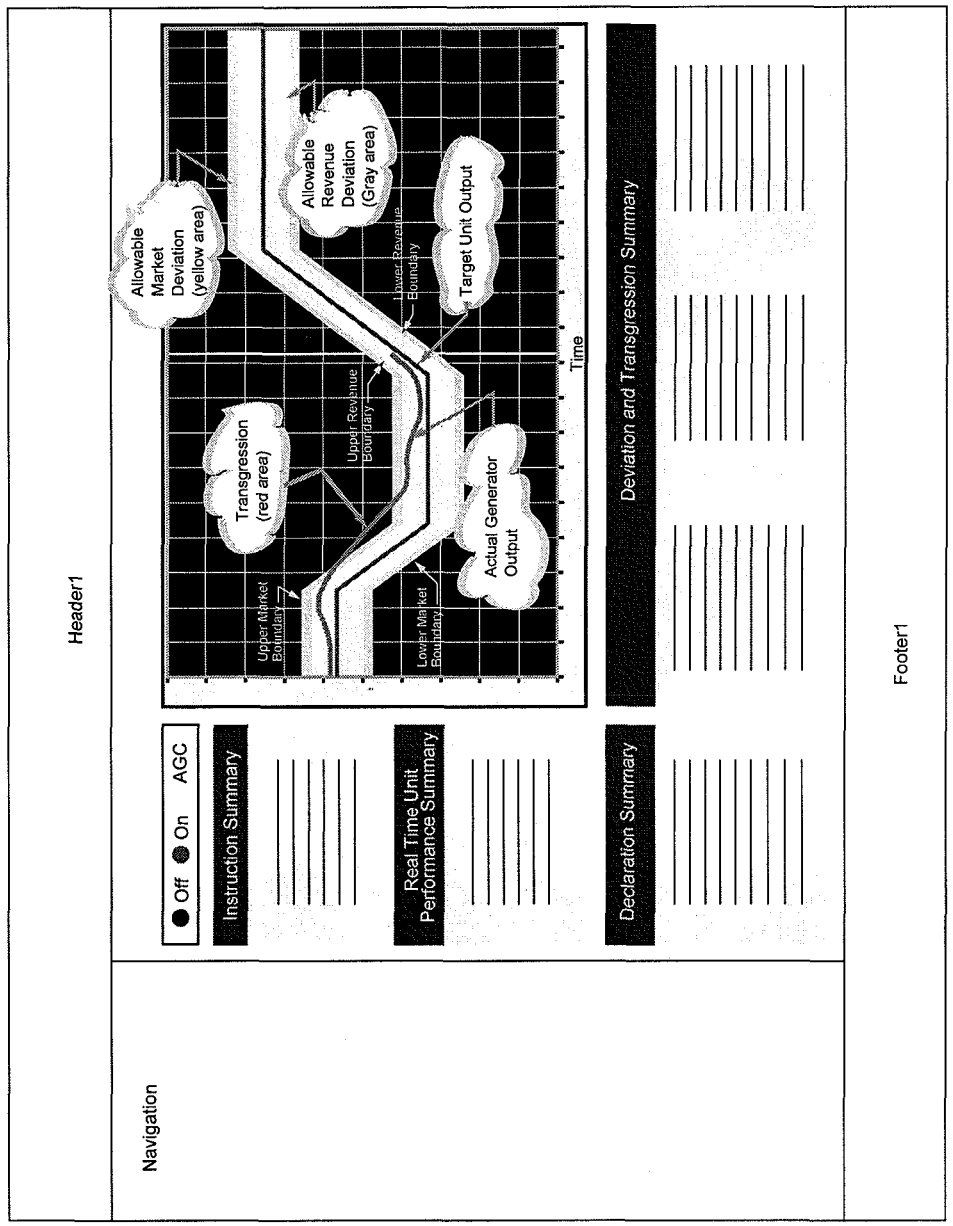

The ILM application 452 is disposed to monitor and graphically display the real-time performance of a generating unit as a function of the last operating instructions sent to the unit (FIG. 5A). Real-time performance will be displayed upon a graphical interface (FIG. 5B), and deviations and transgressions will be highlighted. In addition to the performance graph, the ILM application 452 will also display an instruction summary, real-time performance summary, declaration summary and transgression summary that includes the costs of the trangression and deviation.

The performance dashboard application 454 monitors and summarizes the performance across the generating units and provides a summary on a daily, weekly and monthly basis for defined Key Performance Indicators (KPIs).

In the exemplary embodiment there exists an instance of a unit object 424 for each generating unit configured within the portal framework 310. Each instance of a unit object 424 comprises a template for a generation unit that can be configured to represent individual instances of actual plant power generators having individualized characteristics such as fuel type, heat rate curve, name plate specifications and ramp rates. The unit object 424 takes capability declarations issued by the plant generation unit operator and load instructions issued by power grid dispatrchers, validate them, queue them and make them available to other applications. In the exemplary embodiment each object 424 uses the XML datatype for both input and output for these documents and manages future plot information using the configured ramp rates that can be read by web parts in the portal. It also calculates many key performance indicators for the performance dashboard application 454 using the configured heat rate curves, as well as information input though declarations and instructions. Maintained in each unit object 424 are the following sets of attributes:

Current Instruction—The instruction that is currently in effect for the unit

Current Declaration—The declaration that is currently in effect for the unit

Pending Instructions—The accepted instructions that are waiting to become current Pendng Declarations—The accepted declarations that are waiting to become current Nameplate—The operating specifications from the generating unit's nameplate Future Instruction Plot—Generation forecast based on future instructions and market data Market Data—Market pricing, cost information and revenue and market boundaries Operator List—The list of operators that receive notifications of deviations and transgressions.

The EDL application 450 accesses these groups of attributes via the LMX ArchestrA Interface component.

Figure 4B:
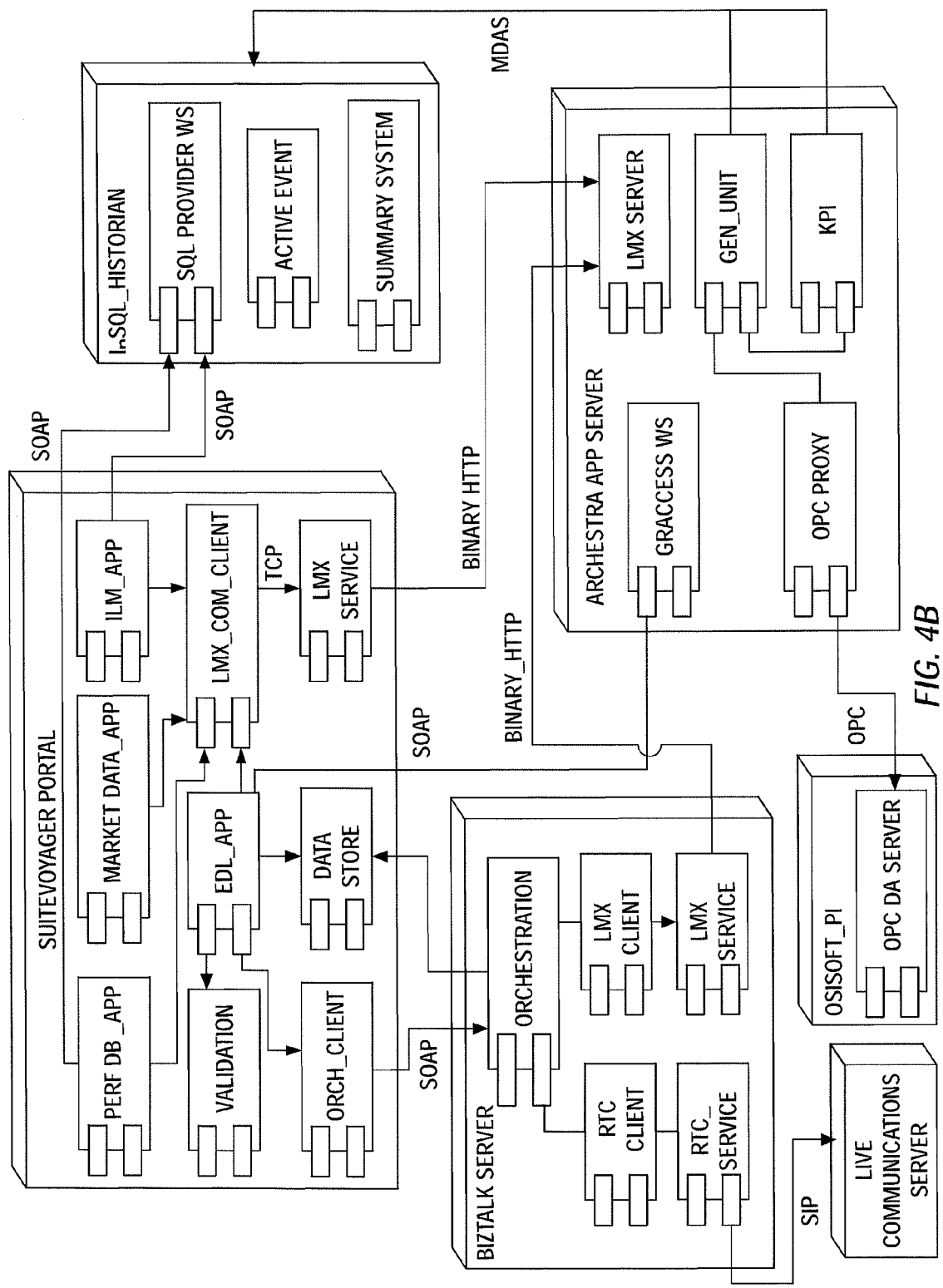
FIG. 4B provides an illustrative representation of a set of object-oriented components comprising an exemplary implementation of the intelligent portal framework.

Turing now to FIG. 4B, an illustrative representation is provided of a set of object-oriented components comprising an exemplary implementation of the intelligent portal framework 310. In the embodiment of FIG. 4B the portal framework 310 includes an ArchestrA Application Server 404 and an IndustrialSQL Server 408 (InSQL_Historian) available from the assignee of the present invention. The software comprising the InSQL_Historian 408 provides a time series base for Key Performance Indicators (KPI) and operational Intelligence in conjunction with various data stores and cubes. The intelligent portal framework 310 may utilize an instantiation of Microsoft Live Communications Server 412 for secure and encrypted instant messaging. The Server 412 may be tightly integrated with Windows Active Directory enabling a myriad of user object capabilities such as online status, phone and pager numbers, email addresses and more.

In the exemplary embodiment the foundation of the solution stack of the framework 310 is WS-Eventing based Web Services and .Net Remoting servers providing SOAP, binary HTTP and TCP message publishing from historians, databases, alarm providers, users and real-time generation equipment unit data.

The various subsystems and runtime components depicted in the exemplary implementation of the intelligent portal framework 310 of FIG. 4B are described below:

LMX Server

This server component, available from the assignee of the present invention, uses a messaging-based communication protocol (MX/LMX) that does not move easily across firewalls or to applications that are not deployed as part of the ArchestrA Galaxy. As part of building the Intelligen solution a .Net Remoting server hosted in Internet Information Server as a singleton Server Activated Object (SAO) was built to add a publish/subscribe mechanism for data exchange with ArchestrA Application Object attributes. It uses Binary HTTP to communicate giving it the ability to move LMX information though firewalls and routers. The SAO loads the Archestra LMX and security dlls from a Galaxy deployed Platform Object and runs as an anonymous engine in the ArchestrA system.

LMX Service:

Complementary to the LMX Server, the LMX Service is a .Net Remoting Windows Service that allows client programs on an internal network to subscribe for information from ArchestrA Application Objects running across the Internet or intranet. The LMX Service connects to the LMX Server using binary HTTP and registers for call backs from the SAO when data changes in an ArchestrA Application Object attribute. The service keeps the data values, their timestamp and quality in a memory resident hash table and manages the livelihood of the connection to the LMX Server. Clients connect to the LMX Service using the TCP protocol and are given the most recent copy of the information in XML format only after the data quality is verified.

In situations such as thin clients that require connectivity to LMX information in a disconnected manner, the LMX Service acts as a client to the LMX server to consume published attribute changes. The service will hold the value time and quality of subscribed information as a proxy for clients coming through a browser.

LMX Client

The LMX client is delivered in two forms, either a .Net Assembly registered in the Global Assembly Cache or a by wrapping the assembly as a COM+ object hosted in a COM+ server package. This client loads the iLMX Service interface and allows .Net or COM based applications to make LMX set and get requests from ArchestrA Application object attributes.

LMX Remoting Adaptor

This component can be used directly from a BizTalk orchestration to read and write data to LMX. It can also receive change notifications on subscribed ArchestrA object attributes.

Information Publisher

The Information Publisher is a WS-Eventing based web service that allow consumers to subscribe for information as it changes form any event source to which the IP is connected. The client can pass filters for this information. Such as let me know when MyGalaxy:boiler101.Temp>212 or notify me when Galaxy2:process555.state=done. Clients can ask for multiple pieces of information and the IP will package this information into an XML document for expedient transfer. Clients will no longer have to poll for information and they will also be automatically notified when a communication error occurs or the quality of the information becomes suspect.

RTC Provider Service

The Real Time Communication Provider Service allows programmatic access to the Live Communications Server for sending instant messages to users using the SIP protocol. It is constructed as a .Net Remoting Windows Service that wraps the Microsoft RTCClient COM dll and logs onto the LCS Server remotely using a pre-configured SIP account and sends instant messages to Active Directory users based on inclusion in specific COM+ package roles.

RTC Client

The RTC client is a .Net Remoting Client that loads the iRTCProvider interface and allows .Net Applications to send messages via the RTCProvider Service though the Live Communication Server. It use the TCP protocol and a preconfigured port to communicate to the RTCProvider Service anywhere on the local area network Galaxy Repository Web Service ArchestrA provides a powerful object repository called the Galaxy and a corresponding thick client IDE for managing, configuring and deploying ArchestrA engines, platforms and application objects. The Galaxy Repository Web Service ("GRAccess") provides the configuration information for an ArchestrA hierarchical Galaxy to SOAP based clients. In this regard the GRAccess web service provides a programmatic interface to traverse the object hierarchy, query for context information concerning objects and allow for secure configuration and deployment of ACE and normal Application Objects that run on ArchestrA Application Engines.

Generic KPI

This is another ArchestrA Application object that can use or produce calculations on live LMX data to produce either summations or averages of instaneous results into historized accumulators for hourly, daily, weekly, monthly and yearly KPI values.

Validation Component

This component handles the validation of entries in the instruction of declaration documents to ensure that one or the other is compatible with the generation unit capabilities.

Orchestrations

The document management work flow of both Instructions and Declarations are handled by custom BizTalk orchestrations. The orchestrations are exposed as ASMX web Services.

Orchestration Client

This .Net assembly allows the interchange of information between applications and the BizTalk orchestrations using the SOAP protocol. It is hosted in the SuiteVoyager COM+ package.

EDL SV App

ASP-based applications were built for this solution as SuiteVoyager Applets built with the SuiteVoyager 2.0 toolkit to be hosted in the Invensys SuiteVoyager Portal. This application provided the GUI interface for users creating, modifying, accepting or rejecting instructions or declarations. It also provides access to the current and pending Declarations or Instructions as well as the document history for the same. The application exchanges information in the XML format to the ArchestrA Unit object via the LMX components. As part of its configuration, it synchronizes with the actual deployed Generation Unit Objects by using the GRAccess Web Service.

ILM SV App

This application was built for this solution to run inside the SuiteVoyager Portal to reflect the runtime information coming from each Generation Unit. This application provides 8 Web Parts that are built with the Digital Dashboard Resource Kit and are hosted in SuiteVoyager Digital Dashboards. It also provides a hidden web part for communications to the 8 other web parts on the display. It hosts the Tchart ActiveX control and provides a configuration editor for the same.

Market Data SV App

This SuiteVoyager applet is used to input cost and pricing information for the energy produced by the generation units. This information is used by the performance dashboards and the summary system to "Cost the transgression" or in other words put a dollar value on the difference between what the generator was instructed to do and what it actually produced within some preconfigured deadband.

Performance Dashboard SV App

This SuiteVoyager Applet is built as automatically configured Digital dashboards to display the KPI information in both tabular and charting forms.

Data Store

The data store is a schema of SQL Server database tables that hold the information managed by the IntelliGen applications. It also provides stored procedures and an interface component for applications to read and write information to the data store.

Summary System

The summary system uses an InSQL Active Event to trigger the summation of information used by the KPI and summary displays. Each hour it runs a stored procedure to extract information form the Industrial SQL Server historian to produce summarized tables that are easily queried.

Exemplary Usage of Portal-Based Collaboration Environment

As mentioned above, the principles of the invention may be utilized to effect collaborative management of process control and manufacturing activities through utilization of a portal-based system architecture. In the case of the power generation industry, the present invention may be employed to minimize or eliminate inefficiencies resulting from the use of conventional communication techniques between power grid dispatchers and individual generation unit operators. In this embodiment the intelligent portal framework described previously permits real-time communication and document management to occur between such dispatchers and operators, which enhances opportunities for collaboratively eliminating power generation inefficiencies.

In what follows a set of "use cases" are provided which illustrate exemplary approaches to creating and communicating declarations, instructions and performance deviation/transgression information between and among equipment operators, dispatchers and management personnel. As is discussed below, an electronic declaration is generated by the operator of a generating unit to communicate maintenance and operational information affecting performance of the unit to a dispatcher. The dispatcher, often by utilizing an application program, generates an operating plan for the loading of each unit throughout the day on the basis of these declarations, production demand data, and operating cost data. The loading information is electronically communicated to the generation unit operators as instructions.

Create Declaration

Introductory Description

In order for optimum power generation efficiency to be achieved, system dispatchers should possess current information regarding the capabilities and limitations of the individual generation units of a power generation system being managed. In particular, dispatchers require accurate information on the units in order to work out the most economical loading strategy for the fleet. Consistent with one aspect of the invention, a systematic approach is provided for electronic transmission of unit declarations from operators of equipment units to dispatchers and for recording of the transmitted data. A current declaration is used in validation of subsequent instructions issued by a dispatcher to an operator.

The intelligent portal framework aids the process by eliminating missed or misinterpreted communications and by keeping track of the entire process. Logging of the declarations provides information to equipment unit operators and dispatchers. In one embodiment the logged information will be available in a number of different views tailored to the needs of particular users. In addition, the logged declaration information will also be available for historical analysis.

Alerts may be used to inform operators of certain exceptions, such as the rejection of declarations.

When a declaration is initially sent to a dispatcher, the dispatcher is given a certain amount of time to acknowledge the new declaration. If the time lapses, a message is sent back to the operator indicating that the dispatcher has not read the new declaration. In one embodiment the time allotted for the dispatcher to read the new declaration depends on the type of declaration (i.e., immediate or pending). In general, the dispatcher will be allotted substantially more time to acknowledge a new pending declaration. These time periods are configurable by the administrator of the intelligent portal framework.

It is possible that the logged declaration information will pertain to one or more declarations which have not yet been acknowledged or accepted, and the dispatcher will be able to select any of these declarations for review. The declarations log typically shows the nature of the declaration, the time it was issued, the time it becomes effective and its status. The log also differentiates among declarations of different type (i.e., immediate or pending) or status using color coding.

It is noted that in what follows the term "create" is used to refer not only to the making of an initial declaration but also to the modification of one or more of the operating parameters defined by an existing declaration.

General Preconditions to Creation of a New Declaration
1) An initial state for the current declared capability for each unit will exist. This will be either the last declaration or initially a default declaration with a capability of 0%, thereby requiring the unit operator to create a declaration before the unit can be used.
2) The unit operator has been granted access to the portal and rights to create declarations for the unit in this scenario. He may also enter reason codes and annotations.
3) The system dispatcher has been granted access to the portal and the rights to accept/reject declarations.
4) Acknowledgement timeout has been set.
5) Accept/reject timeout has been set.
6) Validation values have been configured for declaration parameters for each unit.
7) Declaration effective time deadband has been configured.

Process of Creation of a New Declaration
Basic Course of Events:
1) The unit operator logs in to the portal framework through the portal server 340 using his browser client 330. For his unit, the portal framework 310:
   a) Checks for any instructions that might have been sent by the system dispatcher while the unit operator was not logged into the portal framework, and thus not acknowledged by the operator. The portal framework alerts the unit operator if any un-acknowledged instructions exist for his unit.
   b) Allows for the creation of a new declaration.
   c) Gives him the ability to see or amend the current declaration.
   d) For pending declarations:
      i) Allows the unit operator to see the list including status,
      ii) Open a pending declaration for viewing,
         (1) Move into edit mode for this pending item
      iii) Cancel pending declarations
   e) The historical view allows the user to see:
      i) The last 24 hours of effective declarations as default
      ii) Any number of days history
      iii) Items over a particular time range
      iv) Cancelled declarations
2) The unit operator chooses the option to create a declaration. The portal framework:
   a) Where applicable, populates the editable declaration form with either the default values if no current declaration exists or those from the current declaration for the following parameters.
      i) Effective Time
         (1) Option to set to immediate (default)
         (2) Date/time declaration is effective—(not available if no declaration exists.) The portal framework does not allow entry of a time that is not at least xx minutes in the future. Xx represents the "Declaration Effective Time Deadband".
      ii) the maximum load,
      iii) the minimum stable generation,
      iv) warmth categories,
      v) reason code for de-rating
      vi) reason comment
      vii) Warmth category b) The portal framework provides a mechanism for aborting this mode. If the operator decides to abort a declaration, the portal framework goes to end step and all parameters remain unmodified (the values of the declaration parameters are the same as they were prior to the "create declaration" session).
3) Validation—When the operator verifies the declaration, the portal framework will:
   a) Compare the input against a range of valid values. The portal framework will tell the unit operator if an entered value is invalid and disallows this input.
      i) Maximum Load—the maximum power in MW that the generation unit can produce. This is a "nameplate" value provided by the manufacturer of the unit.
      ii) Minimum Stable generation—The minimum power in MW that the generation unit can produce on a continuous basis. This is a "nameplate" value provided by the manufacturer of the unit but is configurable by the unit operator.
      iii) Warmth Categories—are groups of ramp rates for loading or unloading the generation unit through its complete power range.
   b) Indicate this field has been modified.
4) Send new declaration—After the operator has made all the modifications, he selects to send this new declaration to the dispatcher. The portal framework:
   a) Challenges this step.
      i) If the operator accepts the challenge, the portal framework will:
         (1) Record all the parameters of this declaration and the date/time that the new declaration was sent.
         (2) Set status of the declaration to "unacknowledged"
         (3) If the "As Soon As Possible" option is set, the effective time is set to the current date/time. Else go to next step.
         (4) Starts two timers, one for ack timeout and one for accept/reject timeout.
         (5) Checks for the on-line status of the System Dispatcher.
            (a) If online, generates an alert on the system dispatcher's computer that a new declaration has been created with a link to the new declaration.
      ii) If the operator decides against accepting the "OK-to-send" challenge the portal framework will ask the operator if he wants to:
         (1) Continue modifying the declaration parameters or abort the "create" session. If the operator chooses to continue modifying the declaration, the portal framework returns to the edit mode with the state of the parameters that have been modified still in their modified state.
         (2) Abort the session. If the operator chooses to abort the session, go to end step and leave all fields unmodified.
5) Acknowledge Receipt of Declaration—The System dispatcher opens his alert which allows him to review the new declaration. The portal framework:
   a) Sends a message to the unit operator showing that the system dispatcher received the new declaration (acknowledgement).
   b) Changes the status of the declaration to "Acknowledged".
   c) Logs the time stamp for the status change.
      Note: See Alternate Course if the new Declaration is not acknowledged by the dispatcher within the specified time for immediate declarations (this value is different than the acknowledge time for a pending declaration).
6) Accept/Reject Declaration—Once the System dispatcher opens the new declaration the portal framework gives the system dispatcher a choice to accept or reject the new declaration.
Note: See Alternate Course.
7) Complete "Create Declaration"—Once the dispatcher has accepted the new declaration, the portal framework:
  a) Records the "accepted" status of the new declaration.
  b) Sets the declaration as "Valid" for the generating unit.
  c) Sends a notification to the unit operator that the declaration has been accepted.
  d) Resets itself for the creation of a new declaration.

Specific Post Conditions:
1) New declaration status is recorded
2) Unit has new declaration
3) Declaration is in the declaration log Cancel a Pending Declaration
Basic Course of Events:
1) The unit operator selects a pending declaration displayed upon his browser client 330 and elects to cancel. The portal framework 310 opens the declaration and issues a challenge.
2) The operator accepts the challenge. The portal framework:
  a) Changes the status of the selected declaration to "cancelled" and the date/time that the declaration was cancelled (now).
  b) Generates an alert on the dispatcher's client browser client 330 that a pending declaration has been cancelled with a link to the declaration.
  c) Records the cancellation event
  d) Sets the event to "not acknowledged" and "Not Accepted".
3) Acknowledge Receipt of Declaration Cancellation—When the system dispatcher reviews notice of the cancellation of declarations, a message is sent back to the unit operator's computer showing that the dispatcher received the notification (acknowledgement). The declaration is recorded with a status of "acknowledged."
4) Accept/Reject Declaration—The dispatcher opens the link and he is given a choice to accept or reject the new declaration cancellation. See Alternate Courses.
5) The dispatcher accepts the declaration cancellation. The portal framework
  a) Marks the declaration status as accepted
  b) Removes the pending declaration from the pending declaration list.
  c) Makes the pending declaration invalid for the unit.

Specific Post Conditions:
1) Declaration changes are logged to declaration log
2) The portal framework displays a page that indicates the result of the cancel operation.
3) The declaration status of the cancelled declarations is "Cancelled"
4) The declaration is removed from the pending declarations list (it is still visible in history)
5) The declaration is no longer valid for the unit.

General Post Conditions:
1) A valid declaration exists in the portal framework.
2) The normal communication between the operator and the dispatcher has been recorded
  a) All "sent" declarations are logged in the portal framework
  b) The portal framework has recorded whether or not the dispatcher has reviewed and accepted/rejected the declarations
  c) The system has recorded whether or not the operator is aware that a declaration has been rejected.
3) The system dispatcher has ready access to the latest declaration when he is ready to issue a new instruction. The declaration can be used to validate the entries of the instruction.

Alternate Courses of Events:
Declaration is not acknowledged in time
1) The portal framework sends an alert to the unit operator to tell him that the dispatcher has not reviewed the new declaration.
2) The portal framework resends the alert to the system dispatcher.
3) The portal framework logs the ack timeout.

Declaration is not accepted/rejected in time
1) An alert is sent by the system to the operator to tell him that the dispatcher has not accepted\rejected the new declaration.
2) The portal framework records the status of the accept/reject timeout.
3) The portal framework gives the unit operator the ability to make the declaration valid for the unit himself.

New Declaration is Rejected
1) After reviewing the declaration, the dispatcher elects to reject the new declaration and selects that system response. The portal framework provides a list of rejection codes from which the dispatcher can choose. A text field is also provided to allow the dispatcher to make additional comments.
2) Once the rejection code is entered, the portal framework allows the dispatcher to send the rejection, but challenges the "send" in order to force the dispatcher to consider the action.
3) If the challenge is accepted, an alert is sent by the portal framework to the operator to tell him that the dispatcher has rejected the new declaration. If the challenge is not accepted, the portal framework returns step 1, above.
4) The portal framework records the status of the declaration as "rejected."

Cancellation of Pending Declaration is Rejected
1) After reviewing the declaration, the system dispatcher elects to reject the new cancellation and selects that system response. The portal framework provides a list of rejection codes from which the dispatcher can choose. A text field is also provided to allow the dispatcher to make additional comments. The different rejection codes will be discussed in the detailed Functional Specification.
2) Once the rejection code is entered, the portal framework allows the dispatcher to send the rejection, but challenges the "send" in order to force the dispatcher to consider the action.
3) If the challenge is accepted, an alert is sent by the portal framework to the unit operator to tell him that the dispatcher has rejected the cancellation of the declaration. The declaration remains in effect. If the challenge is not accepted, the portal framework returns to course 2, above.
4) The portal framework records the status of the declaration cancellation as "rejected."

Create Instruction

General Preconditions to Creation of Instructions
1) An initial declaration for the current declared capability for each unit will exist.
2) The Unit Operator has been granted access to the portal and rights to accept or reject instructions for his unit.

3) The System Dispatcher has been granted access to the portal and the rights to create modify or cancel instructions. He may also enter reason codes and annotations.
4) Acknowledgement timeout has been set for pending instructions.
5) Accept/reject timeout has been set.
6) Instruction effective time deadband has been configured.
7) Reason codes have been configured (i.e., a list of reasons why the load change is being issued)

Creating of a Load Change Instruction

Basic Course of Events:

1) The System Dispatcher logs in to the portal framework 310 through the portal server 340. This login provides the portal framework with identity information about the dispatcher. For each unit, the portal framework:
   a) Checks for any un-acknowledged declarations that might have been sent by the operators while the dispatcher was not logged into the portal framework. The portal framework alerts the dispatcher if any un-acknowledged declarations exist.
   b) Allows the viewing of all unit declarations and instructions, current pending and historical.
   c) Allows for the creation of a new instruction for each unit.
   d) Gives the dispatcher the ability to amend current unit instructions.
   e) For pending instructions for each unit:
      i) Allows the dispatcher to see the list including status.
      ii) Open a pending instruction for viewing.
         (1) Move into edit mode for this instruction.
      iii) Cancel pending instructions.
   f) The historical view allows the dispatcher to see:
      i) The last 24 hours of effective instructions as default
      ii) Any number of days history
      iii) Items over a particular time range
      iv) Cancelled instructions
2) The Dispatcher chooses the option to create a new instruction for a unit. The portal framework:
   a) Opens the "New" instruction form in edit mode. The following parameters are required to create an instruction:
      i) Starting and Ending Ramp Times
         (1) If the dispatcher chooses to enter the starting ramp time for the load change, the portal framework calculates (and displays) the ending ramp time for the load change based on the currently declared ramp rate and end load.
         (2) If the dispatcher chooses to enter the ending ramp time for the load change, the portal framework calculates (and displays) the starting ramp time for the load change based on the currently declared ramp rate and end load. Note: See Alternate Course if the start time is in the past
         (3) If the dispatcher chooses to start the instruction immediately, the starting ramp time is set to the current date/time and the portal framework calculates (and displays) the ending ramp time for the load change based on the currently declared ramp rate and end load.
      ii) Start Load (defaulted to the "End Load" from the last instruction)
      iii) End Load
      iv) Warmth Category
      v) Reason Code
      vi) Reason Comment Field.
      vii) AGC OFF/ON Option—The OFF option must be selected for a load change instruction.
   b) Validation—When the dispatcher verifies the new instruction, all parameters are validated and any errors are reported to the dispatcher for correction.
   c) Revision Identification—As the dispatcher changes a field, the portal framework indicates this field has been modified
3) Send new instruction—the dispatcher sends this new instruction to the operator. The portal framework challenges this step. The dispatcher accepts the challenge and the portal framework records all the parameters of this instruction and the date/time that the new instruction was sent. The new instruction status is recorded as "Not Acknowledged." Note: See Alternate Course for what happens if the challenge is not accepted.
4) Alert Operator—The portal framework generates an alert on the Unit operator's computer that a new instruction has been created.
5) Acknowledge Receipt of Instruction—The operator goes to the accept/reject instruction list to review the instruction. A message is sent back to the system dispatcher's computer showing that the Unit operator received the new instruction and the portal framework changes the status of the instruction to "Acknowledged". See Alternate Course 3 if the new instruction is not acknowledged by the Unit operator within a specified maximum time.
6) Accept/Reject Instruction—The operator is given a choice to accept or reject the new instruction.
7) Complete "Create Instruction"—Once the operator has accepted the new instruction, the Portal framework:
8) Records "accepted" status of the new instruction. See Alternate Course 4 if the operator rejects the new instruction.
9) Makes the instruction valid for the unit.
10) Sends a message to the system dispatcher that the instruction has been accepted by the unit operator and made valid for the unit.
11) The portal framework allows the system operator to continue creating instructions.

Specific Post Conditions:
1) New instruction status is "Accepted"
2) The new instruction is recorded
3) The unit has a new valid instruction Create AGC Turn On Instruction Basic Course of Events 1) The system dispatcher invokes the ability to set the AGC on for a given unit."

The portal framework opens the form to create an AGC Turn On instruction (based on the current state of AGC).

2) The system dispatcher enters the Date/time to change state of AGC to ON.

The portal framework validates the time against the deadband and provides a means to abort the operation. (see Alternate Course 1—Abort Instruction).

3) The system dispatcher initiates a "Send Instruction". The portal framework challenges the "Send" step.
4) The Dispatcher accepts the challenge. The portal framework:
   a) Records the parameters of this instruction and the date/time the instruction is sent.
   b) Generates an alert on the unit operator's computer that a new instruction has been created.
   c) Records the status of the new instruction as "Not Acknowledged."
5) Acknowledge Receipt of Instruction—The operator reviews this new instruction. A message is sent back to the system dispatcher's computer showing that the operator received the new instruction (acknowledgement). Opening the instruction causes the portal framework to change the status of the instruction to "Acknowledged." See Alternate Course 3 if the new instruction is not acknowledged by the operator within a specified maximum time.
6) Accept/Reject Instruction—The operator is given a choice to accept or reject the new instruction.
7) Complete "Create Instruction"—Once the operator has accepted the new instruction, the portal framework:
   a) Records the "accepted" status of the new instruction. See Alternate Course 4 if the operator rejects the new instruction.
   b) Makes the instruction valid for the unit.
   c) Sends a message to the Dispatcher that the Unit Operator has accepted the instruction.
   d) Records that the message was sent from the unit operator.
8) The portal framework allows the system operator to continue creating instructions Specific Post Conditions:
1) New instruction status is "Accepted"
2) The new instruction is recorded
3) The unit has a new valid instruction.
4) A log of the messaging between the System Dispatcher and the Unit Operator exists.

Alternate Courses of Events:
Abort instruction
The dispatcher can terminate the entry of a new instruction by choosing the reset option to reset all parameters, or by selecting another operation.

Send Challenge not Accepted
If the dispatcher does not accept the send challenge, the portal framework returns to the create instruction page to allow the user to make changes to the instruction or select another operation to perform.

Instruction is not Acknowledged in Time
1) An alert is sent by the portal framework to the dispatcher to tell him that the operator has not reviewed the new instruction.
2) The portal framework resends the alert to the unit operator.
3) The portal framework logs the ack timeout.

Instruction is not Accepted/Rejected in Time by the Operator
1) An alert is sent by the portal framework to the dispatcher to tell him that the operator has not reviewed the new instruction.
2) The portal framework records the status of the accepted/rejected timeout.
3) The portal framework gives the System Dispatcher a window of time to accept or reject the instruction. If the dispatcher takes no action, the portal framework aborts the instruction.

New Instruction is Rejected
1) After reviewing the instruction, the operator elects to reject the new instruction and selects that system response. The portal framework provides a list of rejection codes from which the operator can choose. A text field is also provided to allow the operator to make additional comments. The definition of the rejection codes can be found in the Detailed Functional Specification.
2) Once the rejection code is entered, the portal framework allows the operator to send the rejection, but challenges the "send" in order to force the operator to consider the action.
3) If the challenge is accepted, an alert is sent by the portal framework to inform the dispatcher that the operator has rejected the new instruction
4) The portal framework records the status of the instruction as "rejected."

Start Time is in the Past
A start time in the past is not supported and will be rejected as an error.

General Post Conditions
1) New Instructions have been sent to the Operator
2) Instructions have been recorded along with responses from operator
3) Portal framework is in the View Instructions mode
4) The portal framework is ready to create the next instruction.

Computations of Costs of Deviation from Instructed Performance
Introductory Description In order to continuously compute and monitor the costs of transgressions a number of unit operating calculations need to be performed and stored for retrieval. The market data will be used to calculate the value of the power that is being under- or over-generated during the transgression or deviation events. In order for the Unit Operator to better understand how accurately he is controlling the unit per market demand, the system displays graphical and tabular operating data on the screen.

Each generating unit has an instructed generation output as specified by the System Dispatcher to the Unit Operators. It is the unit operators' job to run the generators to produce the output as closely as possible to the instructed target to avoid transgressions. The system dispatcher changes the instruction throughout the day in response to the needs of the electrical network, requiring that the system keep track of the latest instruction.

As an aid to the unit operators and system dispatchers, a graphical display (FIGS. 5A and 5B) that presents this information will be made available for continuous monitoring of each unit's performance. Additionally, notifications will be sent to the plant operators (and other designated personnel) when a transgression occurs and alarms will be triggered and logged.

Ultimately, the real value of the system is to show the operator how well he is managing the unit load against the instruction. In general, the actual load will be slightly different from the instructed load because there is not a closed loop between the instruction and the load setpoint. The customer deems a certain amount of inaccuracy acceptable. This allowable difference creates an operating boundary around the instructed load called the "Revenue Boundary". There is an upper and lower boundary associated with this deviation and a dollar amount computed.

There is also a second boundary outside of the revenue boundary that is called the Market Boundary. The market boundary is defined by the market operator, not by the power company. If the actual load is between the revenue boundary and the Market Boundary, the operator is running with a "Deviation". When the actual load is outside of the Market Boundary, the operator is in a "Transgression". See, e.g., FIGS. 5A and 5B.

The system will calculate, accumulate and display the cost of each transgression event in order to show the operator the relative impact the events are having on the company revenue. Putting the transgression in terms of dollars allows the operators to relate to the transgressions in terms that everybody can understand.

General Preconditions:
1) The following data is available:
   a) Units' generated output from the Pi Historian
   b) Market pricing data
   c) Upper and Lower Revenue and Market boundaries have been set by an administrator.
   d) The system has been configured with a list of users that need to be notified in the event of a transgression.
   e) The system has been configured to show 30 minutes in the future for trend output. (to show future load change instructions)

Calculate the Cost of Operating Outside of Boundary Limits

Specific Preconditions:
1) The system has been configured to run every 1 second.
2) The system has been configured with a deadband that prevents the generation of numerous notifications (chatter) when the unit output is right on the boundary of a transgression.

Basic Course of Events:
1) The system clock initiates the use case. The system reads:
   a) Instructions the instruction contains a load change.
   b) Current Unit Output—Retrieve unit output from the PI system. This is the generator real power output in megawatts.
      i) Description: Unit Power
      ii) Data Type: Real
      iii) Range: 0-2000.0
      iv) Units: MW (megawatts)
   c) Ramp Rate (from declaration corresponding to the warmth category specified in the instruction and the current unit output moving to the target load).
      Note: The system uses the load target and the ramp rate to calculate the load target trend line for the load display (FIG. 1). The load target is also used by the system to calculate the Market and Revenue Boundaries trend lines.
   d) Market Data
2) Compute the Units Generation Target during transition—In order to calculate the unit generation target during transitions, data is used from the instruction and the declaration. The ramp rates for the specified warmth category are used to construct the trajectory of the target load between the instructed start point and end point. The target will be used as the reference for comparison against the actual output in determining the transgressions, deviations and ultimately lost opportunity costs.
   a) Target power—Using the current instruction, calculate the target power for a configurable period into the future.
   b) Upper and lower revenue boundaries—Using the target power, the system calculates the upper and lower revenue boundaries. The boundaries are calculated for the past and future. The difference between the target and the boundaries is a configurable value designated by the customer. See pre-conditions.
   c) Upper and lower market boundaries—Using the target power, the system calculates the upper and lower market boundaries. The boundaries are calculated for the past and future. The difference between the target and the boundaries is a configurable value designated by the customer.
3) The Unit Generation Output moves outside the revenue boundary. The system performs the performance calculations for each unit:
   a) Output Deviation—if the current unit output is less than the lower revenue boundary or above the upper revenue boundary, calculate the deviation by subtracting the revenue boundary from the current unit output (absolute value) in MW. The output deviation is limited to the market boundary.
   b) Cost of Current Deviation—The cost of the current deviation is calculated by integrating current output deviation over the time that the output is in a deviation and multiplying that energy value by the energy price (MWh times $/MW-hr)
4) The Unit Generation Output moves outside the Market boundary. The system performs the performance calculations for each unit:
   a) Output Transgression—if the current unit output is less than the lower market boundary or greater than the upper market boundary, calculate the output transgression by subtracting the market boundary from the current unit output in MW (absolute value).
   b) Cost of Current Transgression—The cost of the current transgression is calculated by integrating current output transgression over the time that the output is in a transgression and multiplying that energy value by the energy price (MW-hr times $/MW-hr) plus any transgression penalties that might apply.
5) Calculate Total Instructed Output Excursion—the system sums the output deviation and the output transgression in MW that represents the entire over- or under-generation of the unit relative to the revenue boundary.
6) Calculate Total Instruction Excursion Cost—The system sums the cost of the current deviation and the current transgression.
7) The system accumulates the cost of:
   a) Deviations and during
      i) The current shift.
      ii) The previous shift.
      iii) The previous 24 hours.
   b) Transgressions during
      i) The current shift
      ii) The previous shift
      iii) The previous 24 hours
8) When a deviation or transgression begins, the system:
   a) Sends notifications with details of the transgression to all users configured to receive transgression events for this generator. The dialog that appears includes a link to a display showing the ILM output of the Generator.
   b) Logs the deviation and Transgression data (for Load change instructions only)—the data that is captured or calculated above is logged. The system records the raw data that is used in calculating the parameters. The system also records whether or not a notification is sent to any users.
9) Wait for clock (initiating event)

Specific Post Conditions:
1) Boundaries have been calculated and recorded.
2) Deviations and the costs of deviations have been calculated and recorded.
3) Transgressions and the cost of transgressions have been calculated and recorded.
4) The system has recorded all data required for displaying past performance data.
5) The system has calculated the deviation and target summary.
6) Users that have been configured for transgression notifications have been notified.

Display Summary Information

Specific Preconditions:
The operator has been given access to the portal and all information concerning his unit.

Basic Course of Events:
1) Identify Generating Unit—The unit operator opens the portal. The system displays access to all information he has been granted access. The system provides access to the load data for multiple units in the customer's fleet of generators and provides a screen that allows the user to select the generating unit for which he wants to display load information. The system provides the operator with the following choices:
   a) Choose a plant—A list of plants is displayed from which the user can choose. The user chooses his plant of interest.
   b) Choose a unit—Once the plant is chosen, the system displays a list of units within that plant.
2) Display Unit Load Information—. The operator selects the unit for which he wants to view the load information. The system displays graphical and tabular operating data on the screen. In five seconds the screen automatically refreshes with new data and includes the following:
   a) Instruction Summary—All the data fields that comprise the current instruction from the dispatcher are shown in a table. The data displayed includes all the data from the current instruction.
   b) Declaration Summary—All the data that comprises the current declaration for the unit is displayed by the system in a table.
   c) Real-time Unit Performance Summary—The system displays certain real-time performance parameters to allow the operator to evaluate how well he is managing the turbine-generator against the current instructions. The real time data that is displayed includes:
      i) Unit Power Output (MW)
      ii) AGC Status—
      iii) Alarm Status
   d) Deviation and Transgression Summary—The Deviation and Transgression summary provides a tabular summary of the following information.

Description
1 Current Load Target (MW)
2 Current Unit output (MW)
3 Current lower revenue boundary (MW)
4 Current lower market boundary (MW)
5 Current Upper revenue boundary (MW)
6 Current upper market boundary (MW)
7 Current Deviation (MW)
8 Accumulated Cost of current deviation ($)
9 Current Transgression (MW)
10 Accumulated cost of current transgression ($)
11 Total Current Output Excursion (MW)
12 Total Current Output Excursion Cost ($)
13 Accumulated cost of deviations during the current shift ($)
14 Accumulated cost of transgressions during the current shift ($)
15 Accumulated cost of excursion during the current shift ($)
16 Accumulated cost of deviations during the previous shift ($)
17 Accumulated cost of transgressions during the previous shift ($)
18 Accumulated cost of excursion during the previous shift ($)
19 Accumulated cost of deviations during the last 24 hours ($)
20 Accumulated cost of transgressions during the last 24 hours ($)
21 Accumulated cost of excursion during the last 24 hours ($)
22 Transgression indicator—This is a Boolean that provides visual indication there is a current transgression
   e) Plot of the load information—The system displays the unit performance data in a time-based plot with megawatts on the ordinate and time on the abscissa.

The current time is in the horizontal center (approximately) of the chart. The actual unit output is plotted from the left edge of the chart up to the current time. The time before and after the current time that is displayed on the chart is configurable. The other data is charted all the way across the chart. The data that is plotted on the chart includes:
   i) Actual Unit output
   ii) Target output
   iii) Upper market boundary
   iv) Upper revenue boundary
   v) Lower revenue boundary
   vi) Lower market boundary
   f) Shade the chart—the system shades certain areas of the plot to highlight information to the user. These include:
      i) The area between the Upper market boundary and the upper revenue boundary
      ii) The area between the lower revenue boundary and the lower market boundary
      iii) During a transgression, the area between the actual unit output and the upper market boundary
      iv) During a transgressions, the area between the actual unit output and the lower market boundary Specific Post Conditions:
   1) Costs of transgressions are available for display by users of the portal.
   2) A plot exists of the historical data for the output target, the actual output, the revenue boundaries and the market boundaries and shows the current time centered in the plot.
   3) The future output target, the future revenue boundaries and the future market boundaries are plotted on the chart.

General Post Conditions:
   1) Operators can track the performance of their units in relation to given instructions.
   2) Operators will be notified when their unit goes into transgression.
   3) Historical information is available to be analyzed regarding unit performance.
   4) The dollar amount of unit performance can be measured over time.
   5) The system notifies the operators when information needs to be viewed.
   6) Market operators can adjust their instructions to meet the performance of the generators.

Summarize Fleet Performance

Introductory Description

The profitability of the power plants is a function of how well the dispatchers manage and distribute the loads and how well the unit operators follow their loading instructions. A system is required to display Key Performance Indicators (KPI) of the plant performance and profitability to allow the power company management to evaluate how well the units are being dispatched and controlled. By monitoring these KPI's, the power company management can assess which individuals and units are the best performers. The top performers' work methods can be used to train other dispatchers and operators.

Top level managers want to see KPI's displayed on demand for the entire fleet and on a per-unit basis, over various time periods. Graphical trends of this information over these periods are also required.

Each of the KPI's has two types of values that are calculated. One is the instantaneous (or current) value which is a rate calculation. The other type is an accumulated or averaged value over various time periods. This would be analogous to a car's speed and distance traveled.

The Key Performance Indicators include:
1) Coal Capacity Factor (Declared)—shows the percentage of undeclared load (difference between the Name plate and the declared load).
2) Spin Calculated—The approximate amount of available power that can be applied to the grid within ten minutes.
3) Spin Actual—The reserve power calculated by the Southwest Reserve Share Group (SRSG) (10 minute).
4) Forecast Load vs. Actual Load—The difference between what was forecasted by the market analysts and what was actually produced.
5) Curtailment of Units—How much capacity is sitting idle.
6) De-rating of Units—the amount of capital capacity (MW) that cannot or could not be used due to maintenance or other de-rating factors.
7) Commercial Availability—Amount of energy above the spin requirement that is available for commercial use (how much additional energy could be sold).
8) Contribution margin—Revenue—variable cost. (Variable cost=fuel cost*efficiency)

General Preconditions:
The following data is available:
1) Revenue data (Price and cost) has been entered into the system.
2) Forecast energy has been entered into the system.
3) Net Generation
4) Current declaration
5) Current instruction
6) Name Plate
7) Heat Rate Curve (efficiency is calculated from this curve)
8) Spin Actual (from SRSG)
9) KPI Targets General Post Conditions:
The System has provided for both fleet and per unit:
1) Instantaneous KPI's values where applicable.
2) Current hour average of the KPI's.
3) Accumulated values for each KPI for current Day, week, month and year.
4) Trends of all KPI's for the same time periods.
5) Indication of data validity.

Basic Course of Events
Provide a Summary of the KPI's for the Fleet
1) The user logs in to the system through a web portal. The system provides navigation to all the summary KPI's defined for the fleet.\
2) The user selects the summary screens for the fleet KPI's. The system returns for each KPI rolled up for the entire fleet:
   a) The target value of the KPI
   b) The instantaneous value where applicable.
   c) The current hour average value where applicable.
   d) If the KPI is a percentage type then the system returns the average value for the:
      i) Current day
      ii) Current week
      iii) Current month
      iv) Current year
   e) For all others, the sum of the current hour average value and the accumulation of the completed average hours for:
      i) The current day
      ii) Current week
      iii) Current month
      iv) Current year
   f) And for the first KPI (Coal Capacity Factor) in the list a trend of the last sixty minutes of instantaneous values.
3) The user selects another KPI where instantaneous values are applicable.

The system populates the trend with the last 60 minutes of instantaneous values for that KPI (for this scenario, rolled up for the fleet). The system also provides an option to change the time domain of the trend window to current day, current week, current month or current year (non-rolling).
4) The user selects current day. The system populates the trend with the current day's accumulated values for the selected KPI.
5) The user selects another KPI where instantaneous values are not applicable. The system populates the trend with the current day of accumulated values for that KPI.

Provide a Summary of the KPI's for Each of the Generating Units.

From the navigation panel or the fleet summary screen, the user selects KPI summaries for the individual generating units. The system returns the same KPI information as described above for the fleet except for the selected unit.

Update the Displayed KPI's on the User's Request.
1) The user does one of the following:
   a) Opens a page that displays the KPI's (for fleet or units)
   b) Changes a chart time period
   c) Performs a manual update (via a trigger provided by the system)
2) The system:
   a) Refreshes all KPI data on the screen as well as the trend display.
   b) Resets and starts a timer to show the freshness of the screen data.
   c) Refreshes the timer display once a minute.

Display the Fleet Operating Data.
1) The user navigates to the "Current Fleet Operating Summary". The system returns for each generating unit in the fleet live values for:
   a) AGC Status
   b) Declared Capacity
   c) Most recent load change end time
   d) Instructed load (blank if in AGC)
   e) Actual Load
   f) Visual indicator if actual load is above or below the instructed load (off if AGC)
   g) Visual indicator if unit is in transgression or deviation
2) In addition the system displays the following fleet totals:
   a) Declared capacity
   b) Instructed load
   c) Actual Load Alternate Course of Events—Incomplete Data:
Specific Preconditions:
Some inputs are missing or not available
Sequence of Events:
The system identifies one or more of the KPI data fields as invalid.
The system identifies one or more of the KPI data fields are invalid due to missing or unavailable data. Any of the input data that is out-of-date (such as market data) or missing when the system performs a calculation of the data is identified on the display with an indication that the affected KPI data field is invalid.
The system identifies the specific variable and data source The system also provides the user with details (when requested) on which input variable is invalid and the source of the bad variable.

Specific Postconditions
1) The data that was displayed for the user was calculated based on valid and up-to-date inputs
2) Any data that was calculated based on invalid or out-of-date inputs was not shown to the user.
3) The user was able to determine which inputs were invalid

Electronic Dispatch and Logging

Introduction

The Electronic Dispatch and Logging (EDL) application 450 provides the primary interface by which operators and dispatchers can create, amend and cancel instructions and declarations. In this regard the EDL application 450 provides the real-time capability to electronically transmit and capture instructions sent to generating unit operators, and to electronically transmit and capture generating unit declaration changes (unit capacity) sent to system dispatchers.

TABLE I

| Document State Name | Description |
| --- | --- |
| OperationPending | An operation is pending on the document. The document is put in this state when the orchestration begins a Create, Amend or Cancel operation. |
| Accepted | As a result of an operation performed on the document, the document has been accepted. |
| Rejected | As a result of an operation performed on the document, the document has been rejected. |
| Cancelled | As a result of an operation performed on the document, the document has been cancelled. |

Figure 6:
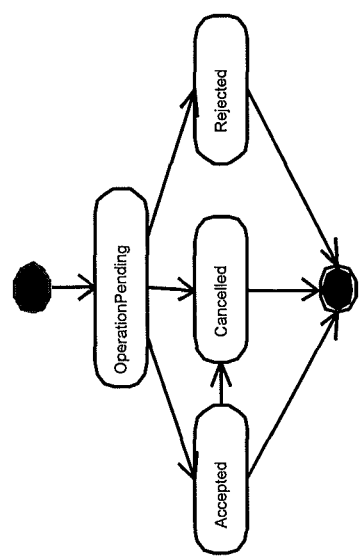
FIG. 6 is a state diagram showing an exemplary manner in which a document moves from one state to the next in connection with operation of an Electronic Dispatch and Logging (EDL) application of the Intelligen application suite.

The state diagram of FIG. 6 shows an exemplary manner in which a document moves from one state to the next.

In the Table II below, the left column in each row shows one of the possible state transition scenarios for an operation. The document state changes that are associated with the operation state changes, are shown in the three right hand columns, according to the type of operation being performed.

TABLE II

| Possible Operation | Resulting Document State Transitions | | |
| --- | --- | --- | --- |
| StateTransition Scenarios | Create Operation | Amend Operation (orig. doc)* | Cancel Operation |
| Unacknowledged Acknowledged Accepted | Prior state: None Operation Pending Operation Pending Accepted | Prior state: Accepted Operation Pending Operation Pending Cancelled | Prior state: Accepted Operation Pending Operation Pending Cancelled |
| Unacknowledged Acknowledged Rejected | Prior state: None Operation Pending Operation Pending Rejected | Prior state: Accepted Operation Pending Operation Pending Accepted | Prior state: Accepted Operation Pending Operation Pending Accepted |
| Unacknowledged Acknowledged ForceAcceptPending OperationAborted | Prior state: None Operation Pending Operation Pending Operation Pending Rejected | Prior state: Accepted Operation Pending Operation Pending Operation Pending Accepted | Prior state: Accepted Operation Pending Operation Pending Operation Pending Accepted |
| Unacknowledged Acknowledged ForceAcceptPending AcceptedBySender | Prior state: None Operation Pending Operation Pending Operation Pending Accepted | Prior state: Accepted Operation Pending Operation Pending Operation Pending Cancelled | Prior state: Accepted Operation Pending Operation Pending Operation Pending Cancelled |
| Unacknowledged ForceAcceptPending OperationAborted | Prior state: None Operation Pending Operation Pending Rejected | Prior state: Accepted Operation Pending Operation Pending Accepted | Prior state: Accepted Operation Pending Operation Pending Accepted |
| Unacknowledged ForceAcceptPending AcceptedBySender | Prior state: None Operation Pending Operation Pending Accepted | Prior state: Accepted Operation Pending Operation Pending Cancelled | Prior state: Accepted Operation Pending Operation Pending Cancelled |

In the exemplary embodiment the EDL application 450 primarily pertains to the creation and management of instructions for unit operators and of declarations of unit capability for system dispatchers. For both instructions and declarations, the EDL application 450 supports viewing the currently active instruction or declaration, pending instructions or declarations, and instruction and declaration history. The EDL application 450 also supports querying instruction and declaration history, creating new instructions and declarations, amending instructions and declarations, and canceling instructions and declarations.

The EDL application 450 maintains two types of documents; namely, declarations and instructions. Each document is assigned a unique numeric identifier. At any point in time, a document will be in one of the states represented in Table I:

*Amend Operation document states are for the document being amended, not the new document that will contain the amended information. The new document state changes are the same as those indicated for a Create Operation.

Operations

Operations & Operation States

In the exemplary embodiment three different operations may be performed upon a document:

Create: Create a new document

Cancel: Cancel an existing document

Amend: Amend an existing document.

At any point in time, an operation will be in one of the states shown in Table III.

TABLE III

| State Name | Description |
| --- | --- |
| Unacknowledged | The operation has not yet been acknowledged. This is the initial state of any operation. |
| Acknowledged | The recipient has acknowledged the operation (i.e. recipient has viewed the document on the Accept/Reject page). |
| ForcedAcceptPending | The recipient did not accept or reject the operation within the allotted time. The sender is given the opportunity to force the accept of the operation. |
| Accepted[1] | The operation has been accepted by the recipient. |
| Rejected[1] | The operation has been rejected by the recipient. |
| OperationAborted[1] | The operation has been aborted by the system. |
| AcceptedBySender[1] | The operation has been accepted by the sender. |

[1]This is a terminal state for an operation

Figure 7:
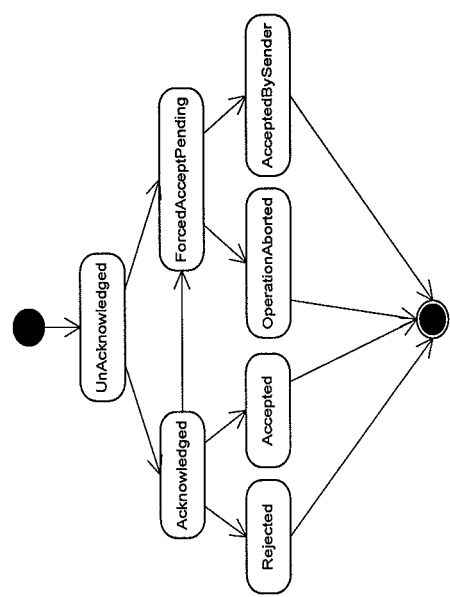
FIG. 7 shows an exemplary manner in which an operation with respect to such a document moves from an initial state to a terminal state.

The state diagram of FIG. 7 shows how an operation must move from an initial state to a terminal state. For example, an operation must reach the acknowledged state before it can move to the accepted or rejected state. The BizTalk orchestration ensures that the state promotion rules are followed and the right action is taken when the state changes.

Operation Decision Table

The operation decision table of FIG. 8 defines operations that can be performed on a document by operators or dispatchers, given a specific operation and document states. An operation is valid if all checked (√)) conditions in the applicable row are true.

Data Sources for EDL Pages

In the exemplary embodiment the EDL application 450 defines five categories of instructions and declarations: Unaccepted, Pending, Current, Expired, and Declined. In this regard the EDL application 450 may define user interface pages that list instructions and declarations in one or more of the following categories:

Unaccepted Instructions & Declaration Page (accessed from Welcome page)
  Unaccepted Instructions
  Unaccepted Declarations
  Pending Instructions Page
  Pending Instructions
  Current Instruction
  Instruction History Page
  All instruction categories within a specified time frame
  Pending Declarations Page
  Pending Declarations
  Current Declaration
  Declaration History Page
  All declaration categories within a specified time frame In all cases, the instruction rows on the page are sorted in Start Time descending order, and the declaration rows are sorted in descending Effective Time order. In addition, the rows are highlighted according to the category of the instruction or declaration (see section 2.1 in the functional specification).

As shown in the table depicted in FIG. 9, there is a specific data source and selection criteria for each category of instruction and declaration. In all cases, the information that appears in a row is associated with the most recent operation state for the instruction or declaration.

The first column in each row contains a hyperlink to a page where the user can perform whatever operation is permitted for the selected instruction or declaration. The table on the next page indicates which operations are permitted for each category of instruction or declaration. As shown, some operations need to be qualified according to the user's role and current operation state.

Graphical User Interface

Figure 10:
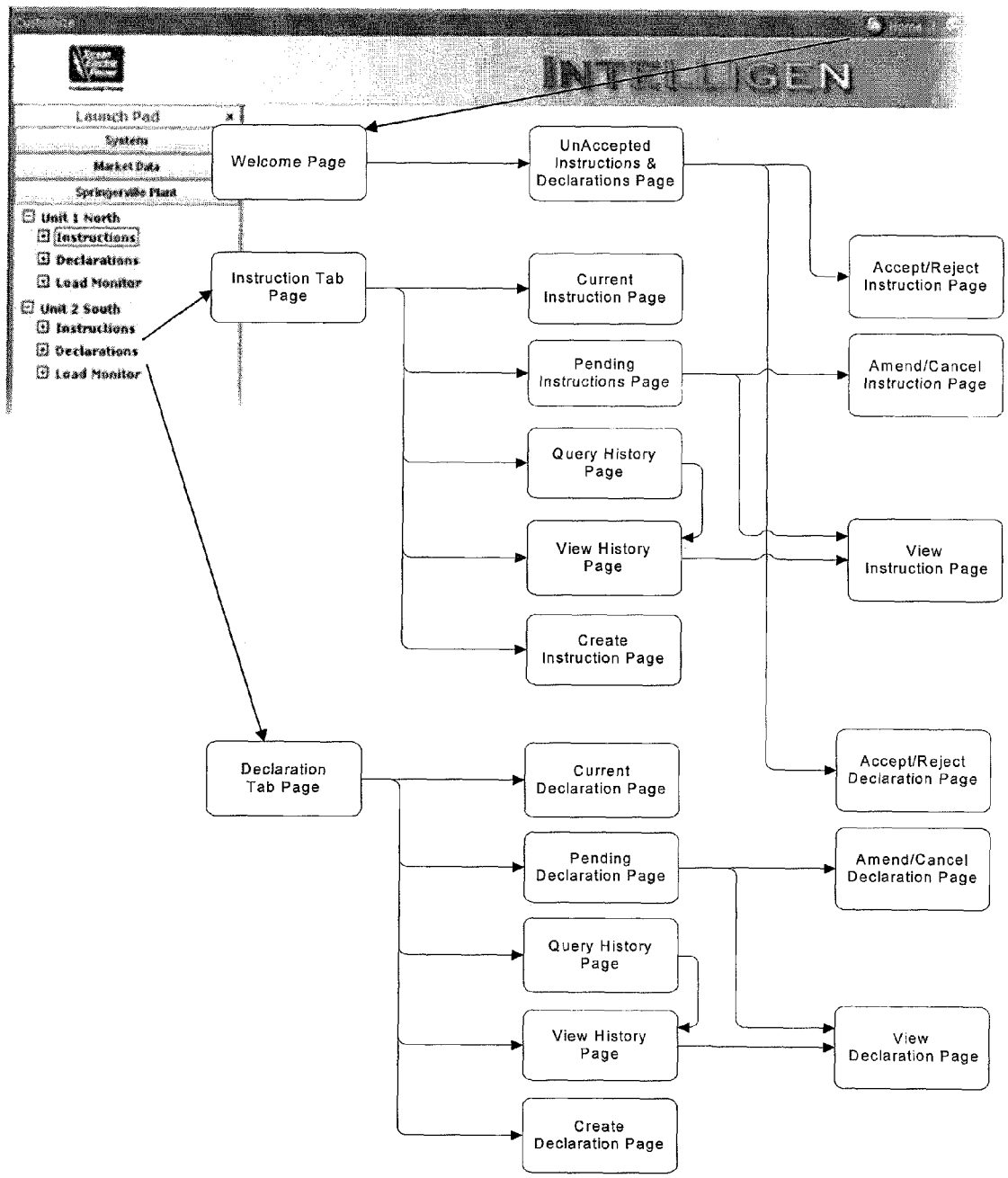
FIG. 10 illustrates a portion of an exemplary interface presented by an Intelligen browser client upon which is superimposed a tree-based navigation diagram.

Turning now to FIG. 10, there is illustrated a portion of an exemplary interface presented by a browser client 330 upon which is superimposed a tree-based navigation diagram. This diagram illustratively represents the manner in which a user may navigate among the various pages generated by the portal framework 310.

Figure 11:
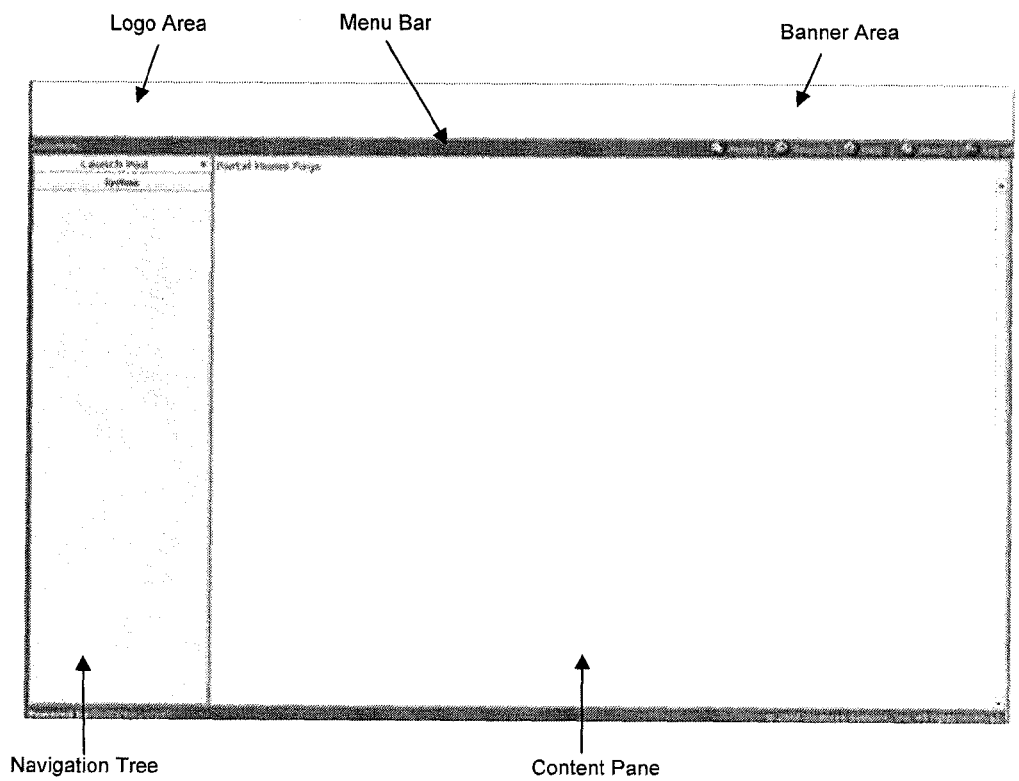
FIG. 11 depicts an exemplary layout of a web page defining a user interface of the Intelligen application suite.

As was mentioned above, the portal server 340 hosts a suite of applications which may be collectively referred to as the "Intelligen System" or, equivalently, as the "Intelligen Application Suite". An exemplary layout of a web page of the Intelligen System defining a user interface is depicted in FIG. 11. The behavior of the navigation tree and the pages that will appear in the content pane are shown and detailed in the following sequence of figures.

Navigation Tree

Figure 12:
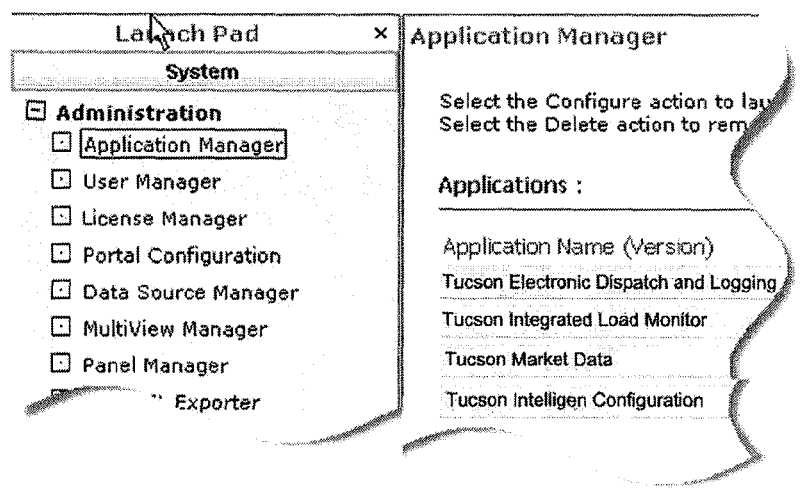
FIG. 12 shows a view presented by a browser client through a system administrator may utilized an Application Manager to configure the Intelligen System.

Referring to the user interface of FIG. 12 generated by a browser client 330, the Application Manager allows the system administrator to configure the Intelligen System. Configuration is typically done when the Intelligen System applications are installed or when the units configured in the ArchestrA Galaxy Repository have changed.

Figure 13:
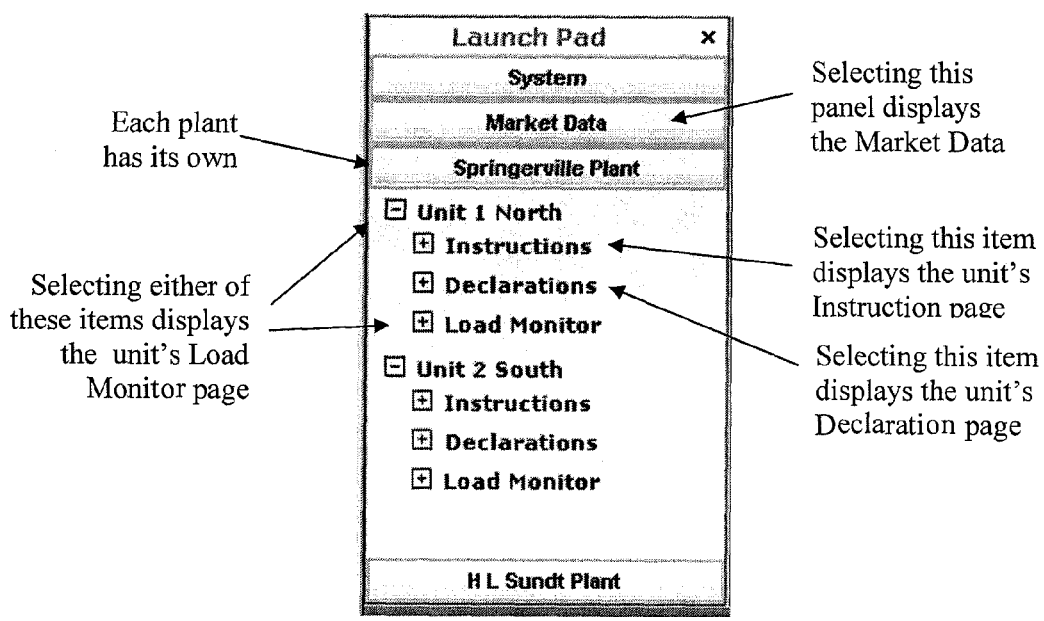
FIG. 13 depicts, for a particular plant, a panel listing the generating units in the plant and options for viewing the applicable Instruction pages, Declaration pages, Load Monitor page.

As shown in FIG. 13, each plant has its own panel in the navigation tree. The panel list the generating units in the plant. Under each unit options are listed to view the Instruction pages, Declaration pages, Load Monitor page. The EDL application provides the functionality in the Instruction and Declaration pages.

Welcome Page

Figure 14:
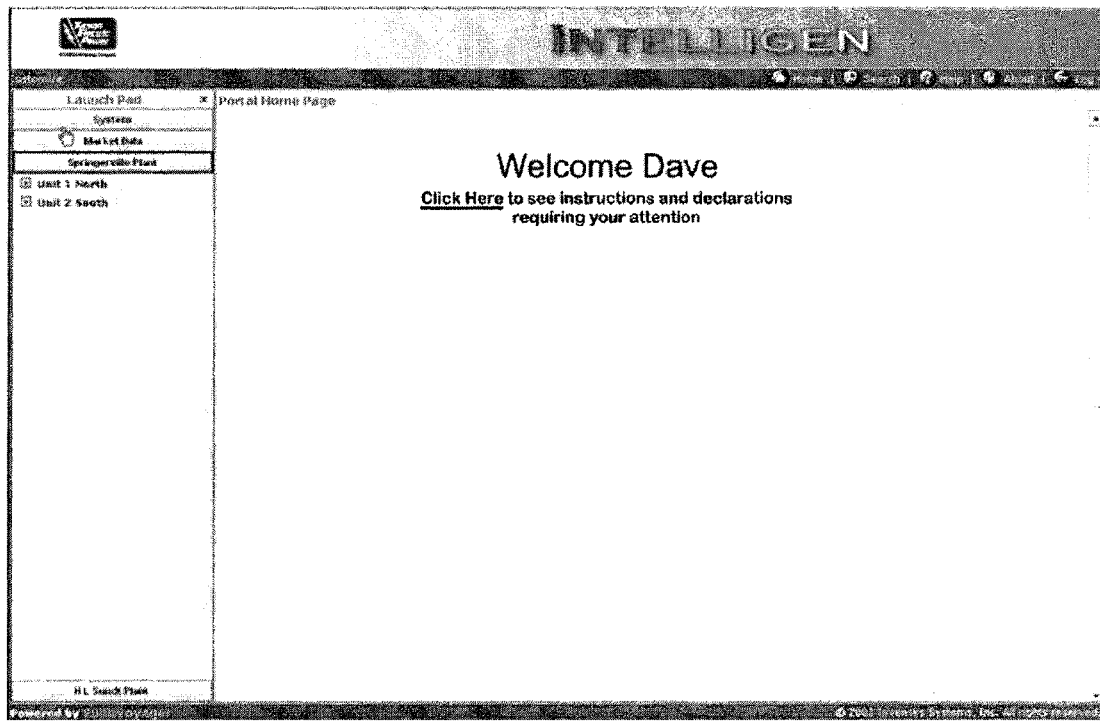
FIG. 14 depicts a default home page of a user, such as "Welcome User" page, generated upon installation of the Intelligen System is installed.

When the Intelligen System is installed, it generates a default home page of the user, such as the "Welcome User" page depicted in FIG. 14. The user interface defined by this page simply welcomes the user and provides a hyperlink to a the Unaccepted Instructions and Declarations Page (FIG. 15), which contains a list of instructions and declarations that need to be accepted or rejected by the user.

Unaccepted Instructions and Declarations Page

Figure 15:
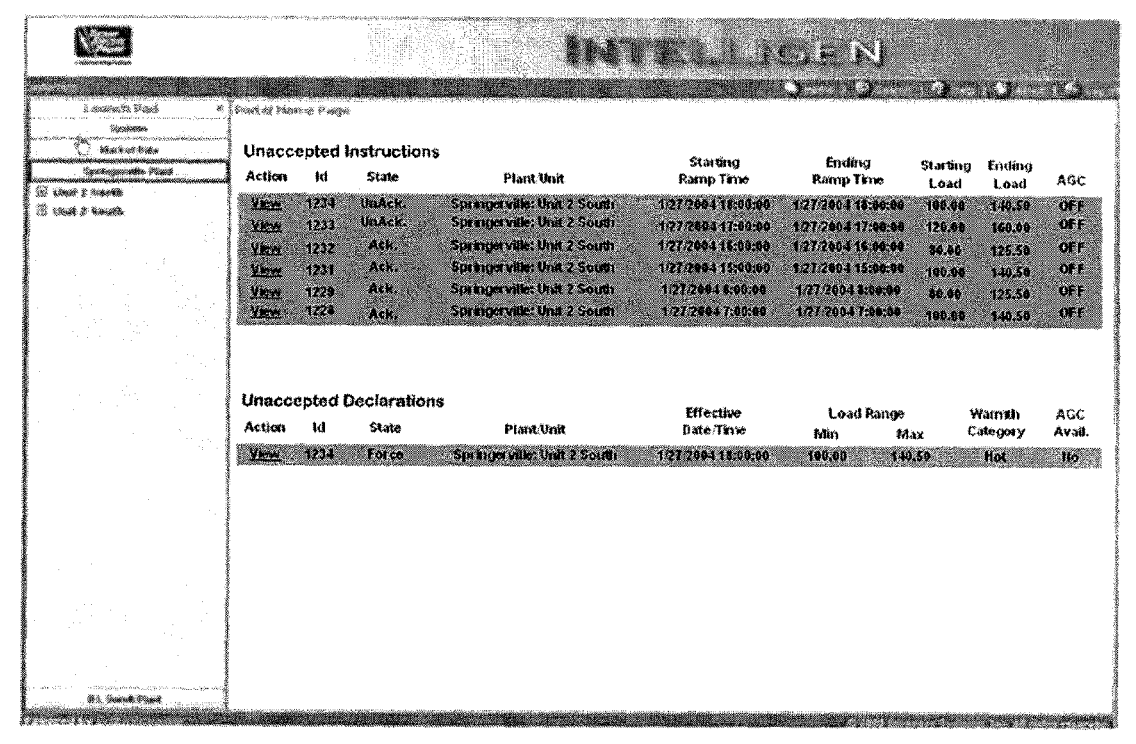

Referring to the user interface defined by the Unaccepted Instructions and Declarations Page of FIG. 15, there are shown all instructions and declaration that need to be accepted or rejected by the current user.

If Operator Logged On

The Unaccepted Instructions table lists all instructions that require an Accept/Reject action by the operator. These are instructions that have an operation state of "Unacknowledged" or "Acknowledged" and are for all units assigned to the operator.

The Unaccepted Declarations table lists all declarations that require an Accept/Reject action by the operator. These are declarations that have an operation state of "ForcedAcceptPending". The list is for all units assigned to the operator.

If Dispatcher Logged On

The Unaccepted Instructions table lists all instructions that require an Accept/Reject action by the dispatcher. These are instructions that have an operation state of "ForcedAcceptPending". All units configured in the system are included.

The Unaccepted Declarations table lists all declarations that require an Accept/Reject action by the dispatcher. These are declarations that have an operation state of "Unacknowledged" or "Acknowledged". All units configured in the system are included.

If user is not a dispatcher or operator, the lists are empty.
The list is sorted in descending start date/time order.
Color coding is applied to each row depending on state.
When the user clicks the "View" hyperlink in the first column of the Unaccepted Instructions table, the portal displays the Accept/Reject Instruction page.

When the user clicks the "View" hyperlink in the first column of the Unaccepted Declarations table, the portal displays the Accept/Reject Declaration page.

Instruction Pages

Current

Figure 16:
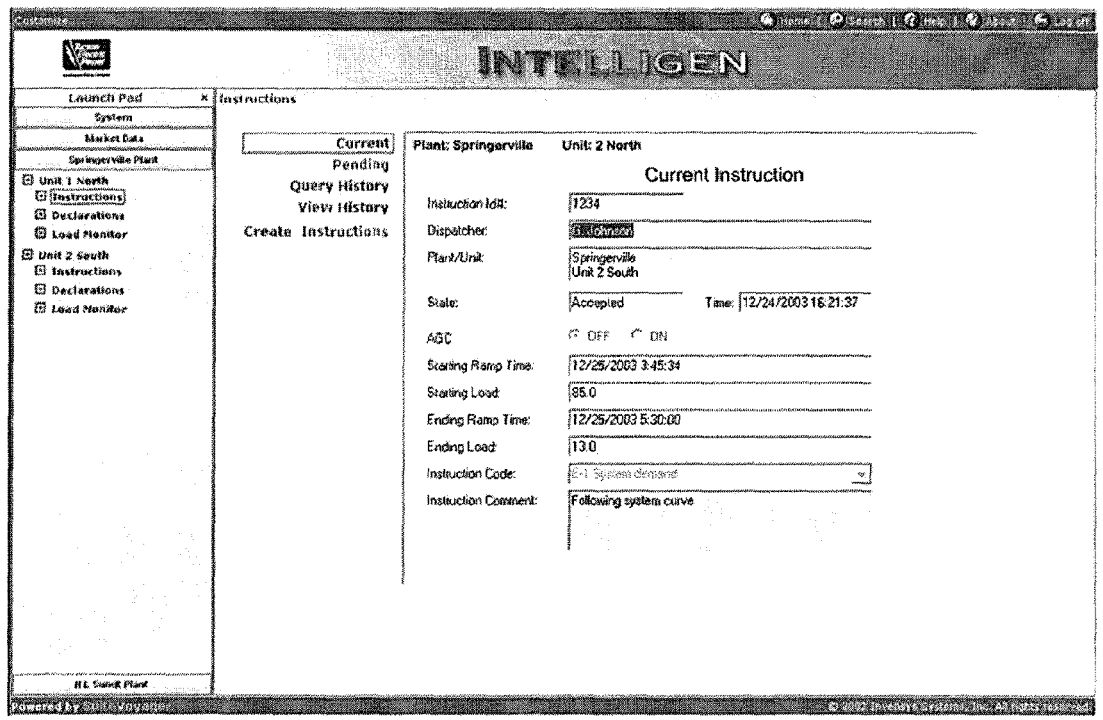
FIG. 16 illustrates an exemplary current instruction user interface presented as a web page by the browser client.

FIG. 16 illustrates an exemplary current instruction user interface presented as a web page by the browser client 330. Referring to the exemplary user interface of FIG. 16, the current instruction page is a read only page that displays the instruction currently in effect in the generation unit.

DATA SOURCE: The Unit Object. Use LMX to get the current instruction from the unit object.

The "State" field reflects the most recent operation state of the instruction and the associated time field is the time that it went to that state.

Pending

Figure 17:
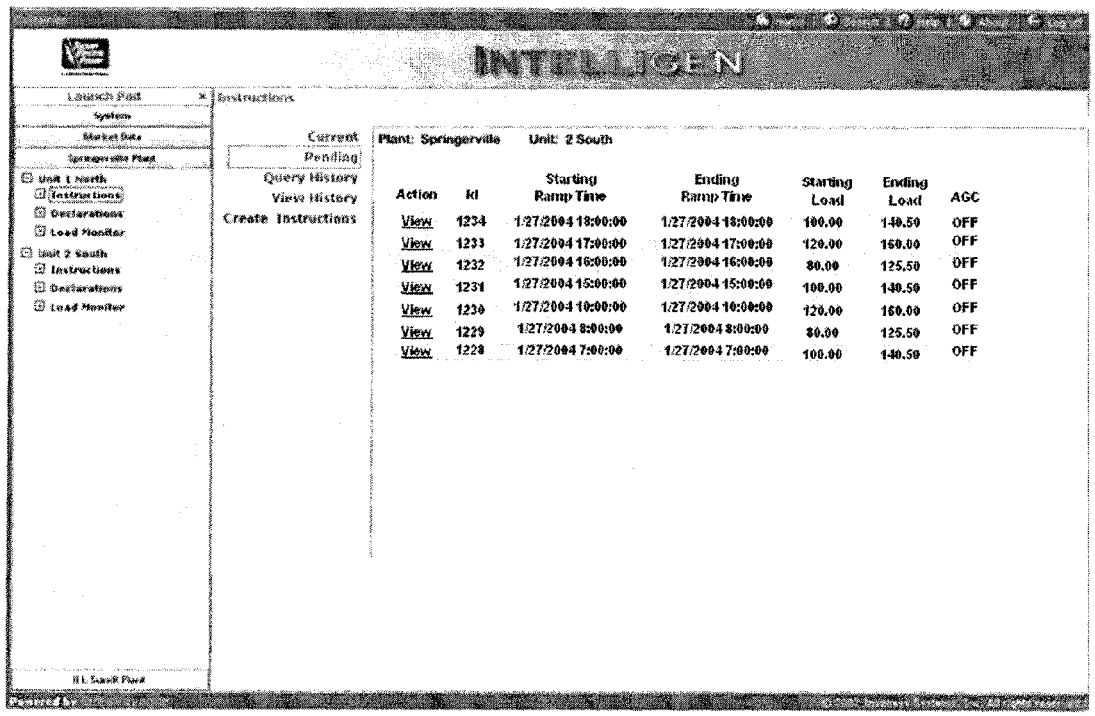
FIG. 17 comprises a user interface in the form of a web page which lists the current and pending instructions for a selected unit.

FIG. 17 comprises a user interface in the form of a web page which lists the pending instructions for the selected unit. It also shows the current instruction on the bottom row DATA SOURCE: The Unit Object. Use LMX to get the pending instructions and the current instruction from the unit object.

The list of instructions is sorted in descending start date/time order.

Color coding is applied to each row depending on state.

When the user clicks the "View" hyperlink in the first column of a row, the portal displays one of the following pages:

If the instruction is not current and the operation state is "Accepted", the Amend/Cancel Instruction Page is displayed.

If the instruction is the current instruction, the View Instruction Page is displayed.

Query History

Figure 18:
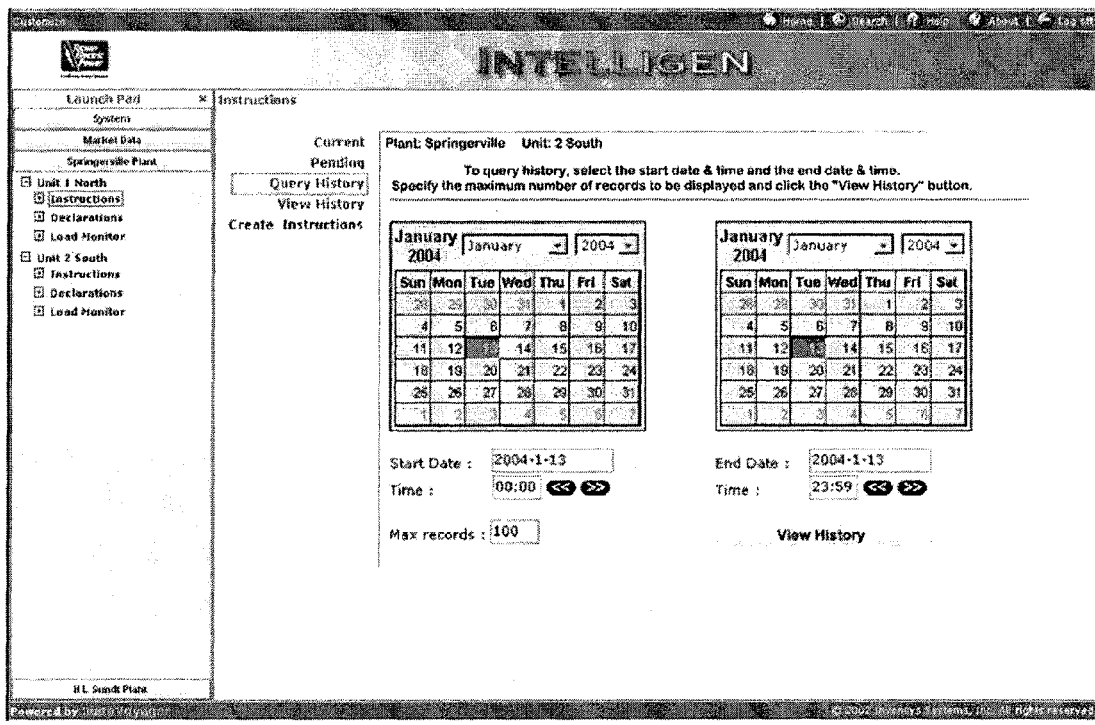
FIG. 18 depicts a user interface providing a front end to a "View History" page.
Figure 19:
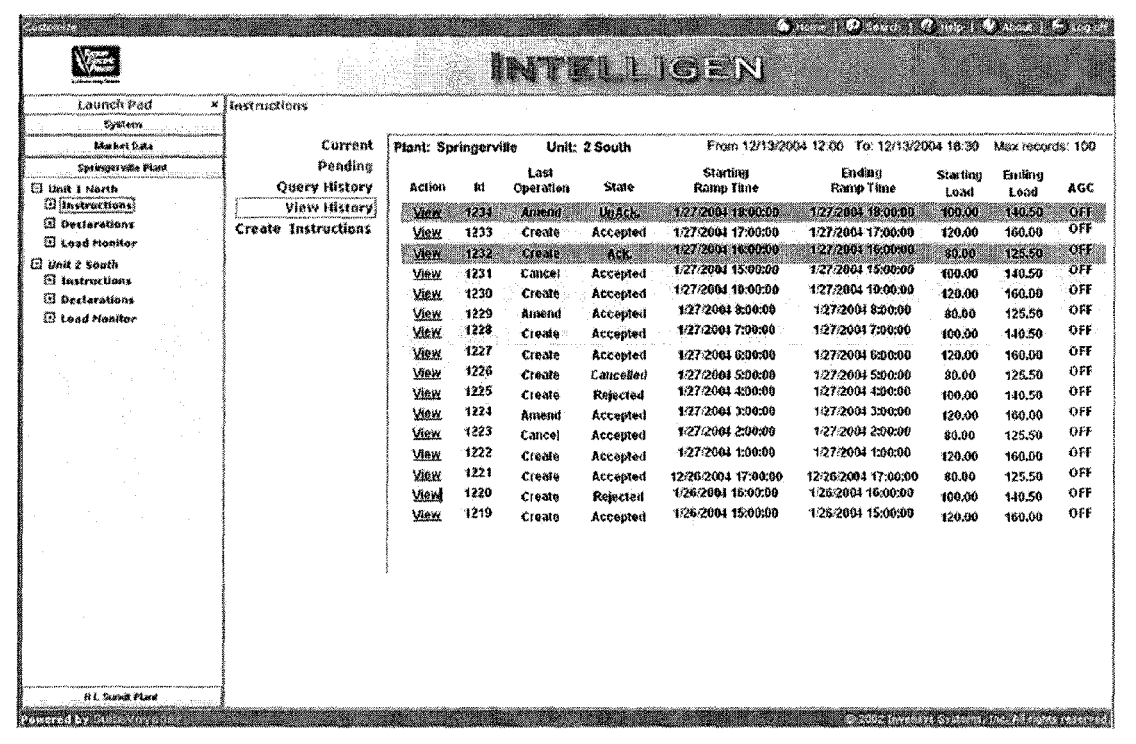

FIG. 18 depicts a user interface providing a front end to a "View History" page (FIG. 19). Normally, when the view history page is invoked all instructions in history are displayed. The Query History page allows the user to specify a time period and a maximum number of instructions to be displayed.

When the user clicks the "View History" button, the View History page is invoked with the start time, end time and maximum number of records specified by the user.

View History

The View History page depicted in FIG. 19 displays a list of all instructions that have been entered into the system.

Only the most recent operation and state is listed for each instruction.

DATA SOURCE: 1) Datastore for instruction history. 2) Unit object for determining which instruction in the list is current (use LMX to get the unit's current instruction).

By default the page shows a maximum of 100 instructions for the last 24 hours. The user can go to the Query History page if a different time range is desired, Color coding is applied to each row depending on state.

Color Criteria

Category

Unaccept Unacknowledged, Acknowledged, ed ForcedAcceptPending

Pending (Accepted—or—AcceptedBySender) & StartTime>Now( )

Current Id matches the id of current instruction in unit object

Expired/(Accepted—or—AcceptedBySender) & StartTime Declined<=Now( )
—or—Rejected—or—OperationAborted The "From", "To" and "Max records" field in the top margin, provide the start date/time of the oldest instruction, start date/time of the newest instruction, and the maximum number for records to be displayed.

When the user clicks the "View" hyperlink in the first column of a row, the View Instruction page is displayed.

Create Instructions

Figure 20:
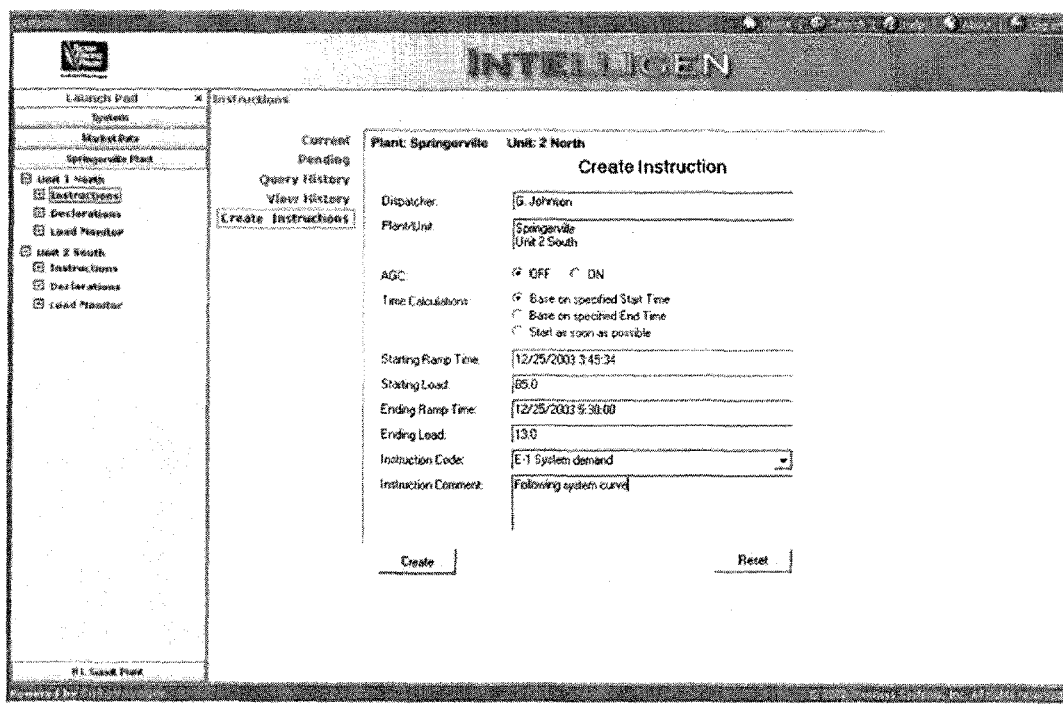
FIG. 20 shows a user interface that is presented upon selection of a "Create Instructions" tab.

When the "Create Instructions" tab is selected, the user interface of FIG. 20 is presented and the create page instruction fields are initialized as follows:

AGC—set to OFF

Time Calculation—set to "Base on specified start time"

Starting Ramp Time—set to Ending Ramp Time from the current instruction for unit Ending Ramp Time—set to empty Starting Load—set to empty and disabled (it is calculated by validation component)

Ending Load—set to empty

Instruction code—set to no selection

Instruction Comment—set to empty

If there is no current instruction, the following default values are used.

AGC—set to OFF

Time Calculation—set to "Start as soon as possible"

Starting Ramp Time—set to empty

Ending Ramp Time—set to empty

Starting Load—set to empty and disabled (it is calculated by validation component)

Ending Load—set to empty

Instruction code—set to no selection

Instruction Comment—set to empty

Time Calculation Options:

If "Base on specified Starting Ramp Time" is selected, Ending Ramp Time field should be disabled and set to empty.

If "Base on specified Ending Ramp Time" is selected, Starting Ramp Time field should be disabled and set to empty.

If "Start as soon as possible", Starting and Ending Ramp Time fields should be disabled and set to empty.

If AGC is set to "ON", all fields except the Starting Ramp Time should be disabled and set to empty (we don't want to leave values that appear real but aren't used).

When the user clicks the "Create" button, the instruction is validated (see Validation)

Figure 21:
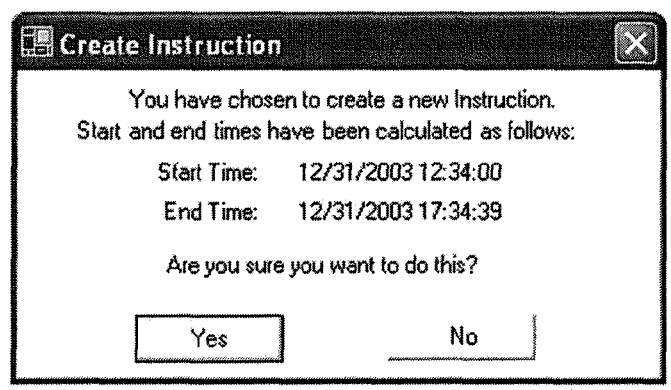
FIG. 21 shows a Create Instruction Challenge Dialog that is displayed subsequent to selection of the Create Instructions tab.

If validation is successful the Create Instruction Challenge Dialog (FIG. 21) is displayed.

On a "No" return from the dialog, no action is taken and the create page remains displayed.

On a "Yes" return from the dialog the Orchestration is called to process the create request.

If the call to the Orchestration is successful, a dialog is displayed notifying the user of this fact and upon return from this dialog the create page is re-initialized in preparation for another instruction to be created.

If the call to the Orchestration is not successful, the appropriate error is reported to the user (see Error Reporting). No action is taken and this page remains displayed.

If the validation is not successful the appropriate errors are reported to the user (see Error Reporting). No action is taken and this page remains displayed.

If the user clicks the "Reset" button the fields are restored to their original initialized values.

If the user clicks the "Close" button the user is returned to the previous page.

Declaration Pages

Current

Figure 22:
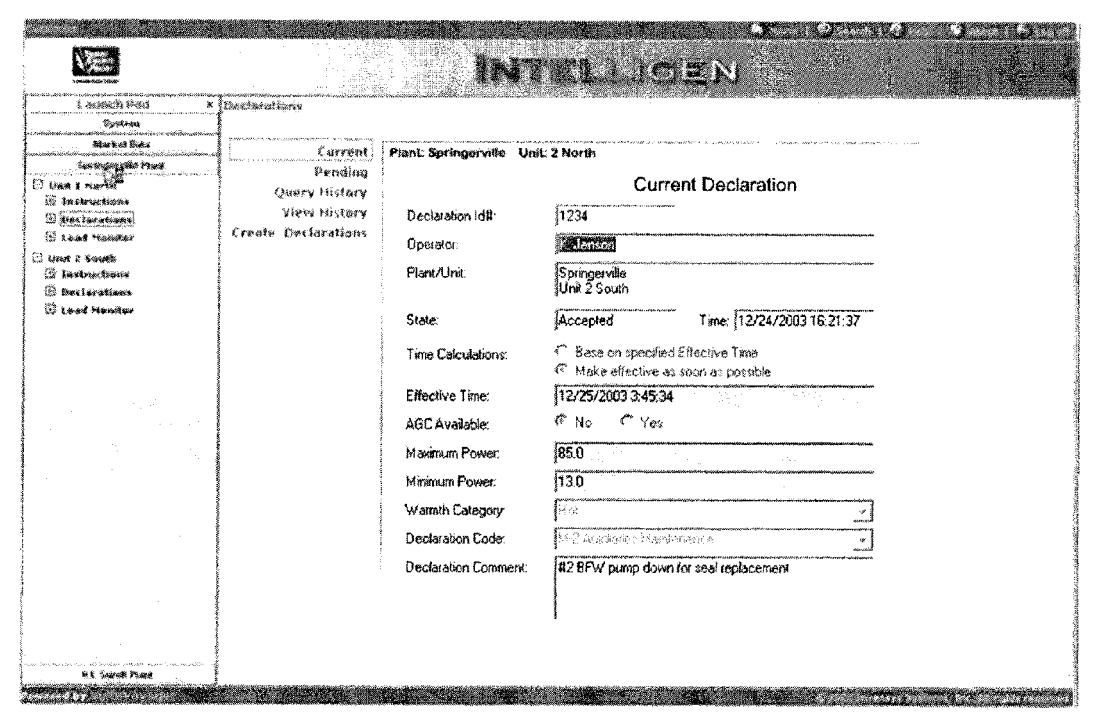

The current declaration page (FIG. 22) is a read only page that displays the declaration currently in effect in the generation unit.

DATA SOURCE: The Unit Object. Use LMX to get the current declaration from the unit object.

The "State" field reflects the most recent operation state of the declaration and the associated time field is the time that it went to that state.

Pending

Figure 23:
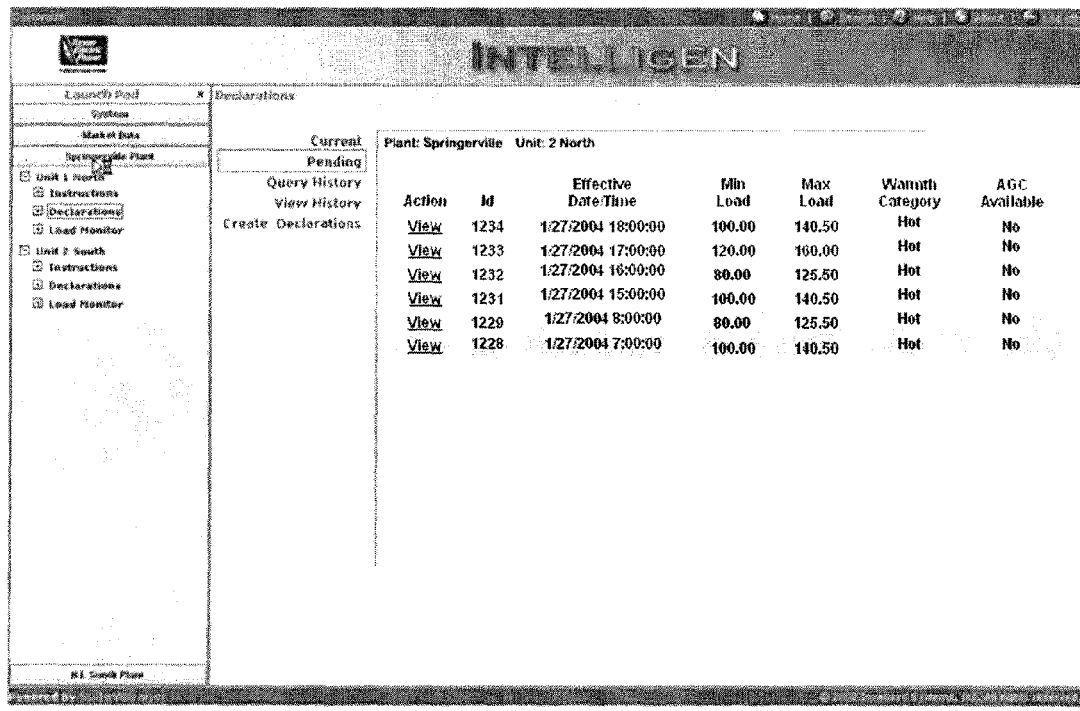
FIG. 23 shows a user interface which lists the current and pending declarations for the selected unit.

FIG. 23 shows a user interface which lists the pending declarations for the selected unit. It also shows the current declaration on the bottom row.

DATA SOURCE: The Unit Object. Use LMX to get the pending declarations and the current declaration from the unit object.

The list of declarations is sorted in descending start date/time order.

Color coding is applied to each row depending on state.

When the user clicks the "View" hyperlink in the first column of a row, the portal displays one of the following pages:

If the declaration is not current and the operation state is "Accepted", the Amend/Cancel Declaration Page is displayed.

If the declaration is the current instruction, the View Declaration Page is displayed.

Query History

Figure 24:
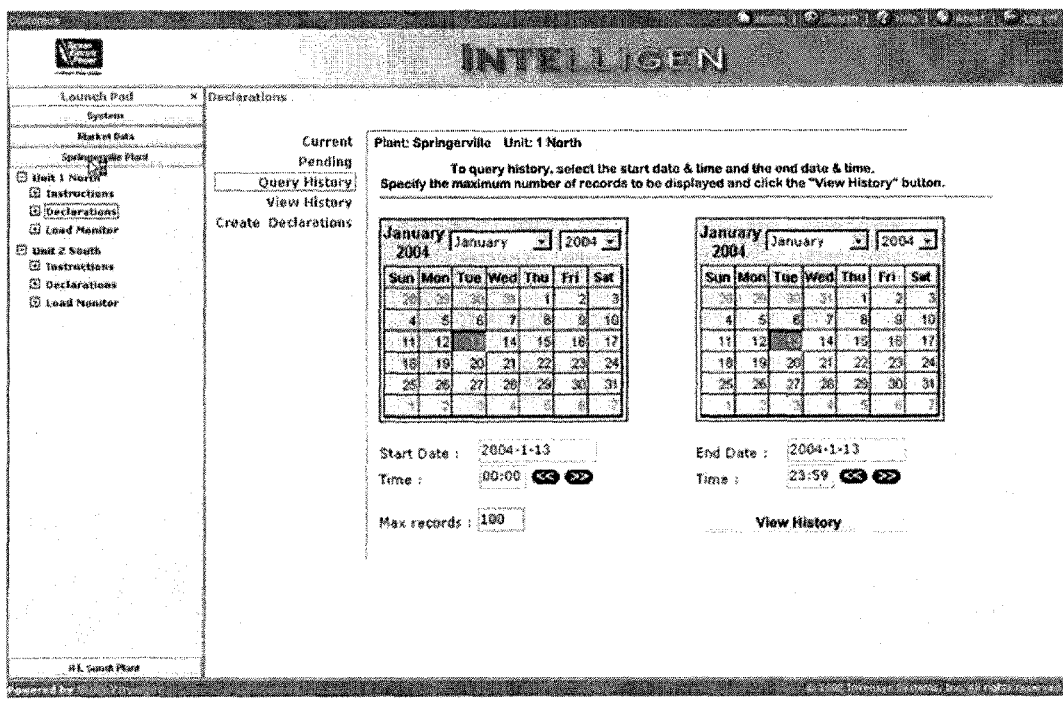
FIG. 24 depicts a user interface defining a "Query History" page, which serves as a front end to a "View History" page and through which a user may specify a time period and a maximum number of declarations to be displayed.
Figure 25:
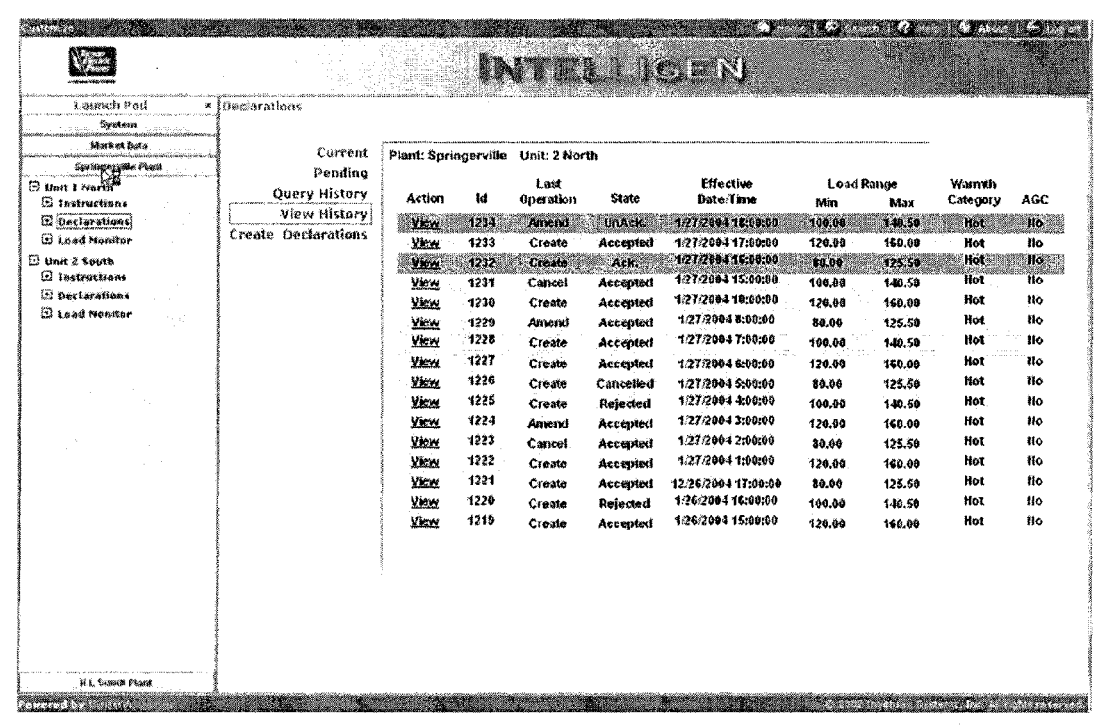

FIG. 24 depicts a user interface defining a "Query History" page, which serves as a front end to a "View History" page (FIG. 25). Normally, when the View History page is invoked all declarations in history are displayed. The Query History page of FIG. 24 allows the user to specify a time period and a maximum number of declarations to be displayed.

When the user clicks the "View History" button, the View History page is invoked with the start time, end time and maximum number of records specified by the user.

View History

The user interface defined by the View History page of FIG. 25 displays a list of all declarations that have been entered into the system.

Only the most recent operation and state is listed for each declaration.

DATA SOURCE: 1) Datastore for declarations history. 2) Unit object for determining which declaration in the list is current (use LMX to get the unit's current declaration).

By default the page shows a maximum of 100 declarations for the last 24 hours. The user can go to the Query History page if a different time range is desired, Color coding is applied to each row depending on state.

Color Criteria

Category

Unaccept Unacknowledged, Acknowledged, ed ForcedAcceptPending

Pending (Accepted—or—AcceptedBySender) & StartTime>Now( )

Current Id matches the id of current declaration in unit object

Expired/(Accepted—or—AcceptedBySender) & StartTime Declined<=Now( )
—or—Rejected—or—OperationAborted The "From", "To" and "Max records" field in the top margin, provide the start date/time of the oldest declaration, start date/time of the newest declaration, and the maximum number of records to be displayed.

When the user clicks the "View" hyperlink in the first column of a row, the View Declaration Page is displayed.

Create Declaration

Figure 26:
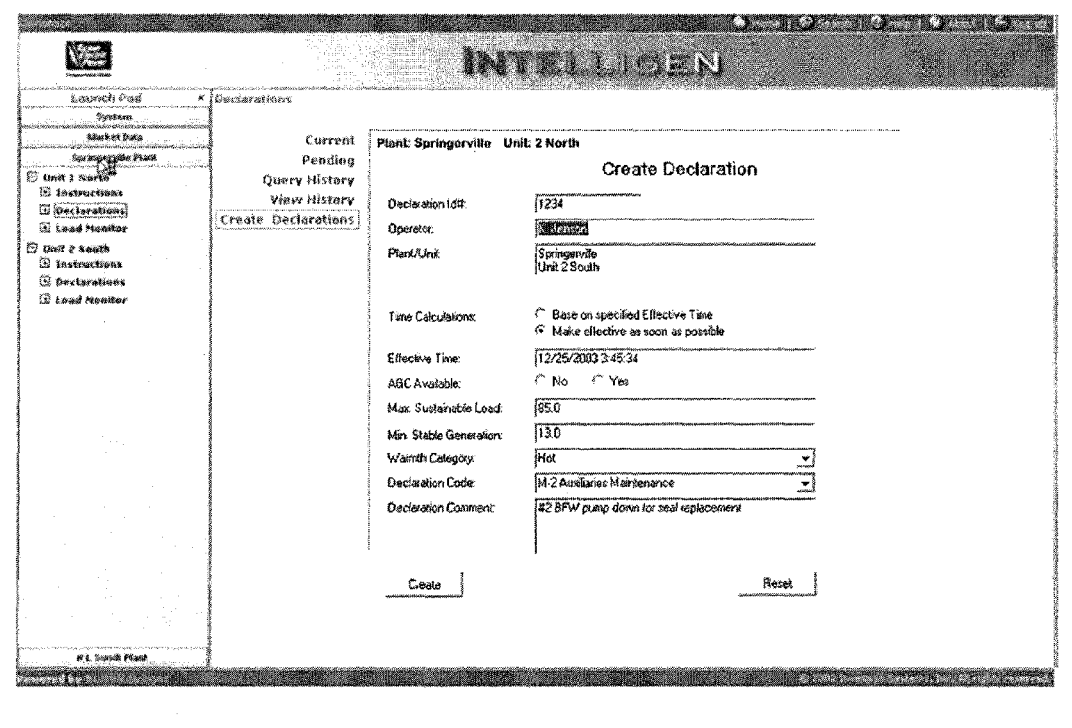

When the "Create Declarations" tab is selected (FIG. 26), the create page declaration fields are initialized as follows:

Time Calculation—set to "Make effective as soon as possible"

Effective Time—set to empty

AGC Available—set to value in current declaration for unit

Maximum Sustainable Load—set to value in current declaration for unit

Minimum Stable Generation—set to value in current declaration for unit

Warmth Category—set to value in current declaration for unit

Declaration Code—set to value in current declaration for unit

Declaration Comment—set to empty

When the user clicks the "Create" button, the declaration is validated.

Figure 27:
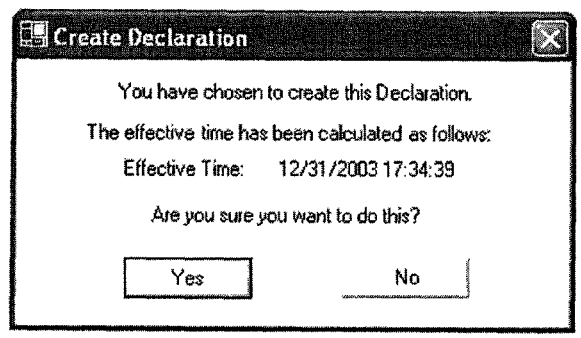
FIG. 27 shows a Create Declaration Challenge Dialog displayed subsequent to selection of the Create Declarations tab.

If validation is successful the Create Declaration Challenge Dialog is displayed (FIG. 27).

On a "No" return from the dialog, no action is taken and this page remains displayed.

On a "Yes" return from the dialog the Orchestration is called to process the create request.

If the call to the Orchestration is successful, a dialog is displayed notifying the user of this fact and upon return from this dialog the create page is re-initialized in preparation for another declaration to be created.

If the call to the Orchestration is not successful, the appropriate error message is reported to the user. No action is taken and this page remains displayed.

If the validation is not successful the appropriate errors are reported to the user. No action is taken and this page remains displayed.

If the user clicks the "Reset" button the fields are restored to their original initialized values.

If the user clicks the "Close" button the user is returned to the previous page.

Utility Pages

Accept/Reject Instruction Page

Figure 28:
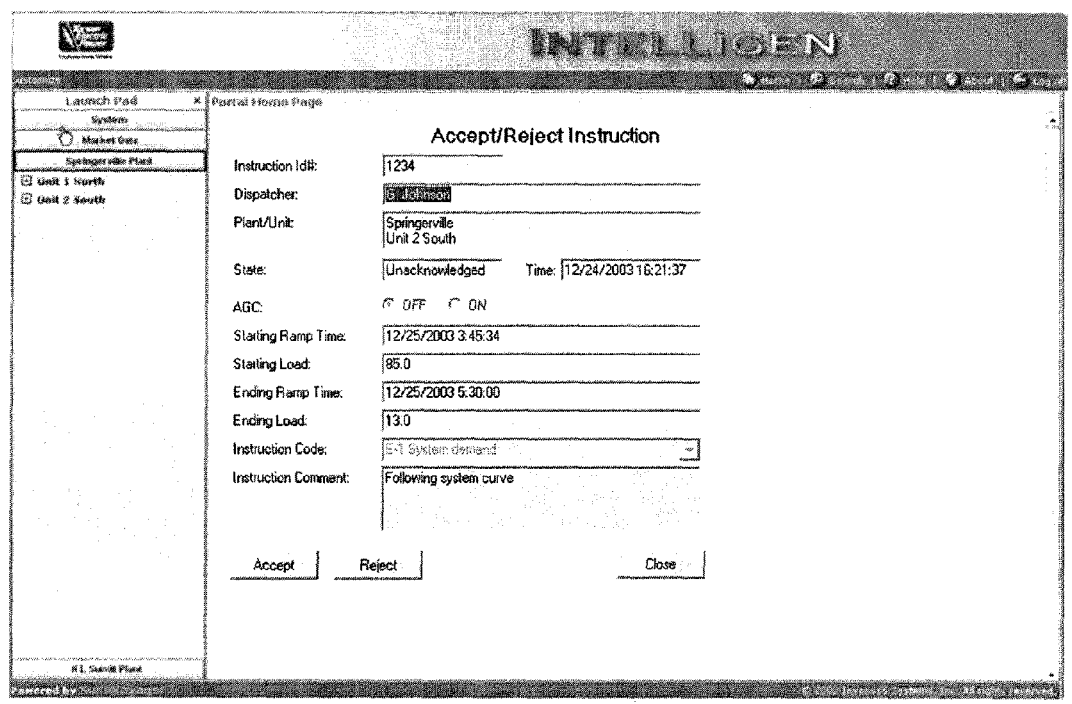
FIG. 28 depicts an Accept/Reject Instruction Page.

The fields on this page (FIG. 28) are read only and are initialized from the instruction document specified by the caller (Instruction Id#).

The "State" field reflects the most recent operation state of the instruction and the associated time field is the time that it went to that state.

Figure 29:
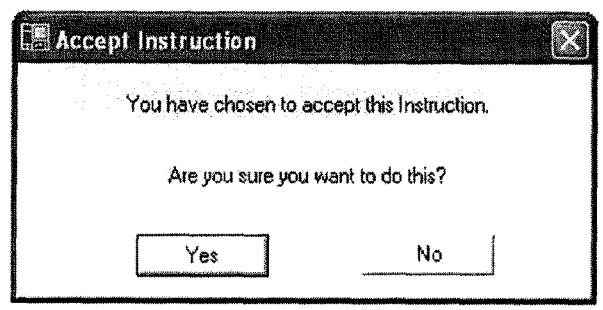
FIG. 29 depicts an Accept Instruction Challenge Dialog displayed upon selection of an Accept button of the Accept/Reject Instruction Page.

If the user clicks the "Accept" button, the Accept Instruction Challenge Dialog is displayed (FIG. 29).

On a "No" return from the dialog no action is taken and this page remains displayed.

On a "Yes" return from the dialog the Orchestration is called to process the accept request.

If the call to the Orchestration is successful, a dialog is displayed notifying the user of this fact and upon return from this dialog the user is returned to the previous page.

If the call to Orchestration is not successful, an appropriate error message is reported to the user (see Error Reporting). No action is taken and this page remains displayed.

Figure 30:
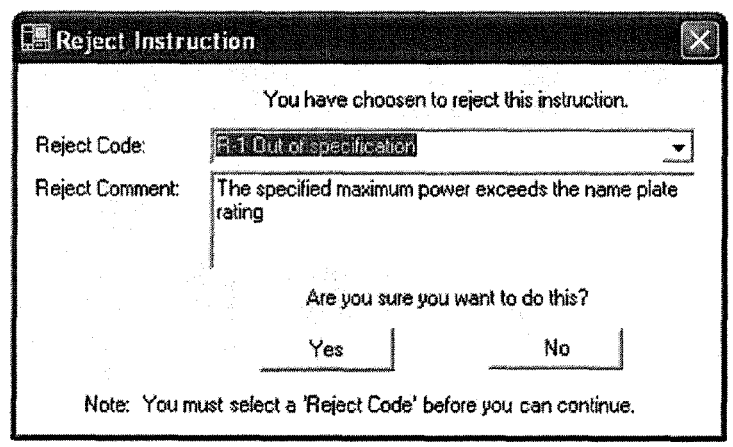
FIG. 30 shows a Reject Instruction Reason Dialog displayed upon selection of a Reject button of the Accept/Reject Instruction Page.

If the user clicks the "Reject" button, the Reject Instruction Reason Dialog is displayed (FIG. 30).

The contents of the "Reject Code" list are those Reason Codes of the type "InstructionRejection".

When this dialog is first displayed, no reject code is selected and the "Yes" button is disabled. The "Yes" button is only enabled when a reject code has been selected.

On a "No" return from the dialog, no action is taken and this page remains displayed On a "Yes" return from the dialog the Orchestration is called to process the reject request which includes the reject code and reject comment.

If the call to the Orchestration is successful, a dialog is displayed notifying the user of this fact and upon return from this dialog the user is returned to the previous page.

If the call to the Orchestration is not successful the appropriate error message is reported to the user (see Error Reporting). No action is taken and this page remains displayed.

If the user clicks the "Close" button the user is returned to the previous page

Amend/Cancel Instruction Page

Figure 31:
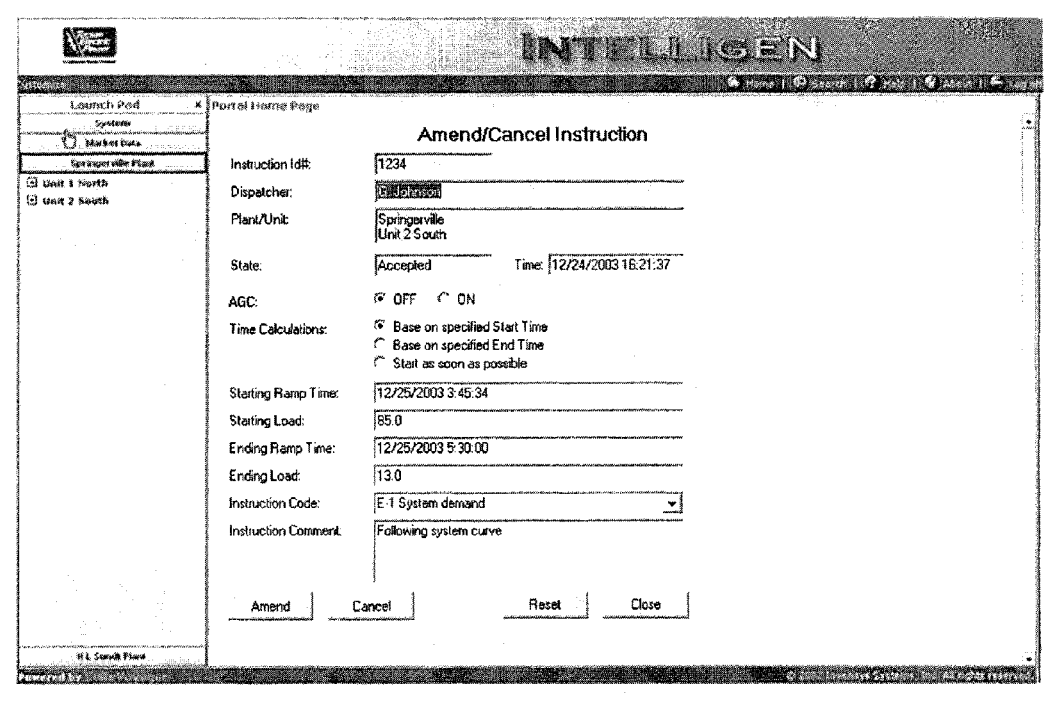

The fields on this page (FIG. 31) are initialized from the instruction document specified by the caller (Instruction Id#).

The "State" field reflects the most recent operation state of the instruction and the associated time field is the time that it went to that state.

The contents of the "Instruction Code" list are those Reason Codes of the type "InstructionCreation".

Time Calculation Options:

If "Base on specified Starting Ramp Time" is selected, Ending Ramp Time field should be disabled and set to empty.

If "Base on specified Ending Ramp Time" is selected, Starting Ramp Time field should be disabled and set to empty.

If "Start as soon as possible", Starting and Ending Ramp Time fields should be disabled and set to empty.

If AGC is set to "ON", all fields except the Starting Ramp Time should be disabled and set to empty (we don't want to leave values that appear real but aren't used).

If the user clicks the "Amend" button, the instruction is validated (see Validation).

Figure 32:
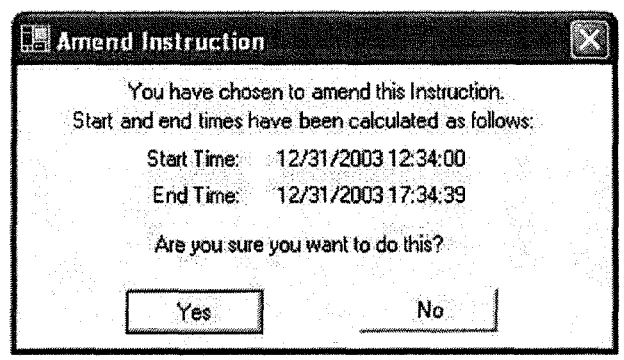
FIG. 32 depicts an Amend Instruction Challenge Dialog displayed upon selection of an Amend button of the Amend/Cancel Instruction Page.

If validation is successful the Amend Instruction Challenge Dialog is displayed (FIG. 32).

On a "No" return from the dialog, no action is taken and this page remains displayed.

On a "Yes" return from the dialog the Orchestration is called to process the amend request.

If the call to the Orchestration is successful, a dialog is displayed notifying the user of this fact and upon return from this dialog the user is returned to the previous page.

If the call to the Orchestration is not successful, the appropriate error message is reported to the user. No action is taken and this page remains displayed.

If the validation is not successful the appropriate errors are reported to the user (see Error Reporting). No action is taken and this page remains displayed.

Figure 33:
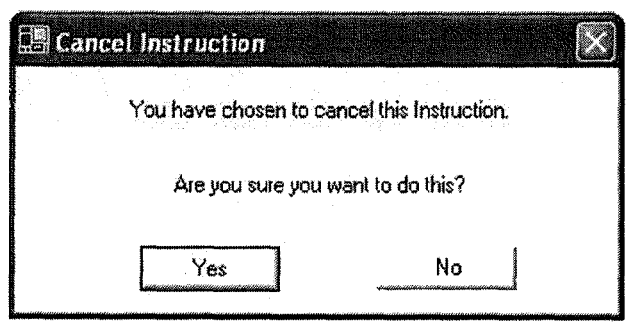
FIG. 33 depicts a Cancel Instruction Challenge Dialog displayed upon selection of an Cancel button of the Amend/Cancel Instruction Page

If the user clicks the "Cancel" button, the Cancel Instruction Challenge Dialog is displayed (FIG. 33)

On a "No" return from the dialog, no action is taken and this page remains displayed.

On a "Yes" return from the dialog the Orchestration is called to process the cancel request.

If the call to the Orchestration is successful, a dialog is displayed notifying the user of this fact and upon return from this dialog the user is returned to the previous page.

If the call to the Orchestration is not successful, the appropriate error message is reported to the user (see Error Reporting). No action is taken and this page remains displayed.

If the user clicks the "Reset" button the fields are restored to their original initialized values.

If the user clicks the "Close" button the user is returned to the previous page.

View Instruction Page

Figure 34:
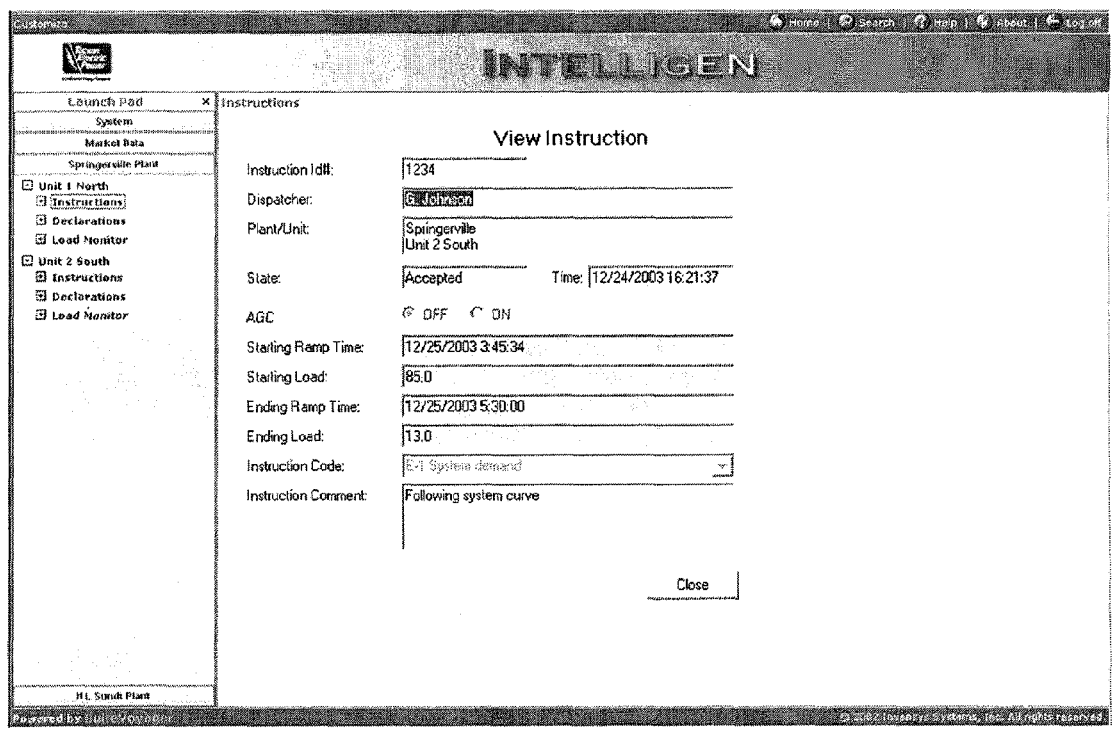
FIG. 34 shows a view instruction page that displays a specified instruction.

The view instruction page (FIG. 34) is a read only page that displays a specified instruction The "State" field reflects the most recent operation state of the instruction and the associated time field is the time that it went to that state.

If the user clicks the "Close" button the user is returned to the previous page.

Accept/Reject Declaration Page

Figure 35:
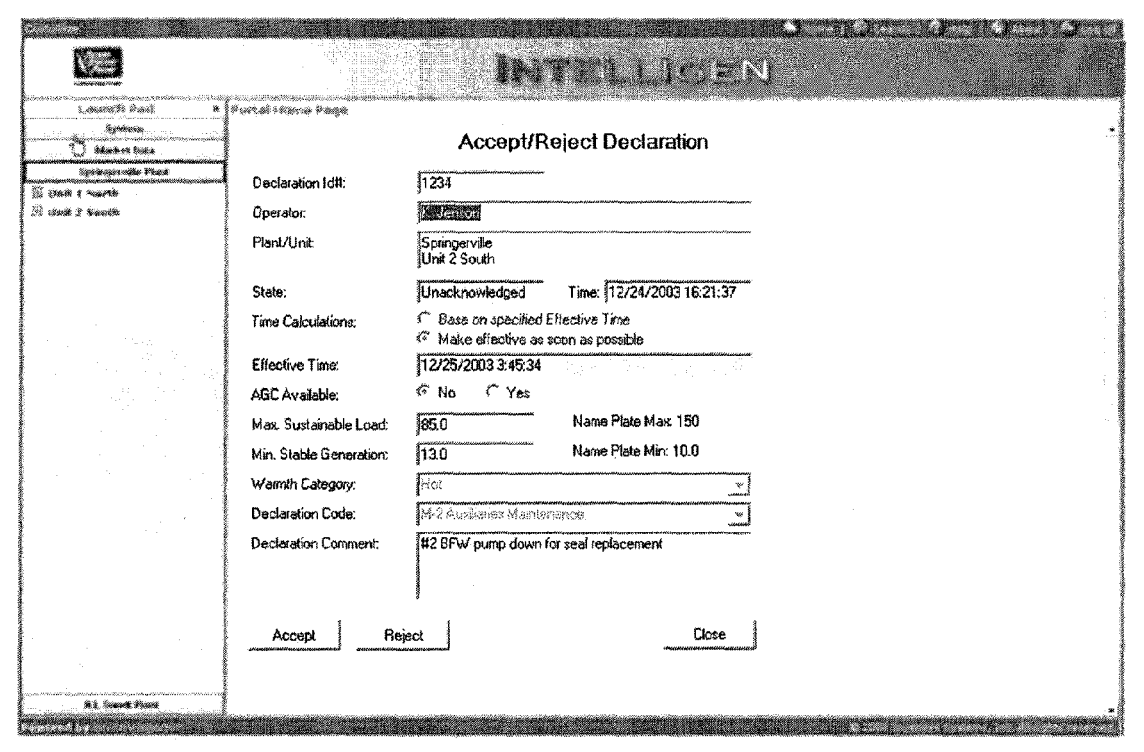

Referring to FIG. 35, the "Name Plate Max", "Name Plate Min" and "Warmth Category" information is provided by the name plate attributes of the ArchestrA unit object.

The "State" field reflects the most recent operation state of the declaration and the associated time field is the time that it went to that state.

Figure 36:
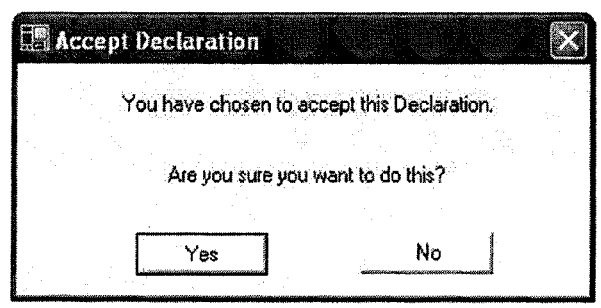
FIG. 36 depicts an Accept Declaration Challenge Dialog displayed upon selection of an Accept button of the Accept/Reject Declaration Page.

If the user clicks the "Accept" button, the Accept Declaration Challenge Dialog is displayed (FIG. 36).

On a "No" return from the dialog no action is taken and this page remains displayed.

On a "Yes" return from the dialog the Orchestration is called to process the accept request.

If the call to the Orchestration is successful, a dialog is displayed notifying the user of this fact and upon return from this dialog the user is returned to the previous page.

If the call to Orchestration is not successful, an appropriate error message is reported to the user (see Error Reporting). No action is taken and this page remains displayed.

Figure 37:
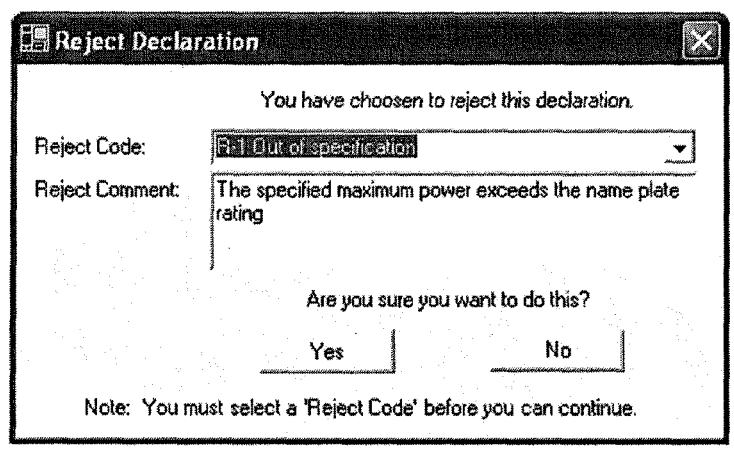
FIG. 37 shows a Reject Declaration Reason Dialog displayed upon selection of a Reject button of the Accept/Reject Declaration Page.

If the user clicks the "Reject" button, the Reject Declaration Reason Dialog is displayed (FIG. 37).

The contents of the "Reject Code" list are those Reason Codes of the type "DeclarationRejection".

When this dialog is first displayed, no reject code is selected and the "Yes" button is disabled. The "Yes" button is only enabled when a reject code has been selected.

On a "No" return from the dialog, no action is taken and this page remains displayed On a "Yes" return from the dialog the Orchestration is called to process the reject request which includes the reject code and reject comment.

If the call to the Orchestration is successful, a dialog is displayed notifying the user of this fact and upon return from this dialog the user is returned to the previous page.

If the call to the Orchestration is not successful the appropriate error message is reported to the user (see Error Reporting). No action is taken and this page remains displayed.

If the user clicks the "Close" button the user is returned to the previous page

Amend/Cancel Declaration Page

Figure 38:
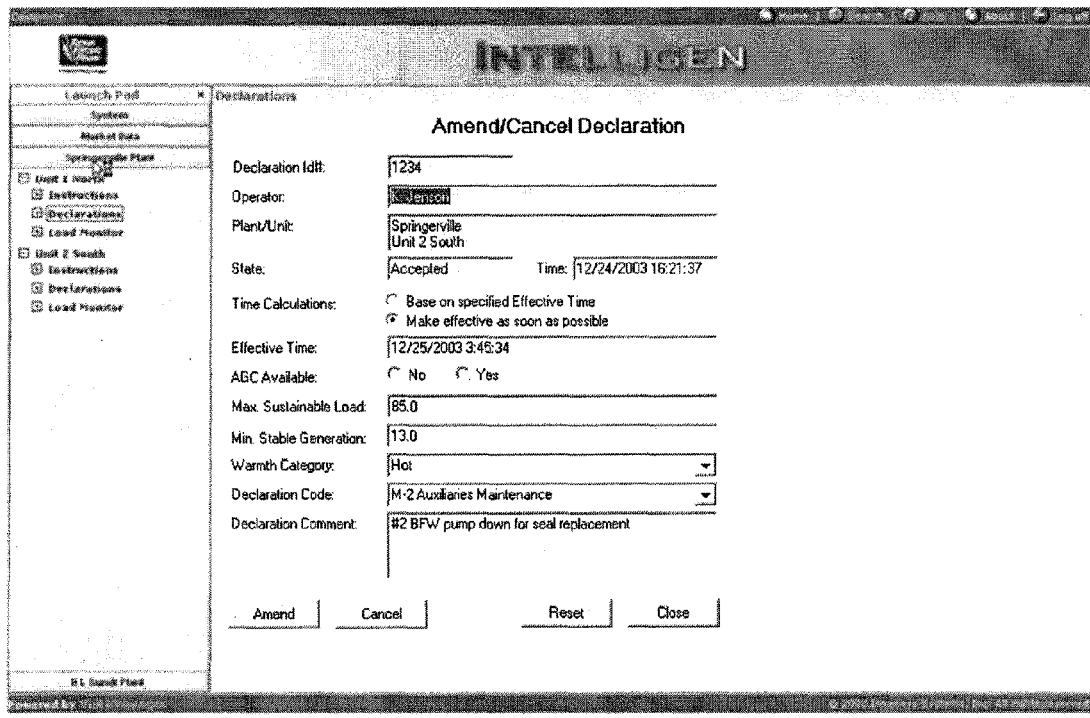
FIG. 38 shows an Amend/Cancel Declaration Page.

The fields on this page (FIG. 38) are initialized from the declaration document specified by the caller (Declaration Id#).

The "State" field reflects the most recent operation state of the declaration and the associated time field is the time that it went to that state.

The contents of the "Declaration Code" list are those Reason Codes of the type "DecarationCreation".

If the user clicks the "Amend" button, the declaration is validated (see Validation).

Figure 39:
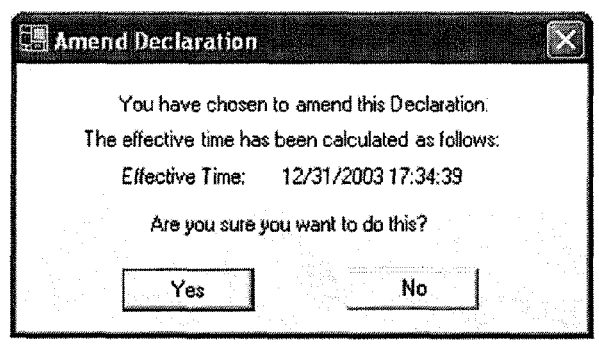
FIG. 39 depicts an Amend Declaration Challenge Dialog displayed upon selection of an Accept button of the Amend/Cancel Declaration Page.

If validation is successful the Amend Declaration Challenge Dialog is displayed (FIG. 39).

On a "No" return from the dialog, no action is taken and this page remains displayed.

On a "Yes" return from the dialog the Orchestration is called to process the amend request.

If the call to the Orchestration is successful, a dialog is displayed notifying the user of this fact and upon return from this dialog the user is returned to the previous page.

If the call to the Orchestration is not successful, the appropriate error message is reported to the user. No action is taken and this page remains displayed.

If the validation is not successful the appropriate errors are reported to the user, no action is taken and this page remains displayed.

Figure 40:
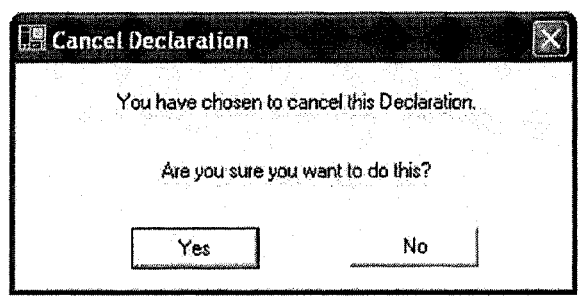
FIG. 40 depicts a Cancel Declaration Challenge Dialog displayed upon selection of a Cancel button of the Amend/Cancel Declaration Page.

If the user clicks the "Cancel" button, the Cancel Declaration Challenge Dialog is displayed (FIG. 40).

On a "No" return from the dialog, no action is taken and this page remains displayed.

On a "Yes" return from the dialog the Orchestration is called to process the cancel request.

If the call to the Orchestration is successful, a dialog is displayed notifying the user of this fact and upon return from this dialog the user is returned to the previous page.

If the call to the Orchestration is not successful, the appropriate error message is reported to the user (see Error Reporting). No action is taken and this page remains displayed.

If the user clicks the "Reset" button the fields are restored to their original initialized values.

If the user clicks the "Close" button the user is returned to the previous page.

View Declaration Page

Figure 41:
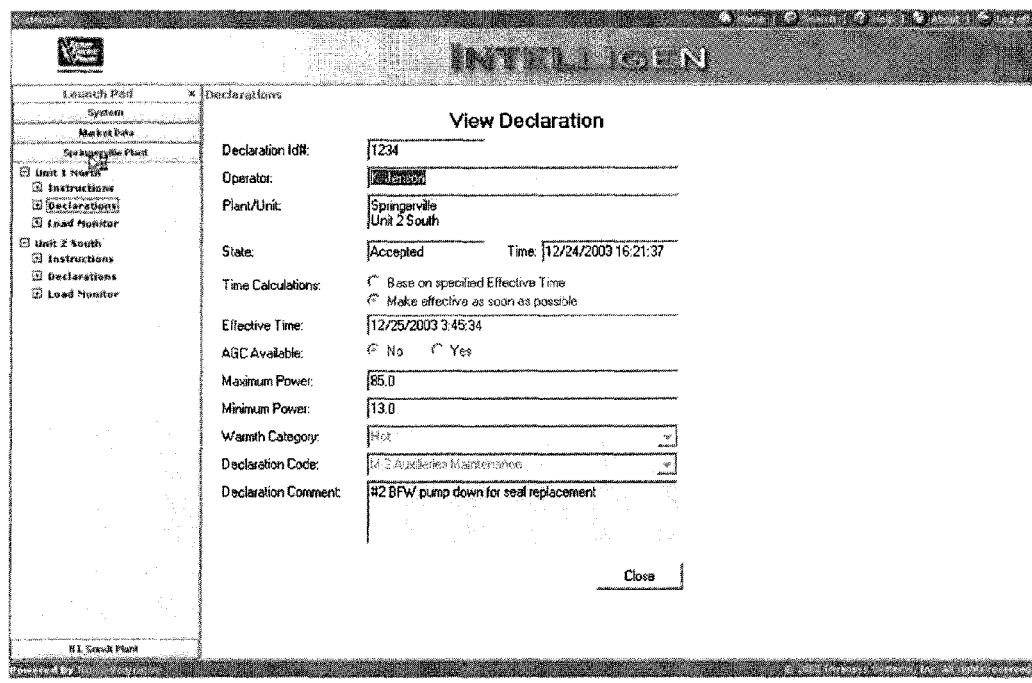
FIG. 41 shows a view declaration page through which a specified declaration may be displayed.

The view declaration page (FIG. 41) is a read only page that displays a specified declaration.

The "State" field reflects the most recent operation state of the declaration and the associated time field is the time that it went to that state.

If the user clicks the "Close" button the user is returned to the previous page.

Sequence Diagrams

FIGS. 42-48 are a set of exemplary sequence diagrams which individually and collectively represent various aspects of the present invention.

Figure 42:
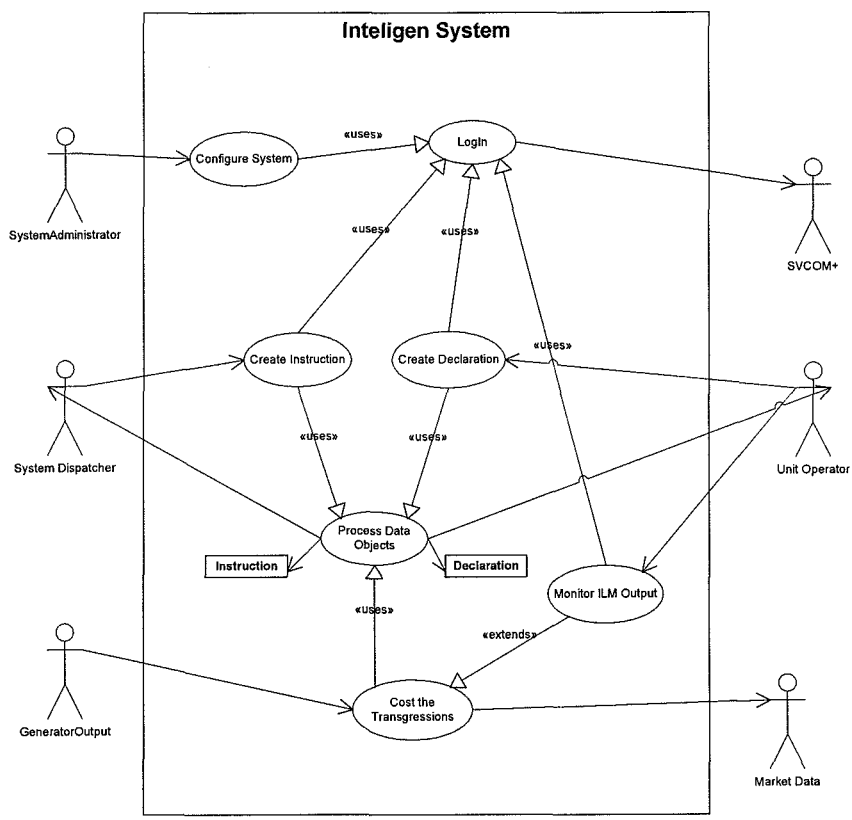
FIG. 42 comprises a system-level sequence diagram representative of the interaction between and among the Intelligen System and unit operators, system dispatchers, system administrators and information sources such as market data and generator output data.

FIG. 42 comprises a system-level sequence diagram representative of the interaction between and among the Intelligen System and unit operators, system dispatchers, system administrators and information sources such as market data and generator output data.

Figure 43:
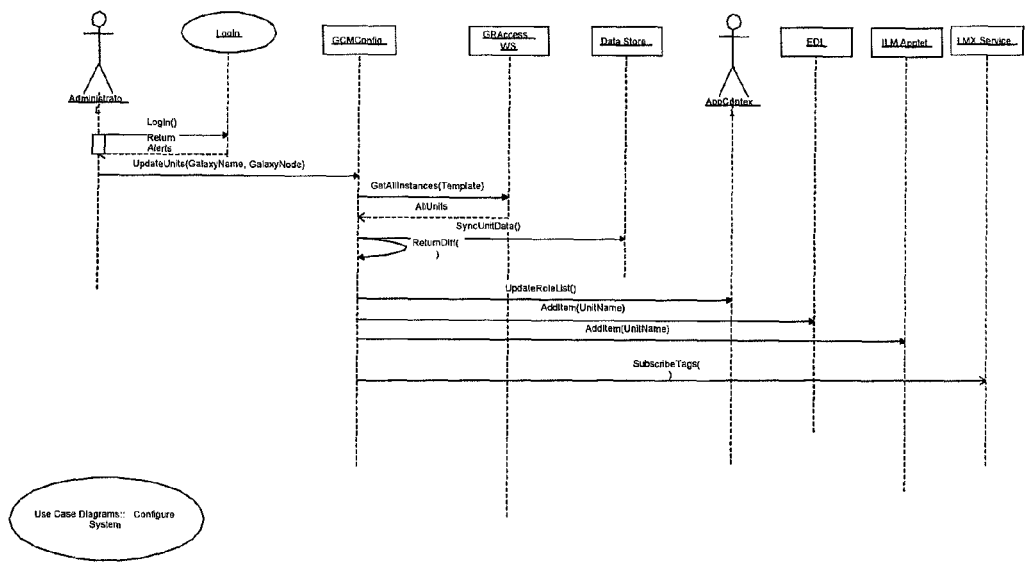
FIG. 43 depicts a sequence diagram illustrating a system configuration process.

FIG. 43 depicts a sequence diagram illustrating a system configuration process.

Figure 44:
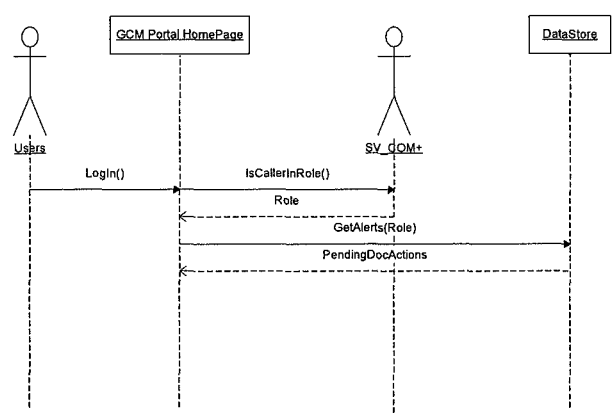
FIG. 44 shows a sequence diagram representative of an exemplary log-in process.

FIG. 44 shows a sequence diagram representative of an exemplary log-in process.

Figure 45:
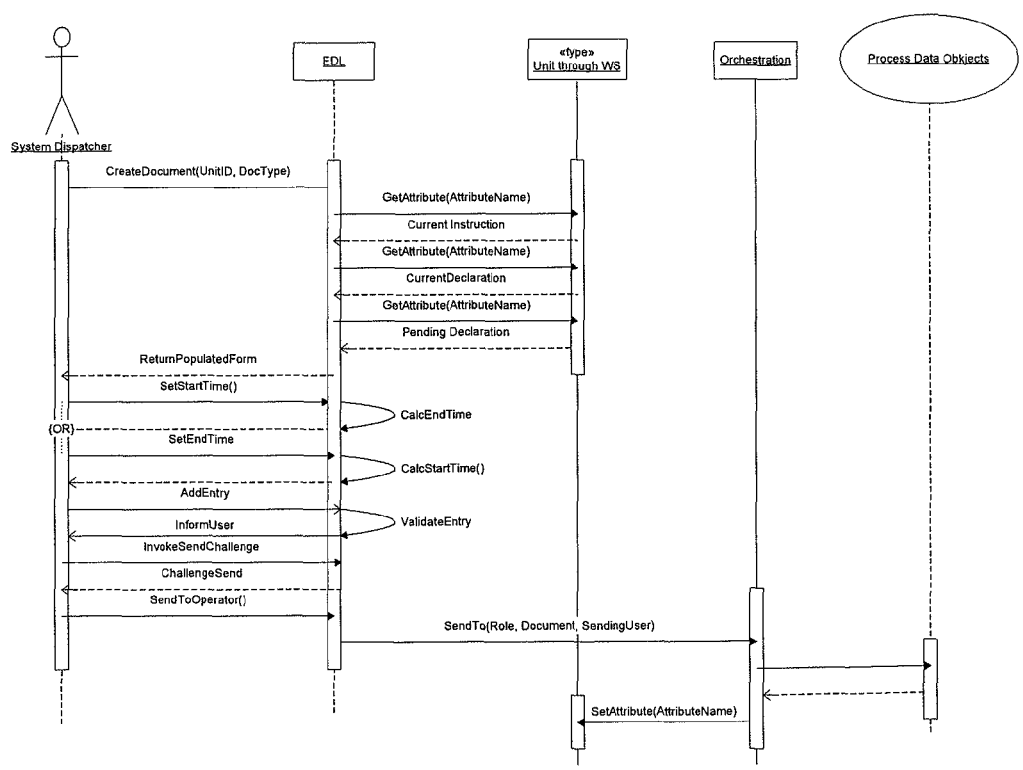
FIG. 45 depicts a sequence diagram illustrating an exemplary process for creation of an instruction.

FIG. 45 depicts a sequence diagram illustrating an exemplary process for creation of an instruction.

Figure 46:
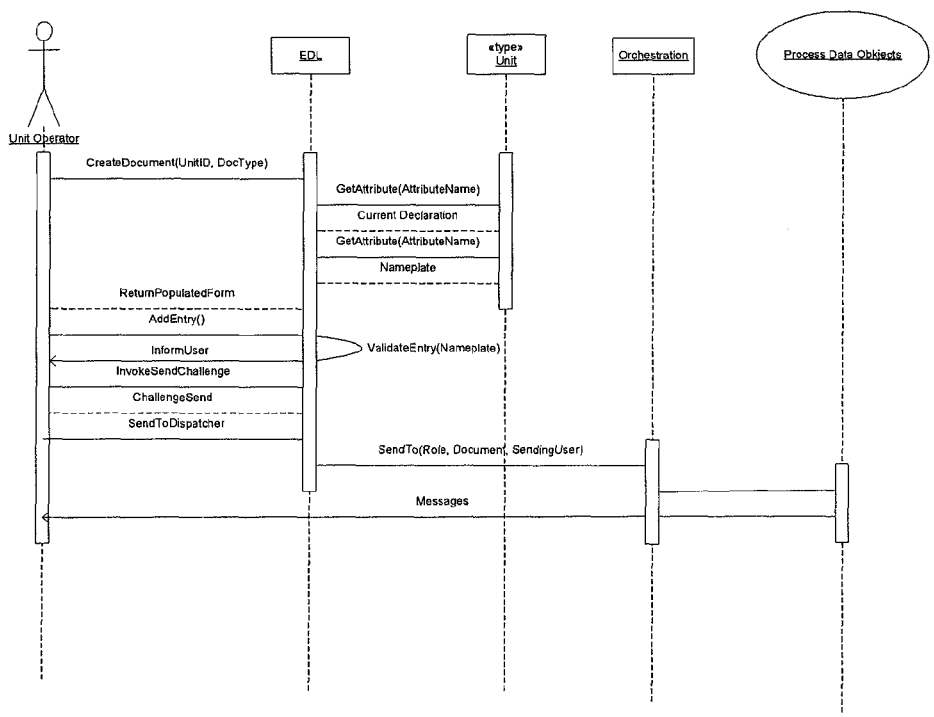
FIG. 46 shows a sequence diagram representative of an exemplary process for creation of a declaration.

FIG. 46 shows a sequence diagram representative of an exemplary process for creation of a declaration.

Figure 47:
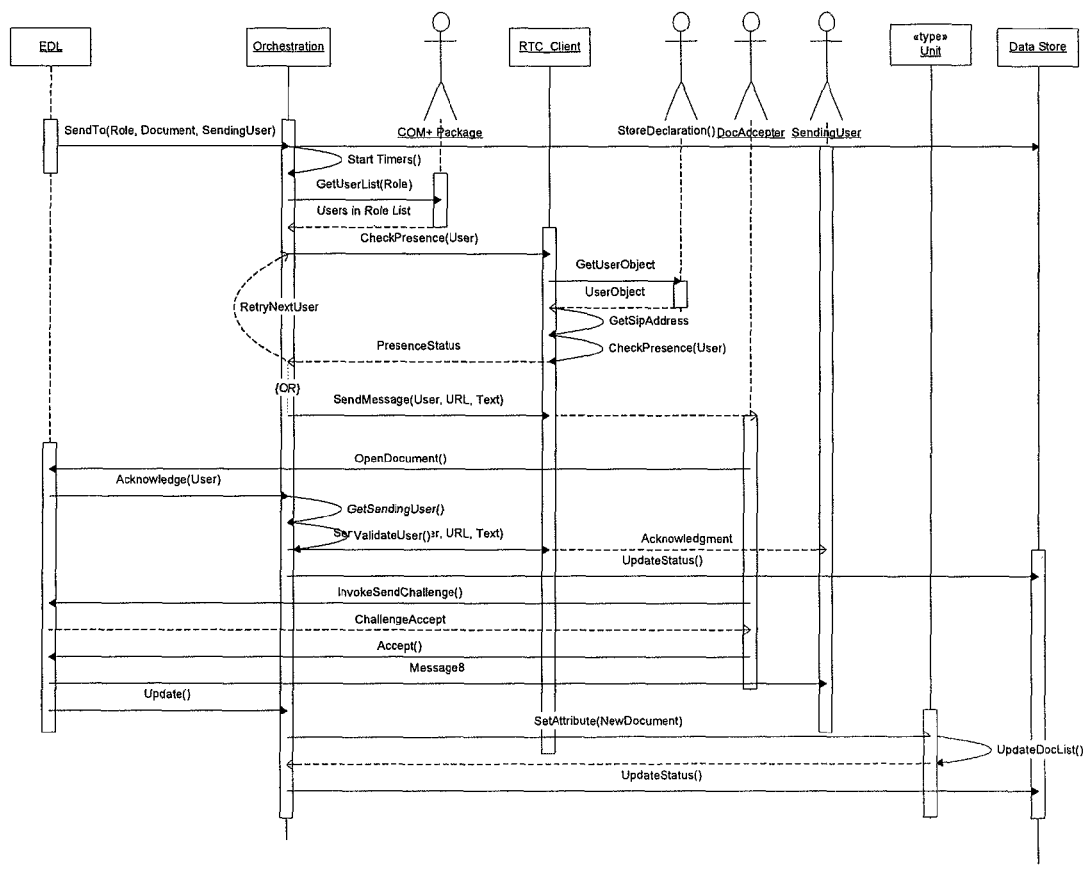
FIG. 47 shows a sequence diagram pertaining to the processing of data objects.

FIG. 47 shows a sequence diagram pertaining to the processing of data objects.

Figure 48:
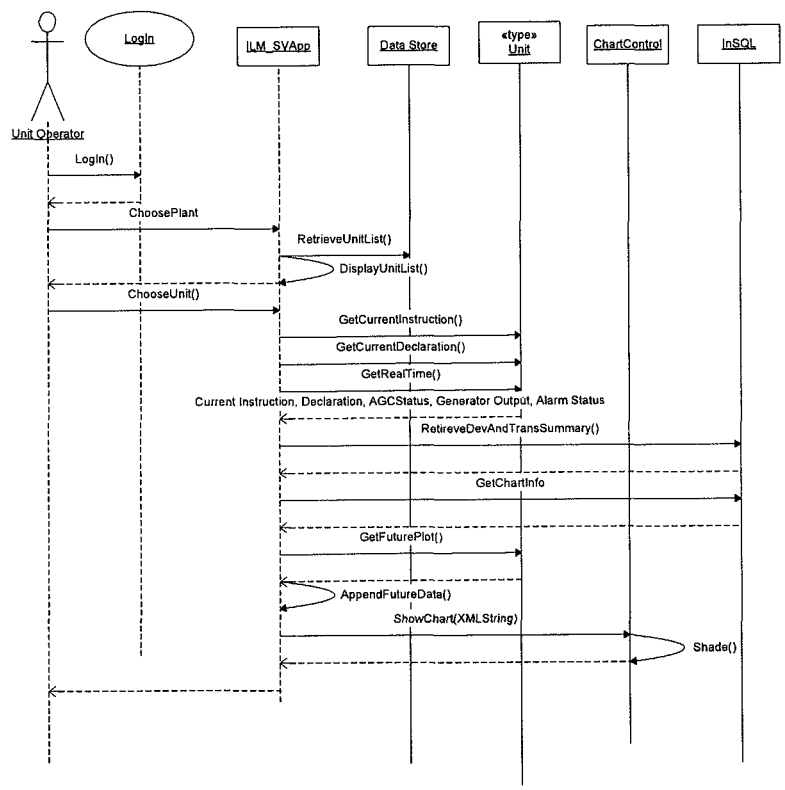
FIG. 48 depicts a sequence diagram illustrating a process for monitoring ILM output.

FIG. 48 depicts a sequence diagram illustrating a process for monitoring ILM output.

Figure 49:
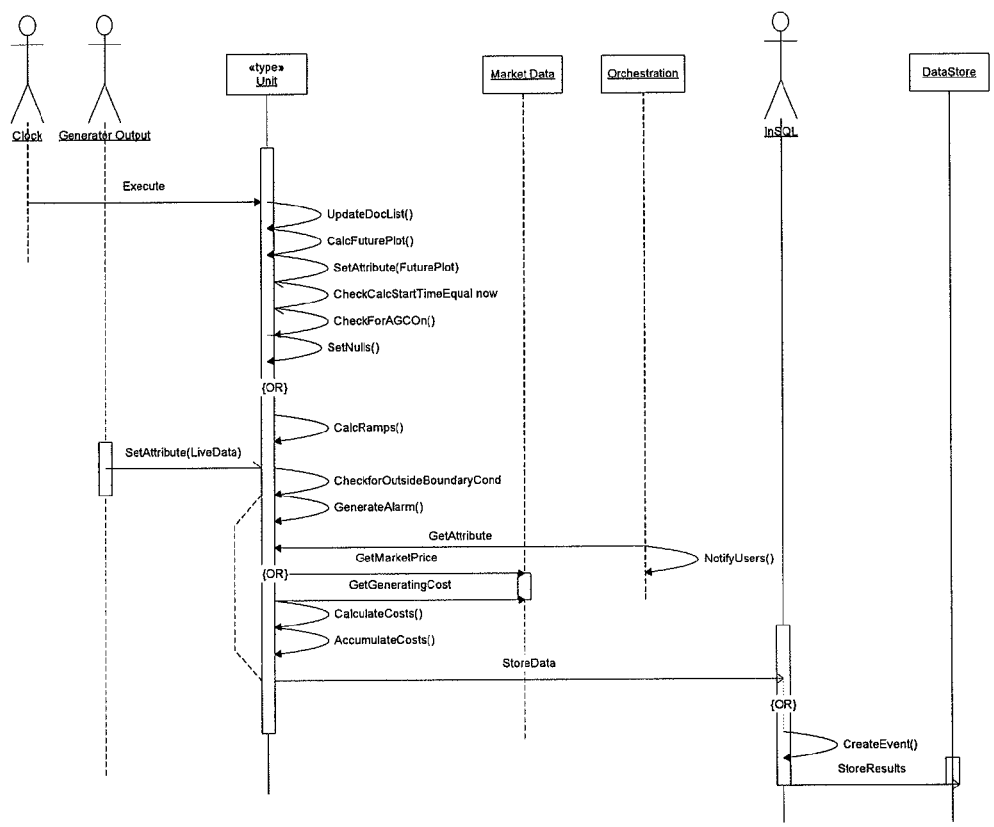
FIG. 49 shows a sequence diagram representative of a cost calculation process.

FIG. 49 shows a sequence diagram representative of a cost calculation process.

Using the Invensys SuiteVoyager Web Portal

In order to more fully elucidate various aspects of the present invention, this section provides information from the perspective a "user guide" applicable to the Intelligen Application Suite hosted by the portal server 340 (FIG. 3)

In the exemplary embodiment SuiteVoyager allows one to visualize and interact with plant floor information coming from Wonderware InTouch systems, InTouch alarm providers, I/O Servers, OSI PI and IndustrialSQL Server over the intranet/Internet using nothing more than the Microsoft Internet Explorer browser. Using the SuiteVoyager Portal, run-time and historical data access is extended to computers beyond the boundaries of the secured process network.

The portal provides enterprise-wide viewing and supervisory control to all of this plant floor information. For example, the portal allows for ad-hoc investigation and reporting of all information relevant to particular tags as defined in InTouch or IndustrialSQL Server, such as current and historical tag values, real-time trends, alarm states and historical records, and graphics.

The portal interface provides a secure framework, common navigation method, and a user-friendly graphical user interface (GUI) for delivering access to converted InTouch windows, reports, documents, alarms, historical, and real-time information. The portal also incorporates a single login mechanism and a portal-wide search capability.

Figure 50:
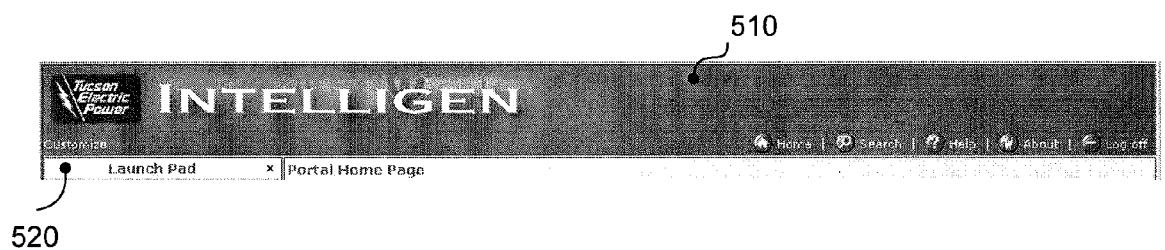

As shown in FIG. 50, there are three primary sections of the web portal: the Banner Pane (510), the navigation pane called the Launch Pad (520) and the Content Pane. Clicking on the Help link in the Banner Pane provides access to the online SuiteVoyager Help.

There are a number of links at the bottom edge of the Banner Pane that provide the user with ways to customize the portal, find help and navigate.

Customize allows the order of the navigation buttons on the Launch Pad to be rearranged to suit the user's preferences. Operators at Springerville might want to have the top button be Springerville since that will be their primary destination whenever opening Intelligen.

Home displays the opening view of Intelligen. If the system times-out due to inactivity, selecting Home will restart the system without having to restart the browser.

Help starts the SuiteVoyager Online help system.

About provides information about the version of SuiteVoyager that is installed.

Log off shuts down Intelligen and releases the SuiteVoyager license that is in use. It is important to always use Log off to exit the Intelligen system to assure that all system house keeping is performed.

Starting Intelligen

Figure 51:
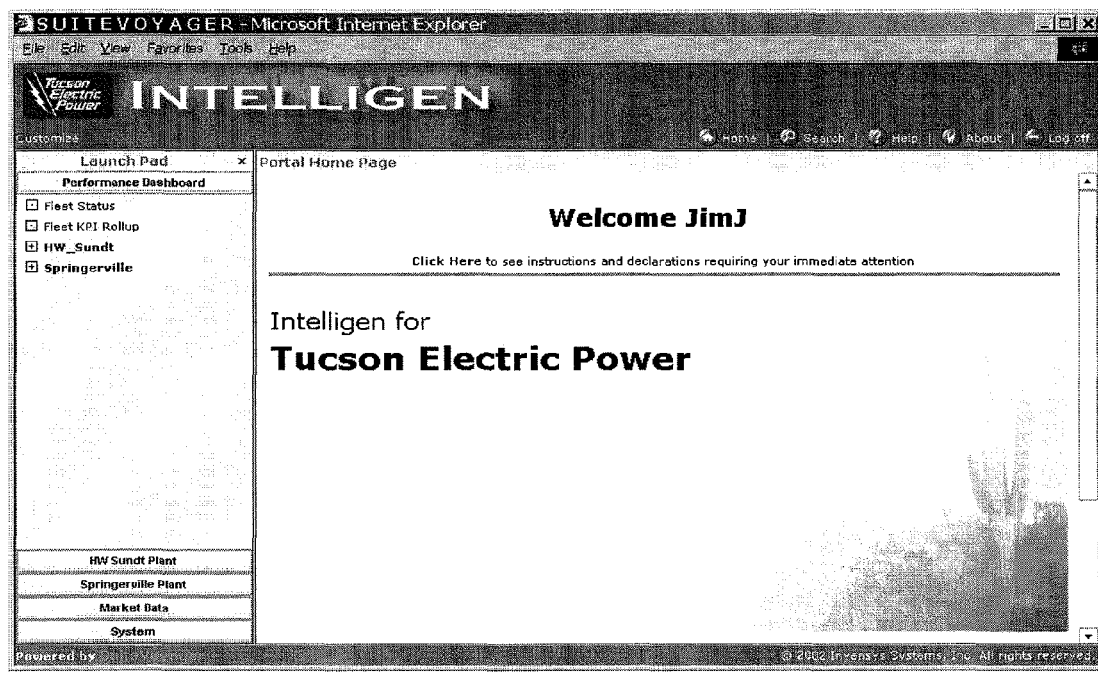

When the Intelligen app is opened, the first screen (FIG. 51) shows a welcome message that includes a hyperlink (Click Here) if there are open items in the user's task list. Following that link will open the task list.

The Launch Pad is the SuiteVoyager navigation pane. The topmost Panel (Performance Dashboard in the above graphic) opens when the user first opens the portal. Clicking any of the other buttons will open that particular panel.

Figure 52:
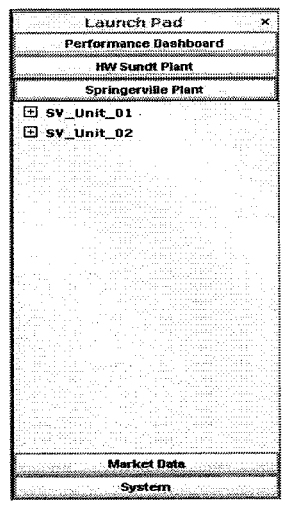

Clicking on a panel reveals the first level of links within that panel (FIG. 52). If there are additional levels, an expansion icon (plus-sign in a box) appears next to the link. Clicking the icon will expand the level to show any sub-levels.

Figure 53:
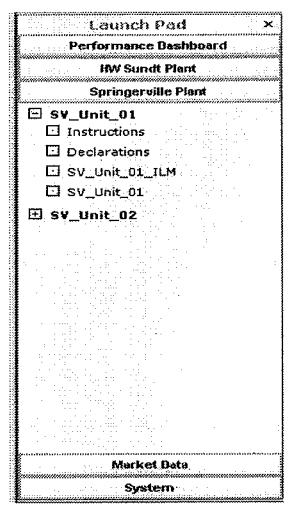

The graphic of FIG. 53 shows the result of clicking on the expansion icon next to the link, SV_Unit_01.

ILM—Integrated Load Monitor

Figure 54:
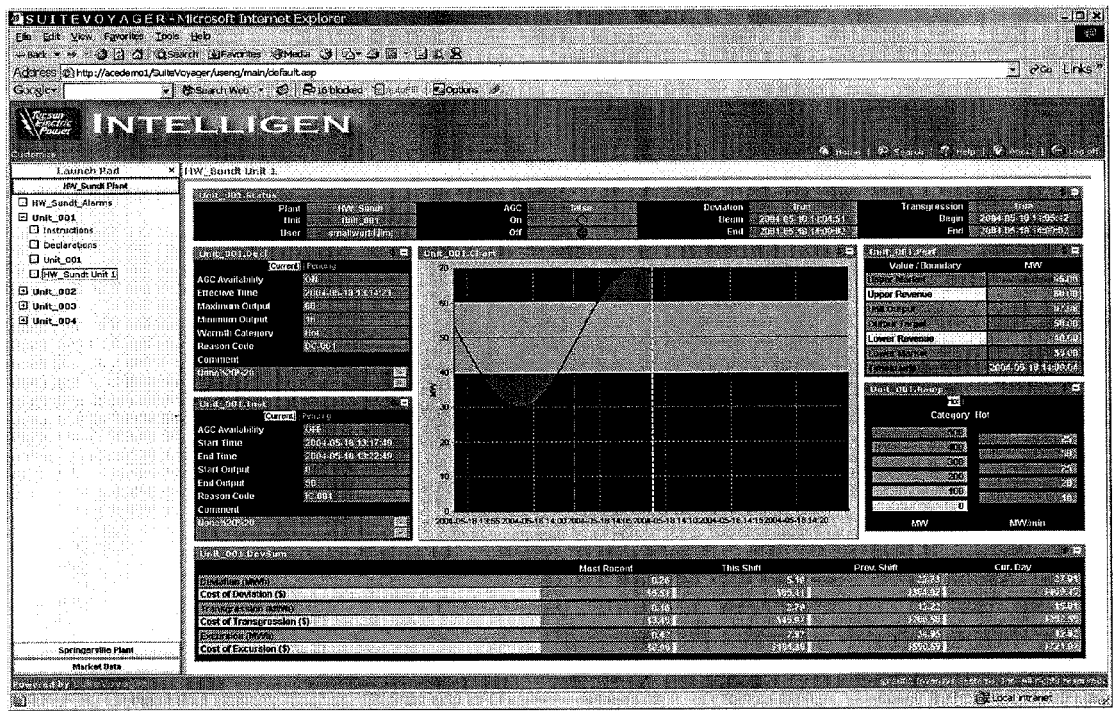

As shown in FIG. 54, the ILM frame is made up of several web components that deliver the current instruction and declaration information to the user.

Figures 55, 56:
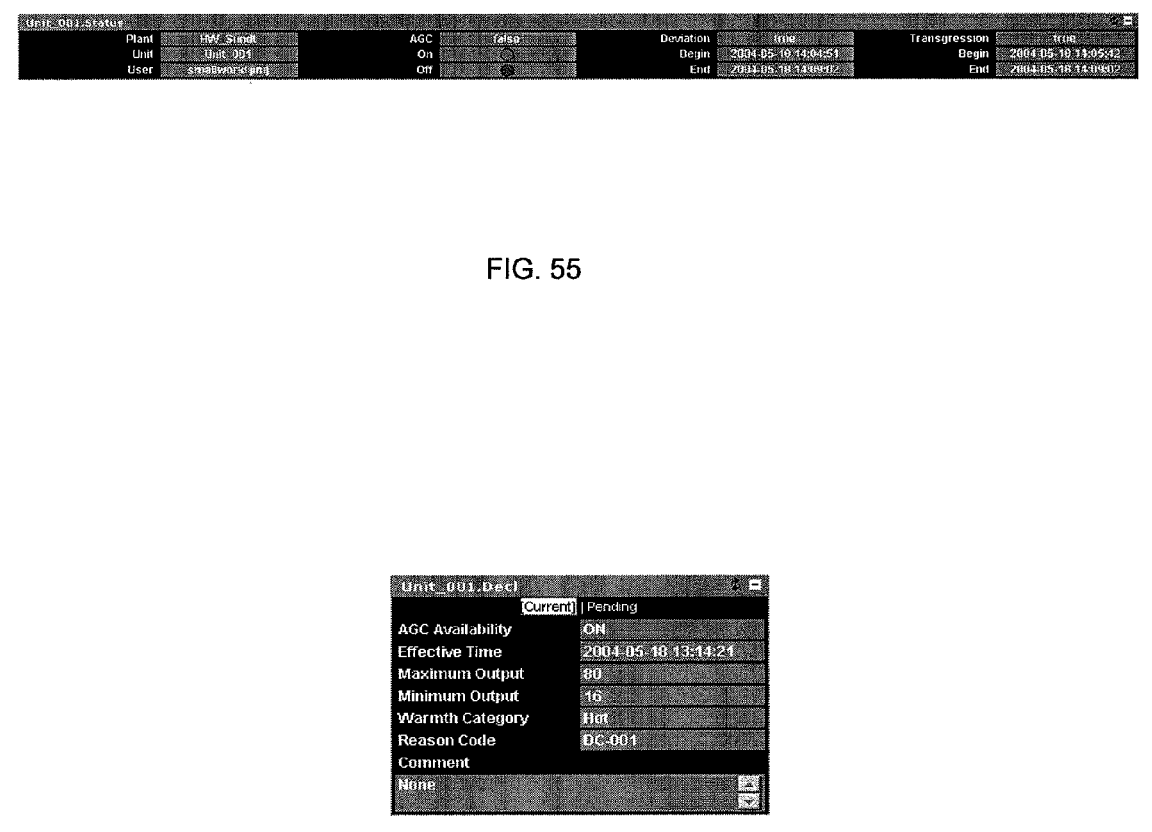

The top section (FIG. 55) provides current status information regarding AGC, deviations and transgressions (if applicable). For AGC, a True indicates that AGC is available. The ON and OFF lights are derived from real-time operating data. A "True" in the Deviation or Transgression cells indicates that the current net output of the unit is outside of the Revenue or Market boundary.

The declaration summary (FIG. 56) provides a quick view of the current declaration or any of the next four pending declarations. If there are any pending declarations, up to four hyperlinks (numeral in [ ] brackets) will appear to the right of the word Pending. A white background indicates the data that is currently displayed ([Current] in this example).

Figures 57, 58, 59:
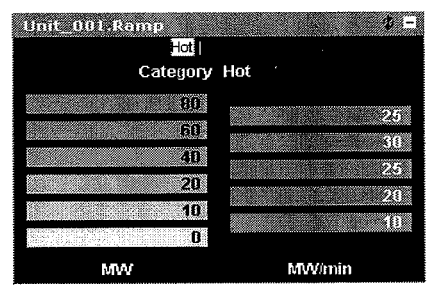

The instruction summary (FIG. 57) provides a quick view of the current instruction or any of the next four pending instructions. If there are any pending instructions, up to four hyperlinks (numeral in [ ] brackets) will appear to the right of the word Pending. A white background indicates the data that is currently displayed ([Current] in this example).

The performance summary (FIG. 58) shows the target for the unit net output, the actual unit net output and the upper and lower revenue boundaries and market boundaries (if applicable).

For reference (FIG. 59), the unit ramp rates are displayed according to the power bands. If multiple ramp rate categories exist, such as warmth categories, these can be selected as well.

The Deviation Summary (FIG. 60) at the bottom of the ILM Frame summarizes the energy and dollar value of the deviations and transgressions that have occurred in the current shift, previous shift and current day. An excursion is the sum of the deviation and transgression. If transgressions are not tracked, the excursion and the deviation are the same. Currently, TEP is not in an open market, so transgressions don't apply.

Figure 61:
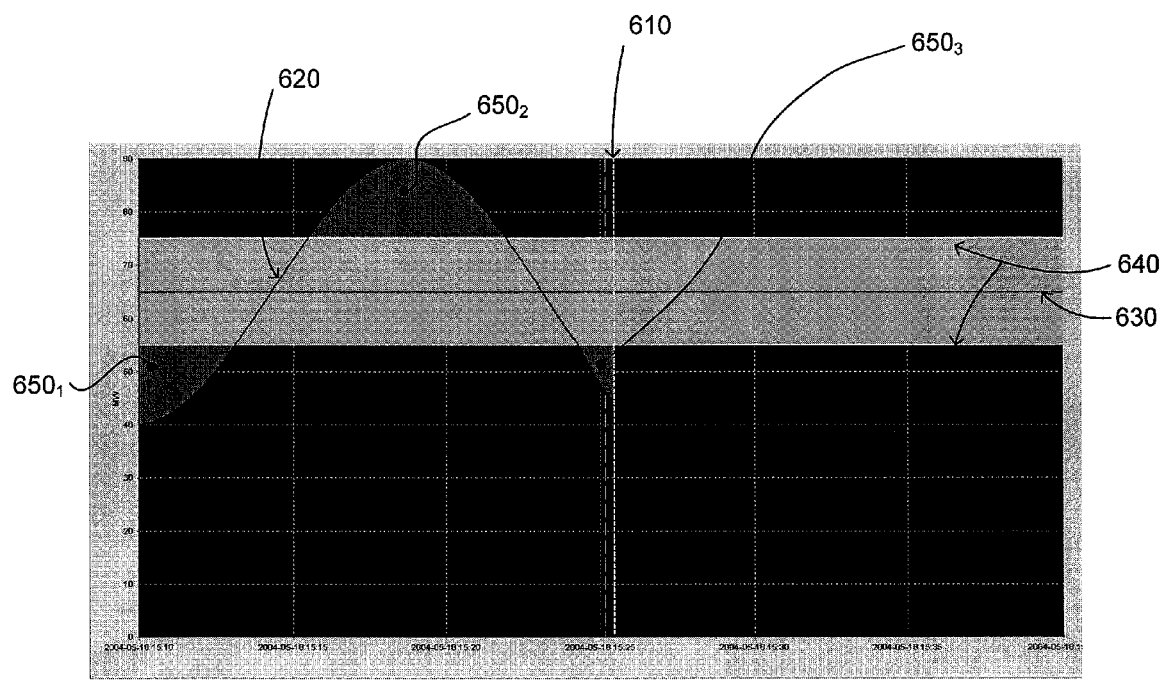

The chart (FIG. 61) in the center of the ILM frame shows the recent past, the present and the future.

The line colors on the chart have the following meanings:
Vertical white dashed line (610) marks the current time.
Blue line (620)—Current unit output
Green Line (630)—Instructed target output
Yellow Line (640)—Revenue Boundary
Red Shaded Area (650)—Deviation accumulation, proportional to lost profit.

Figure 62:
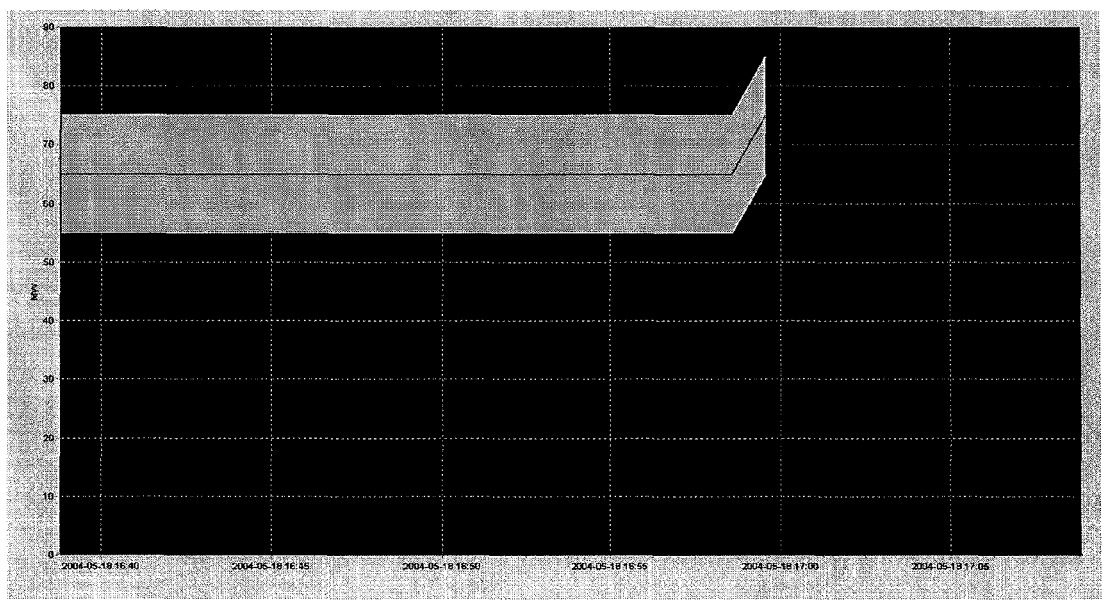

The user can move the chart to the right or left to see the recent past or move out into the future to view any pending instructions (FIG. 62). The target (and associated boundaries) ends at the completion of the last (future-most) load change instruction. To move the chart, right-click-and-drag the mouse.

There are a few mouse features included in the charting application that allow the user to customize the display.

Vertical—The chart can be moved up and down by clicking somewhere on the chart, then rotating the mouse wheel.

Horizontal—Right-click-and-drag to move the chart left or right.

Zoom In—Left-click-and-drag from the upper left corner to the lower right corner of the portion of the chart on which you want to zoom.

Zoom Out—To zoom back out, left-click-and-drag from lower right to up left, any where on the chart.

EDL—Electronic Dispatch and Logging

The Electronic Dispatch and Logging application (EDL) is the main communication application for unit declarations and instructions. The Intelligen relational database will store the instructions and declarations created or used by the EDL application.

Figure 63:
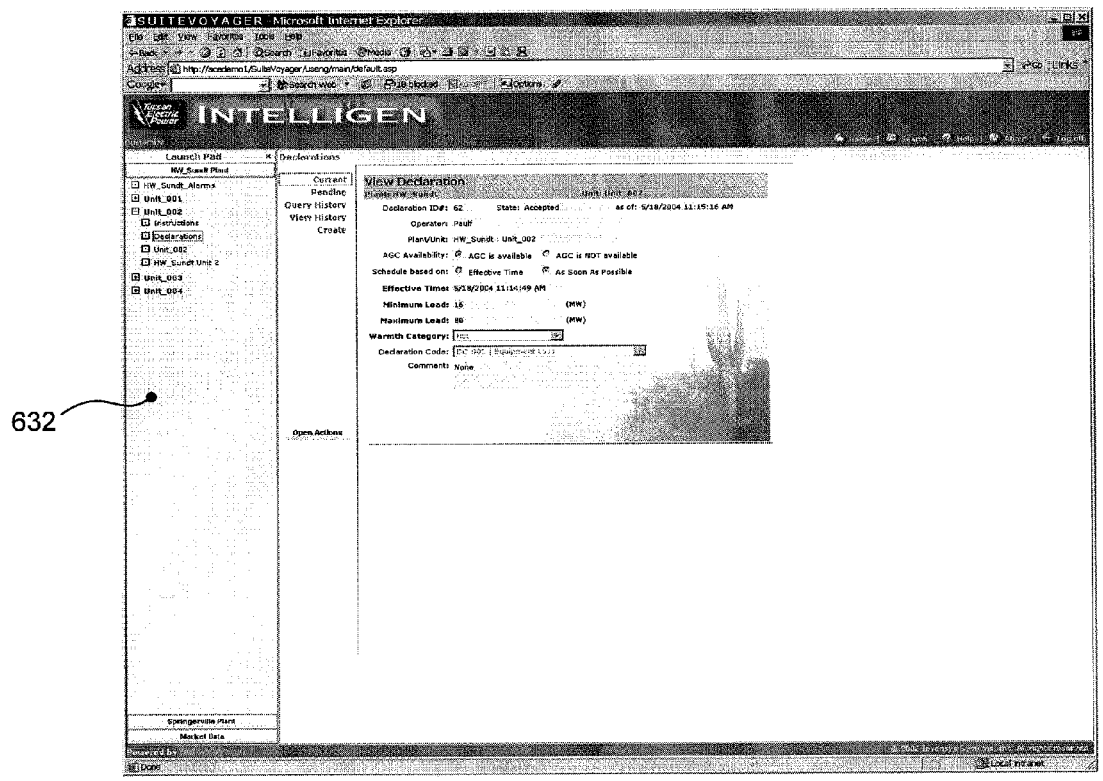

There are five (5) main functions of EDL:
Instruction creation/archival
Declaration creation/archival
Communications of Declarations and Instructions
Instruction/Declaration validation
Log viewing capabilities
Current Declaration As shown in FIG. 63, using the navigation pane (632) on the left side of the portal, the user selects the plant and unit to which the declaration pertains. Under the Unit heading, selecting Declarations will cause the current declaration to be displayed along with some action options that are associated with declarations. All users have access to the Current declaration, the Pending declarations, Query History and View History. Only the Unit Operator can access the Create declaration screen.

Query Declaration History

Figures 64, 65:
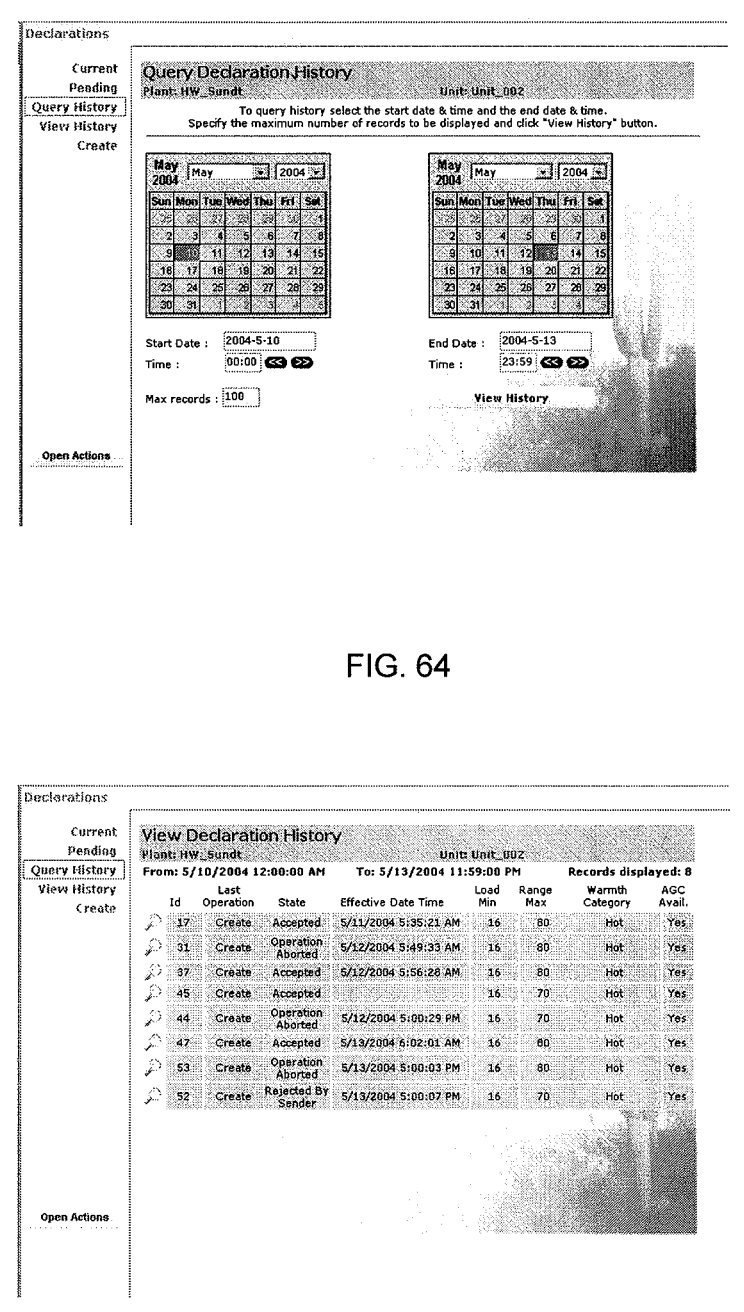

The Query History selection (FIG. 64) allows the user to find and display all the declaration actions between any two dates. Using the calendars and time fields, the user selects the data/time for the beginning and ending of the query. The View History button initiates the query.

When a query is made, a table is displayed (FIG. 65) that includes the following columns: ID, Last Operation, State, Effective Date/Time, Load Min., Load Max, Warmth Category and AGC Available. The ID is assigned by the system based on the order in which the declarations are made. Clicking on the magnifying glass in the left-most column will display the detailed view of that particular declaration.

View Declaration History

Figure 66:
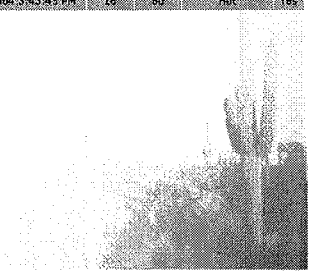

The View History screen (FIG. 66) shows the declaration activity for the previous 24 hours. Clicking on the magnifying glass in the left-most column will display the detailed view of that particular declaration. In this example, the current declaration is highlighted in light green. This color scheme is configurable by the system Admin using the Application Manager.

Current Instruction

Figure 67:
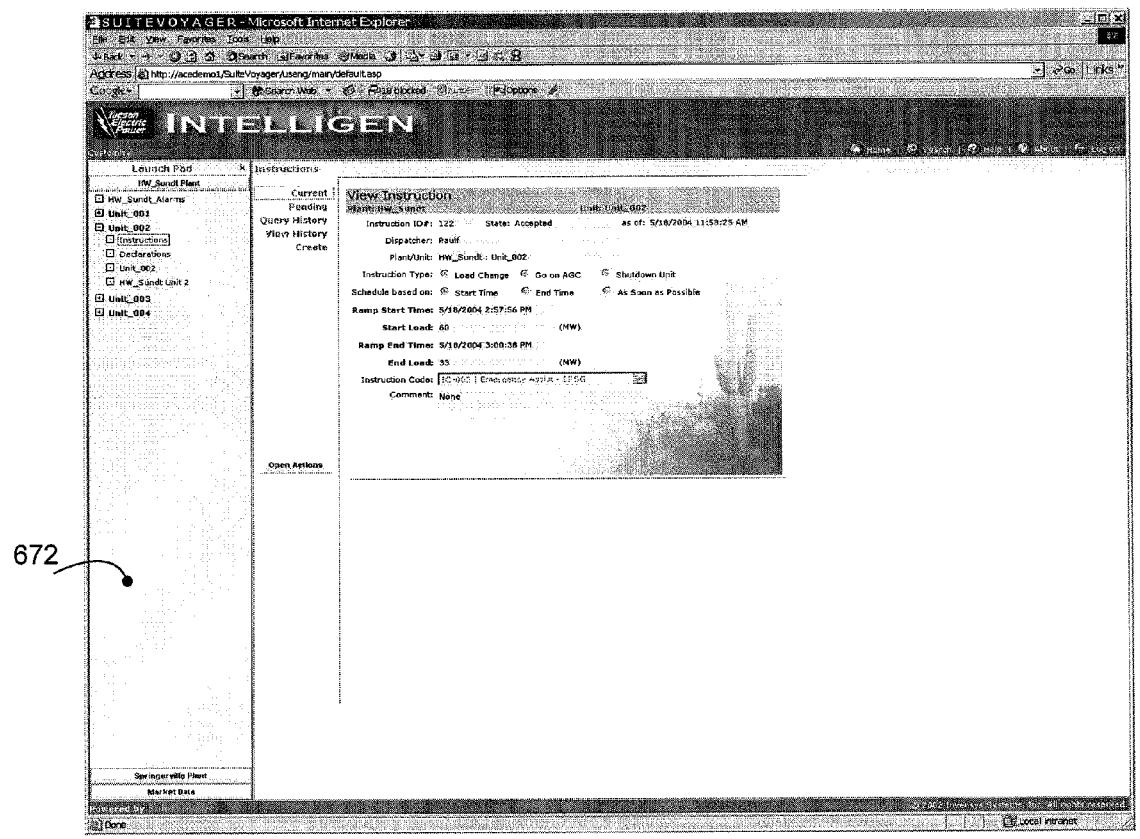
Figures 68, 69:
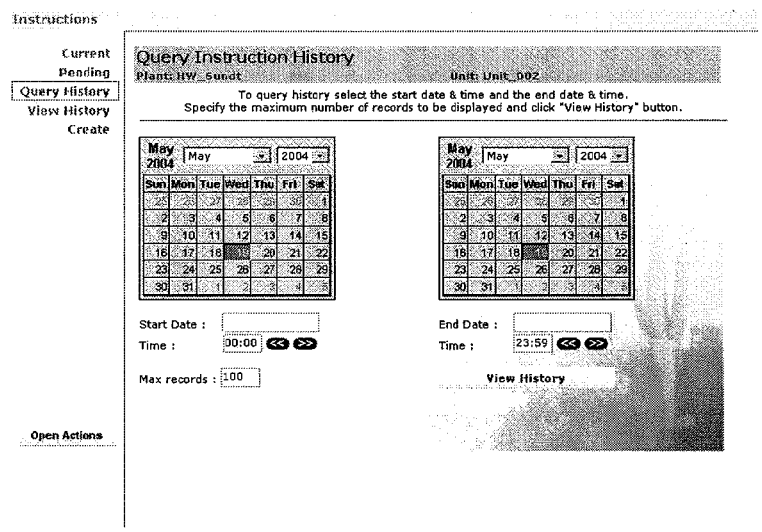

Turning to FIG. 67, using the navigation pane (672) on the left side of the portal, the user selects the Plant and Unit to which the instruction pertains. Under the Unit heading, selecting Instructions will cause the current instruction to be displayed along with some action options that are associated with instructions. All users have access to the Current declaration, the Pending declarations, Query History and View History. Only the Unit Operator can access the Create declaration screen.

Query Instruction History

The Query History selection allows the user to find and display all the instruction actions between any two dates. Using the calendars and time fields, the user selects the data/time for the beginning and ending of the query. The View History button initiates the query.

When a query is made, a table is displayed that includes the following columns: ID, Requested Action, Operation, State, Start Ramp Date/Time, End Ramp Date/Time, Start Load, and End Load. The ID is assigned by the system based on the order in which the instructions are made. Clicking on the magnifying glass in the left-most column will display the detailed view of that particular instruction.

Performance Dashboard

Figures 70, 71:
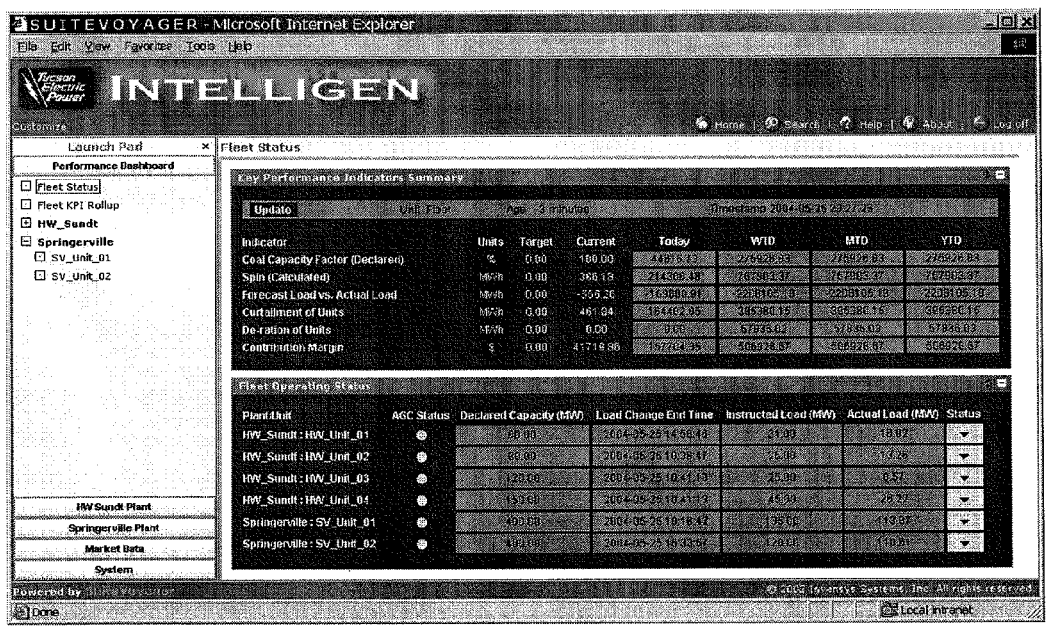

Opening the Performance Dashboard panel (FIG. 70) allows selection of the entire fleet status or the KPI summaries for individual units. The Fleet Status screen shows the KPI summary for the entire fleet (Springerville and Sundt units) along with the real-time operating status of the entire fleet. The only user interaction on this view is to initiate an update of the data by clicking on the Update button.

The upper webpart in the Fleet Status view (FIG. 71), the Fleet KPI's are displayed. The KPI values that are displayed are static to allow the user to view/study these values without them changing. In the upper section of the webpart is an "Age" indicator that shows the user how long it has been since the data has been updated. Clicking on the green button labeled Update will cause all the values in the table to update.

The lower section of the Fleet Operating Status pane (FIG. 72) shows real time operating data for the units. There are two "status" column that provide multiple messages.

The AGC status indicator is clear if AGC is not available, yellow if AGC is available but not being used and green if AGC for that unit is ON.

The Status indicator shows whether the unit is operating according to the dispatch plan. If the cell background is blue, the unit is being operated within the revenue boundaries. A yellow background indicates that the unit is in Deviation and red indicate the unit is in Transgression (if applicable). A round icon in the cell indicates that the unit output is matching the dispatched load. An "up" pointing triangle indicates that the unit output is above the instructed load and a "down" pointing triangle indicates that the unit output is below the instructed load.

Figures 72, 73:
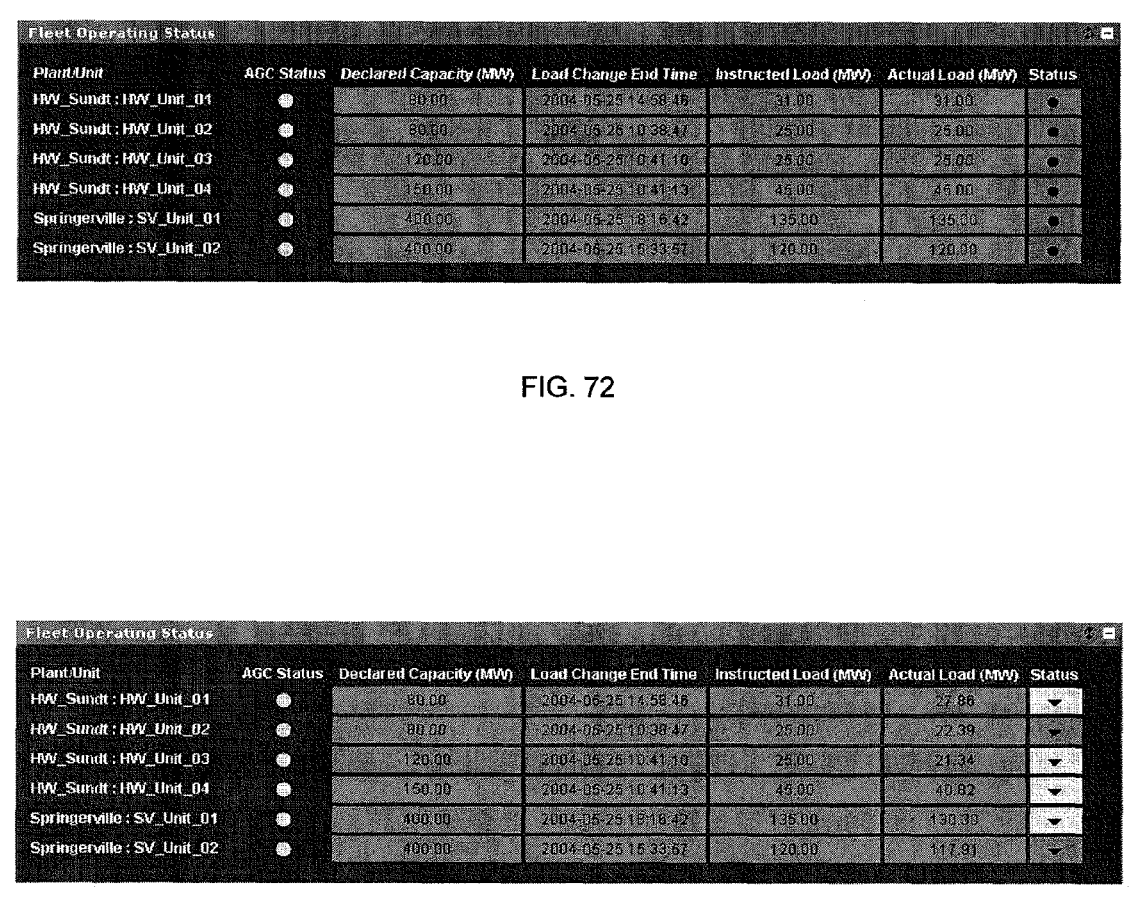

The graphic of FIG. 73 shows the some units operating inside the revenue boundaries (blue cells) and some operating in deviation (yellow cells). All units are operating below the instructed load (downward pointing triangles).

Figure 74:
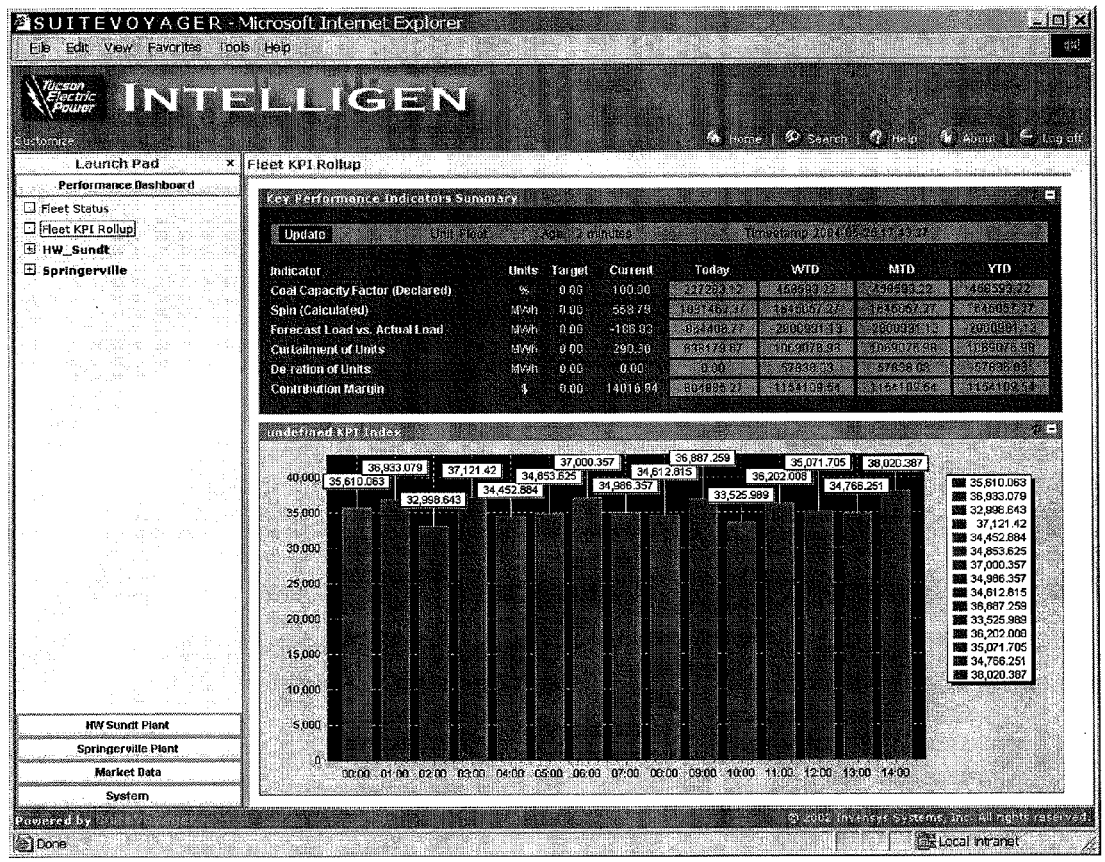

Opening the Fleet KPI Rollup displays the same KPI data the is shown in the Fleet Status view, but the Operating Status webpart is replaced by the chart (FIG. 74). The content of the chart is dictated by the user clicking in the KPI cell that corresponds to the time period and KPI that the user wants to view. The vertical bars of the chart represent the KPI value for the discrete time periods (hours, days, etc.).

Figure 75:
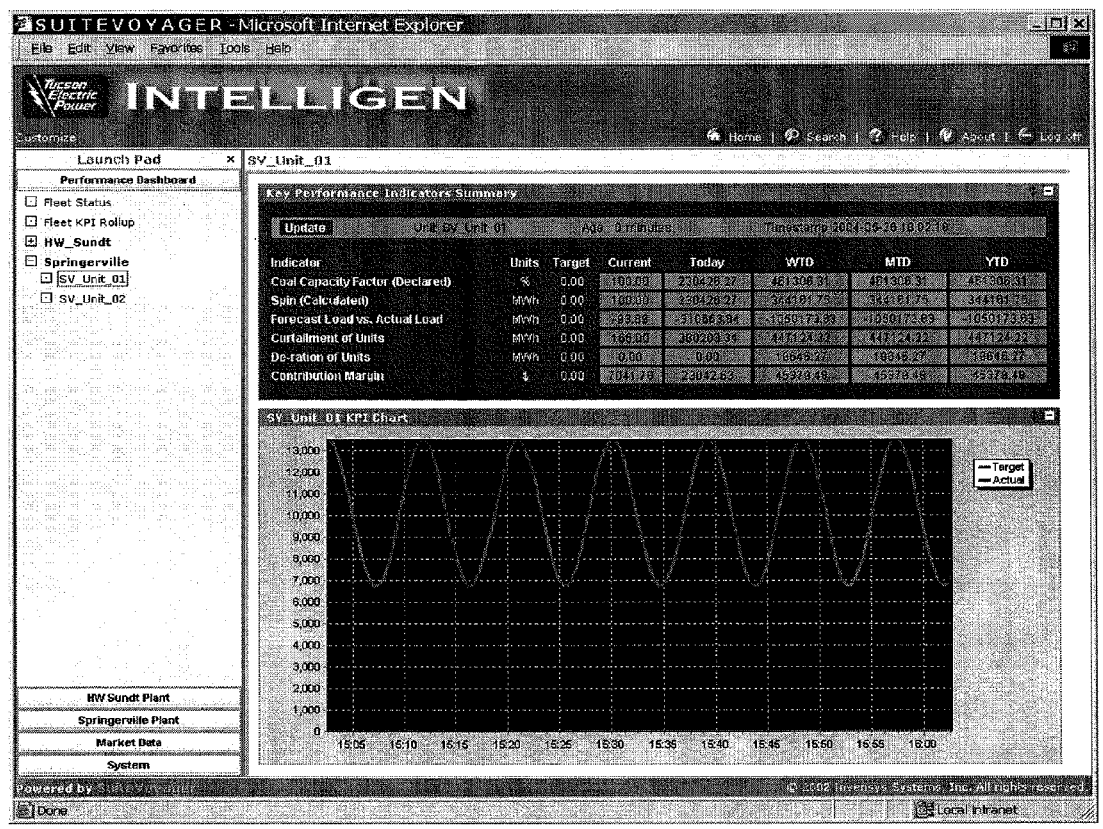

The view of FIG. 75 shows the current value plot for Contribution Margin for one unit. Current values use a line chart instead of a bar chart because this view shows real time data, not a period accumulation. As with the Fleet views, the data only updates when the user clicks the update button. The chart can be moved up and down and left and right by right-clicking-and-dragging on the chart. Zooming is accomplished by left-clicking-and-dragging from upper left to lower right around the area that is to be expanded. To zoom back out, left-click-and-drag from lower right to upper left.

Functionality and Interfaces of the Integrated Load Monitoring Application

This section provides a detailed description of exemplary functional requirements and graphical user interfaces of the Integrated Load Monitoring (ILM) Application 453 (FIG. 4A). In particular, this section describes the functional requirements for the ILM graphical interfaces, as well as the interfaces to other software components in the Intelligen System.

Overview

The SuiteVoyager component provides the primary interface by which operators and dispatchers can create, amend and cancel instructions and declarations, and monitor the performance of a generating unit against the declarations and instructions that have been issued.

There are two primary functions supported in the SuiteVoyager application:

The Electronic Dispatch and Logging (EDL) function provides the real-time capability to electronically transmit and capture instructions sent to generating unit operators, and to electronically transmit and capture generating unit declaration changes (unit capacity) sent to the system dispatchers.

The Integrated Load Monitoring (ILM) function will monitor and graphically display the real-time performance of a unit versus the last operating instructions sent to the unit. Real-time performance will be displayed on the chart, and deviations and transgressions will highlighted on the graph. In addition to the performance graph, the ILM will also display an instruction summary, real-time performance summary, declaration summary and transgression summary that includes the costs of the transgression and deviation.

Graphical User Interface

Main Configuration <config.asp>

Figure 76:
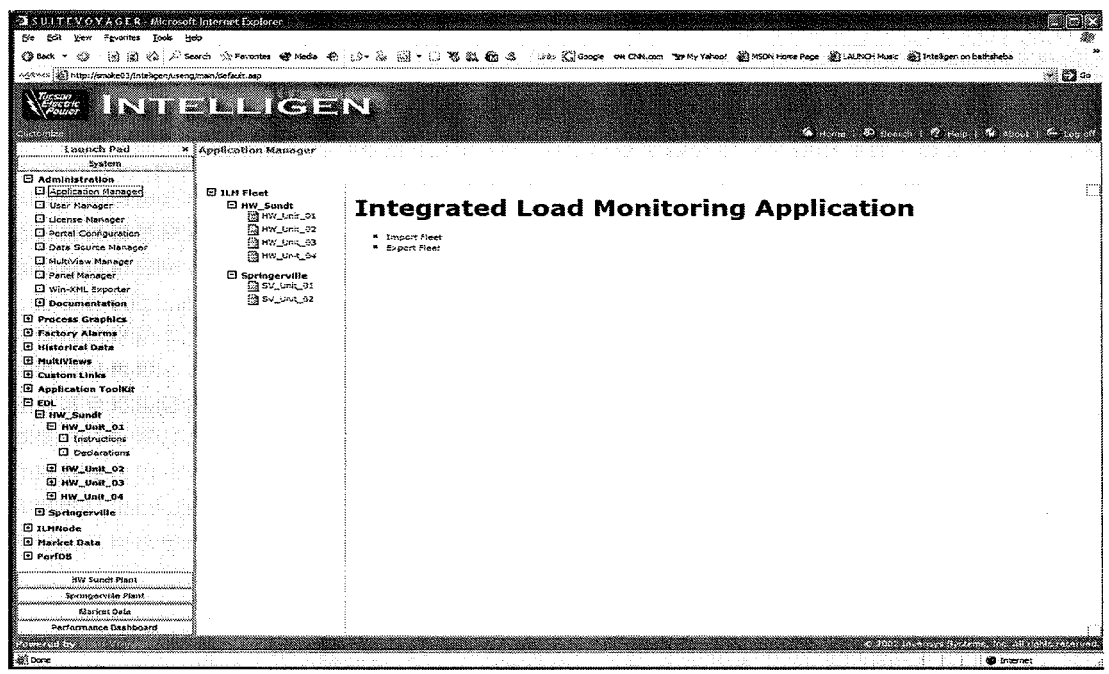

FIG. 76 is a screen shot of an exemplary main configuration page of the ILM Application.

Plant Configuration Page <editPlant.asp>

Figure 77:
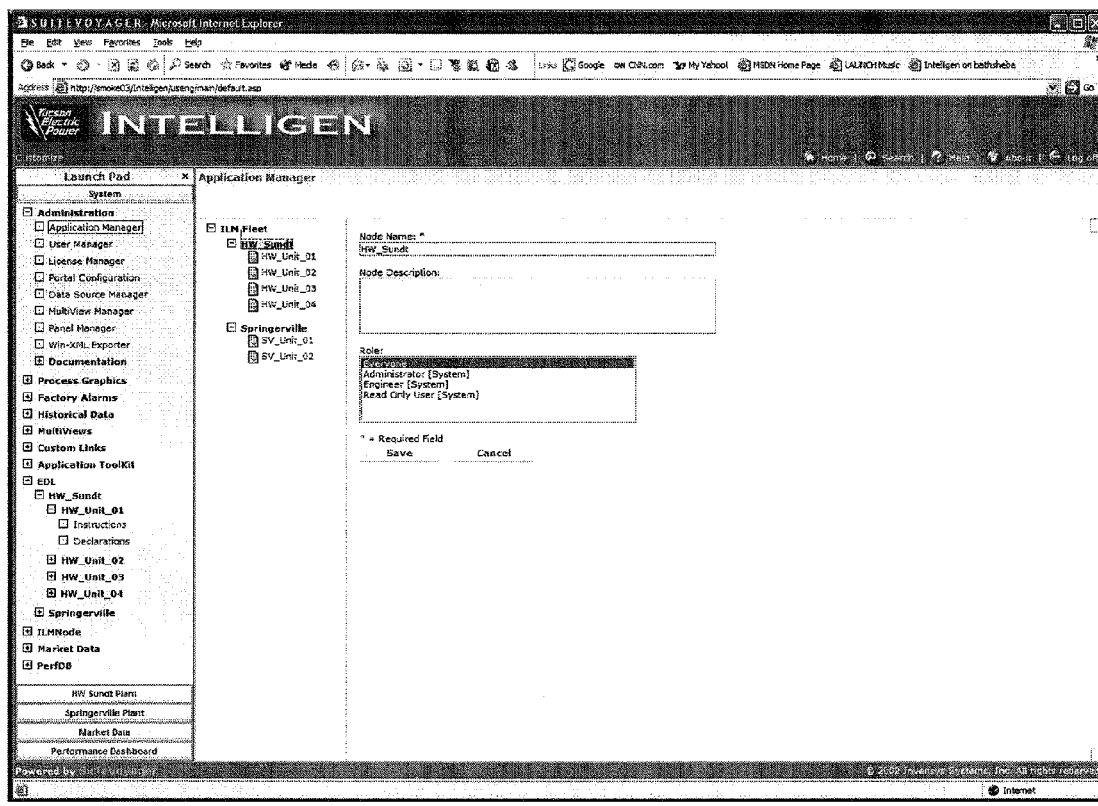

FIG. 77 Illustrates a manner in which the Plant name, description, and security settings may be configured via a Plant Configuration Page. The Plant acts as a folder or directory that contains the Unit pages.

Unit Configuration Page <editUnit.asp>

Figure 78:
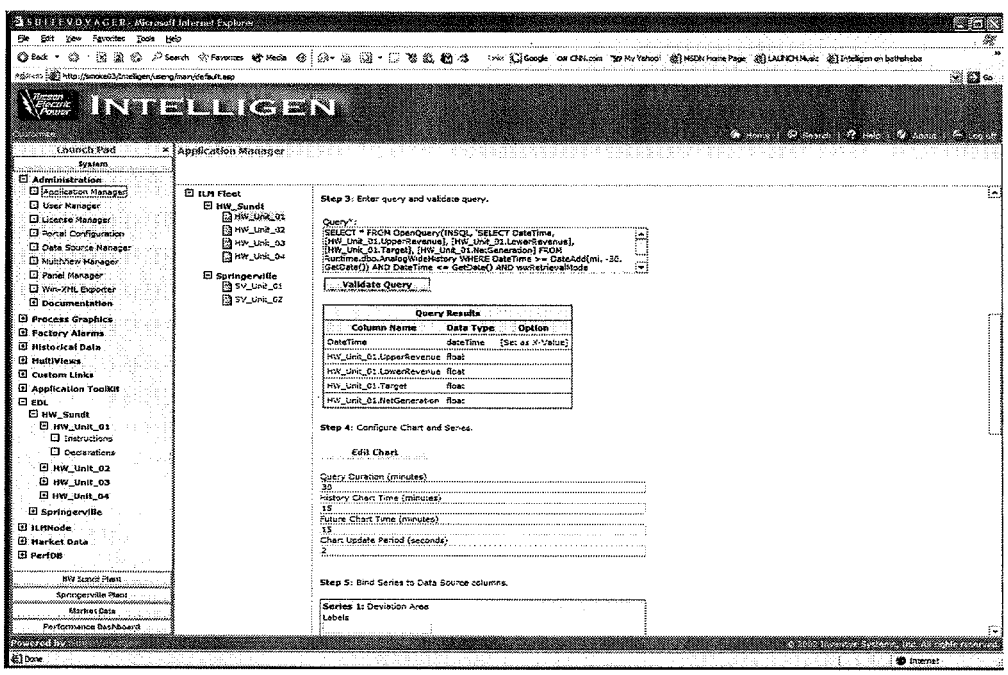

FIG. 78 shows a page through which the Unit name, description, SQL query, and chart configuration settings may be configured.

Web Parts

Figure 79:
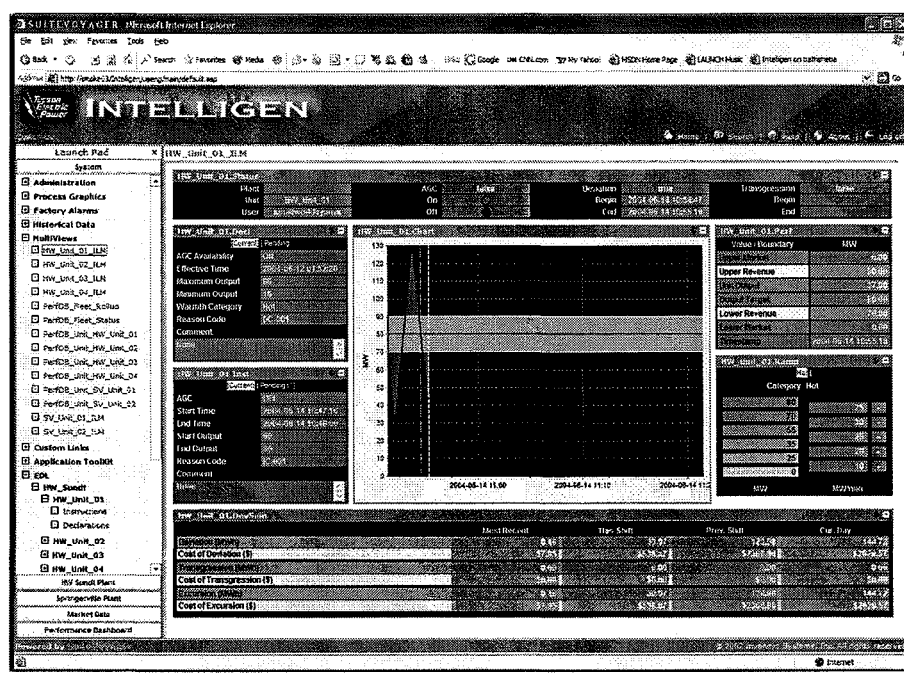

There are eight web parts that make up the ILM dashboard (FIG. 79) including seven graphical parts and one hidden communications web part. The dashboard is configured using the standard SuiteVoyager MultiView Manager mechanism in the Administration section.

Communications Web Part

The communications web part handles the window timer and data interface for the web parts on the dashboard or MultiView. When the web part receives data from the server, the web part raises a common event that all of the ILM web parts register to receive. Each web part can process the data independently and handle events asynchronously. There is no graphical component for this web part and it is marked as hidden in the dashboard.

Chart Web Part

Figure 80:
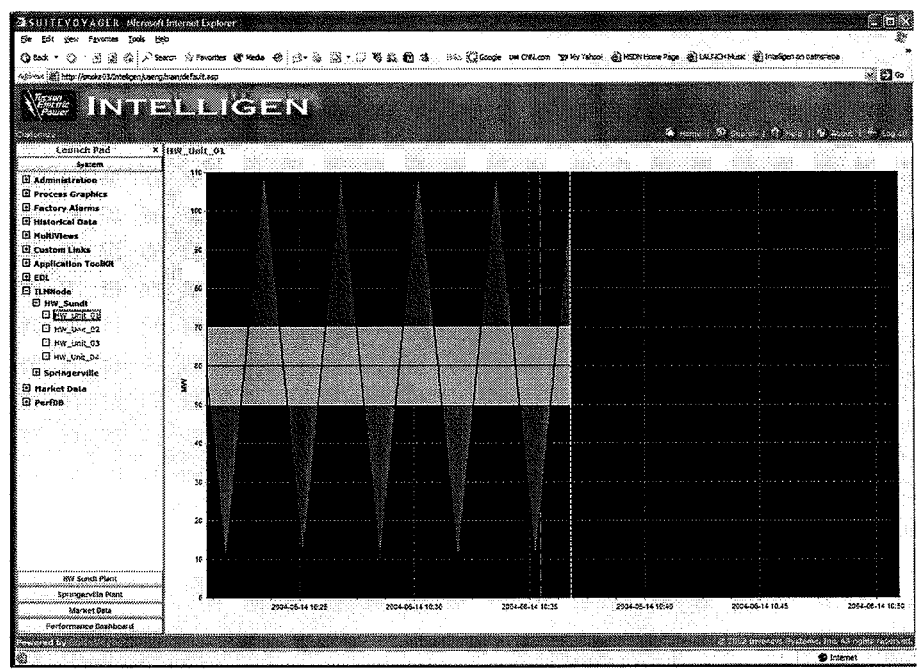

The display page (FIG. 80) can either be hosted as a web part on a MultiView or dashboard, or it can be displayed as an independent page. The TChart ActiveX control is the primary component of the web part and Declaration Web Part The declaration web part shows the current declaration and allows the user to browse the pending declarations as well.

Deviation Summary Web Part

The deviation summary web part shows the magnitude and cost of deviations and transgressions for recent time periods.

Instruction Web Part

The instruction web part shows the current instruction and allows the user to browse the pending instructions as well.

Ramp Rates Web Part

The ramp rates web part shows the configured ramp rates for the available warmth categories for a particular unit. If there are more than one warmth categories, it also allows the user to view the configured ramp rates for each warmth category. The web part has an indication to which warmth category is active and is able to update when the active warmth category changes.

Real-Time Performance Web Part

The real-time performance web part shows the instantaneous values for the market and revenue boundaries as well as the target and net generation values for a particular unit. The web part also includes the data timestamp from the LMX server as reference information.

Unit Status Web Part

The unit status web part displays information about the selected unit and plant and current user information. The web part also includes information about the unit's AGC status, deviation status, and transgression status.

Architecture and Application Interfaces of Orchestration Component

This section provides a detailed description of an exemplary architecture and application interfaces of the orchestration component 352 (FIG. 3)

Design Overview

The Biztalk Orchestration acts as a centerpiece coordinator and brokers the interactions between the following other components:

The SuiteVoyager EDL application

The DataStore for persistency of the transactions

RTC (RealTime Communication Server) for communications between the actors (operator and dispatcher) via Biztalk LMX .NET Remoting component to update Archestra on latest accepted instructions/declarations or their cancellation.

Architecture

Component Diagram

Figure 81:
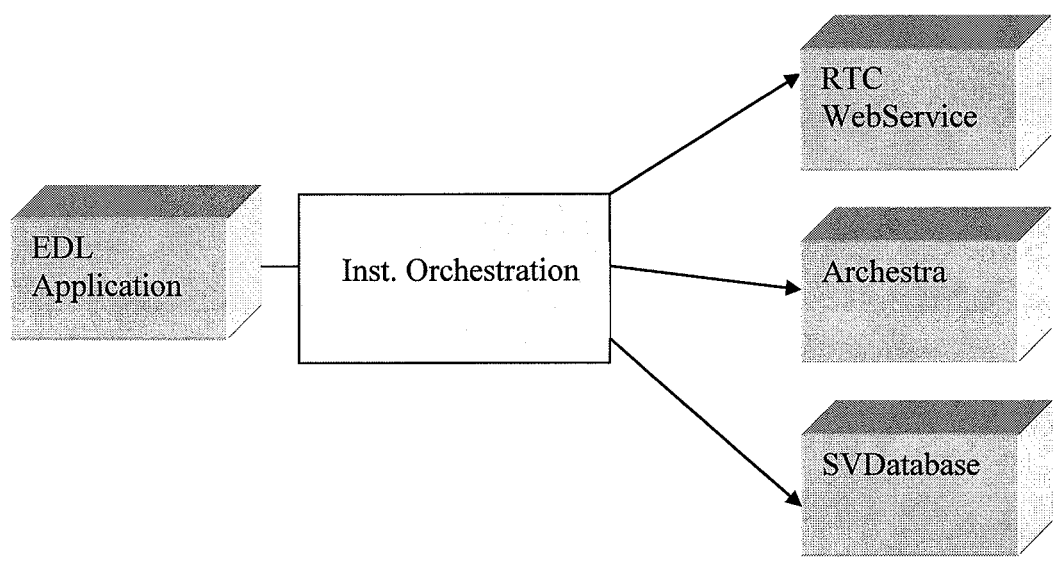

Broadly, Biztalk Orchestration is divided into two components for handling the instruction and declaration business processes, respectively. The major external components that each Orchestration interacts with are shown in FIG. 81.

Component Details

The following are the files which constitute in exemplary implementation of the BizTalk Orchestration component.

Orchestration Related

The following files are related to Orchestration:

InstructionOrchestration.odx—This covers the instructions business process.

DeclarationOrchestration.odx—This covers the declaration business process.

TOrchestrationHelper.dll—This is an helper .NET Assembly which does small intermediate tasks require by Orchestration which is not easy to do in the expression editor or message and manipulation tasks before calling the external components like RTCWebService.

EDLOrchestrationPort which is a SOAP request response port with early bindings set to/TOrchestration_Proxy/TOrchestration_Declaration_EDL-DeclarationPort.asmx External Exposed Application Interfaces Declaration Interface Given below is the explanation for the interfaces exposed for Declaration create and cancel action. Also the Instruction interfaces would be on same lines.

The Declaration object has the following members which can be accessed directly by Objectname.membername.

Declaration Interface Members

```
<s:complexType name="Declaration">
  <s:sequence>
    <s:element minOccurs="1" maxOccurs="1" form="unqualified" name="DeclId" type="s:int" />
    <s:element minOccurs="0" maxOccurs="1" form="unqualified" name="UserId" type="s:string" />
    <s:element minOccurs="1" maxOccurs="1" form="unqualified" name="EffectiveDateTime" type="s:dateTime" />
    <s:element minOccurs="1" maxOccurs="1" form="unqualified" name="MaximumLoad" type="s:float" />
    <s:element minOccurs="1" maxOccurs="1" form="unqualified" name="MinimumStableGen" type="s:float" />
    <s:element minOccurs="0" maxOccurs="1" form="unqualified" name="WarmthCategory" type="s:string" />
    <s:element minOccurs="0" maxOccurs="1" form="unqualified" name="ReasonCode" type="s:string" />
    <s:element minOccurs="1" maxOccurs="1" form="unqualified" name="CreateTime" type="s:dateTime" />
    <s:element minOccurs="0" maxOccurs="1" form="unqualified" name="Status" type="s:string" />
    <s:element minOccurs="0" maxOccurs="1" form="unqualified" name="ClientInfo" type="s:string" />
    <s:element minOccurs="0" maxOccurs="1" form="unqualified" name="OperatorRoleUsers" type="s:string" />
    <s:element minOccurs="0" maxOccurs="1" form="unqualified" name="DispatcherRoleUsers" type="s:string" />
    <s:element minOccurs="1" maxOccurs="1" form="unqualified" name="UnitId" type="s:int"/>
    <s:element minOccurs="0" maxOccurs="1" form="unqualified" name="AGCAvailabilty" type="s:string" />
    <s:element minOccurs="0" maxOccurs="1" form="unqualified" name="Comments" type="s:string" />
    <s:element minOccurs="1" maxOccurs="1" form="unqualified" name="AmendFromId" type="s:int" />
  </s:sequence>
</S:complexType>
```

Accessing Declaration Interface Members Example

An Example is Give Below on how to Use this Object and Set its Members.

```
localhost.Declaration dec=new localhost.Declaration( )
dec.AGCAvailabilty="ON";
dec.ClientInfo=clientinfo;
dec.Comments="Hello";
dec.CreateTime=System.DateTime.Now;
dec.DeclId=newid;
dec. DispatcherRoleUsers=dispatchers;
dec. EffectiveDateTime=System.DateTime.Now;
dec.MaximumLoad=99;
dec.MinimumStableGen=75;
dec.OperatorRoleUsers=operators;
dec.ReasonCode="001";
dec.Status="UnAcknowledged";
dec.UnitId=1;
dec.UserId="Prasad Kini";
dec.WarmthCategory="Cold";
dec.AmendFromId=8;
```

Declaration Interface Methods.

Create/Amend Action

Below are the various interfaces for the Create/Amend Action. The only difference between amend and create is the value of the attribute within the Declaration object AmendFromId if filled would indicate that it is an amend action.

1) Create

DeclarationResponse TOrchestration_Declaration_EDL-DeclarationPort.InsertDeclaration (Declaration);

2) Acknowledge

DeclarationResponse TOrchestration_Declaration_EDL-DeclarationPortAcknowledgeDeclaration (Declaration);

3) Accept/Reject.

DeclarationResponse TOrchestration_Declaration_EDL-DeclarationPortAcceptRejectDeclaration (Declaration);

4) ForcedAccept

DeclarationResponse TOrchestration_Declaration_EDL-DeclarationPortForcedAcceptDeclaration (Declaration);

Cancel Action

Below are the various interfaces for the Cancel Action

1) Create

DeclarationResponse TOrchestration_Declaration_EDL-DeclarationPort.CancelDeclaration (Declaration);

2) Acknowledge
DeclarationResponse TOrchestration_Declaration_EDL-DeclarationPortAcknowledgeCancelDeclaration (Declaration);
3) Accept/Reject.
DeclarationResponseTOrchestration_Declaration_EDLDeclarationPort AcceptRejectCancelDeclaration (Declaration);
4) ForcedAccept
DeclarationResponseTOrchestration_Declaration_EDLDeclarationPort ForcedAcceptCancelDeclaration (Declaration);

DeclarationResponse Methods

All methods explained above do return a declaration response object which is basically consists of declaration object along with DeclarationResponseErrorstructure appended.

```
<s:complexType name="DeclarationResponseErrorStructure">
  <s:sequence>
    <s:element minOccurs="0" maxOccurs="1" default="""
      form="ungualified" name="ErrorType" type="s:string"/>
    <s:element minOccurs="0" maxOccurs="1" default="""
      form="ungualified" name="ErrorDesc" type="s:string"/>
  </s:sequence>
</s:complexType>
```

Complete Example

The following provides a complete example illustrating use of the actions described above:

```
private void CreateDeclaration_Click(object sender, System.EventArgs e)
{
textBox1.Clear( )
textBox2.Clear( )
string s=textBox3.Text.Trim( )
if(s.Equals(" "))
    newid=0;
else
    newid=Int32.Parse(s);
    comments=textBox4.Text;
    OrchDeclUrl=textBox5.Text.Trim( )
try
{
    localhost.Declaration2 dec=new localhost.Declaration2( )
    dec.AGCAvailabilty="ON";
    dec.ClientInfo=clientinfo;
    dec.Comments="Hello";
    dec.CreateTime=System.DateTime.Now;
    dec.DeclId=newid;
    dec. DispatcherRoleUsers=dispatchers;
    dec. EffectiveDateTime=System.DateTime.Now;
    dec.MaximumLoad=99;
    dec.MinimumStableGen=75;
    dec.OperatorRoleUsers=operators;
    dec.ReasonCode="001";
    dec.Status="UnAcknowledged";
    dec.UnitId=1;
    dec.UserId="Prasad Kini";
    dec.WarmthCategory="Cold";
    dec.AmendFromId=Int32.Parse(textBox8.Text.Trim( ));
    localhost.TOrchestration_Declaration_EDLDeclarationPort svc=new localhost.TOrchestration_Declaration_EDLDeclarationPort( );
    localhost.DeclarationResponse res;
    localhost.DeclarationResponseErrorStructure err;
    //svc.Url="http://localhost/TOrchestration_Proxy/TOrchestration_Declaration_EDL-DeclarationPort.asmx";
    svc.Url=OrchDeclUrl;
    res=svc.InsertDeclaration(dec);
    err=res.ErrorStructure;
    newid=res.DeclId;
    textBox3.Text=newid.ToString( )
    switch(err.ErrorType)
    {
      case(" "):
        textBox1.Text="Create Initiate is Successful.New declaration id is."+newid;
        break;
      case("warning"):
        textBox1.Text="Create Initiate is Successful with warnings.Kindly contact system adminstrator to fix this. New declaration id is . . . "+newid;
        textBox2.Text="ErrorType is warning."+"Error Description is"+err.ErrorDesc;
        break;
      case("fatal"):
        textBox1.Text="Create Initiate has failed with fatal exceptions.Kindly contact system adminstrator ASAP to fix this. New declaration id is."+newid;
        textBox2.Text="ErrorType is warning."+"Error Description is"+err.ErrorDesc;
        break;
      default:
        textBox1.Text="Create Initiate has failed with fatal exceptions.Kindly contact system adminstrator ASAP to fix this. New declaration id is."+newid;
        textBox2.Text="ErrorType is warning."+"Error Description is"+err.ErrorDesc;
        break;
    }
    Console.WriteLine("Response declaration id is . . . "+res.DeclId);
    Console.WriteLine("Response error desc is"+err.ErrorDesc);
    Console.WriteLine("Response error type is"+err.ErrorType);
}
catch (Exception ex)
{
    textBox7.Text=(ex.Message);
}
}
```

Detailed Workflow Implementation

Figure 82:
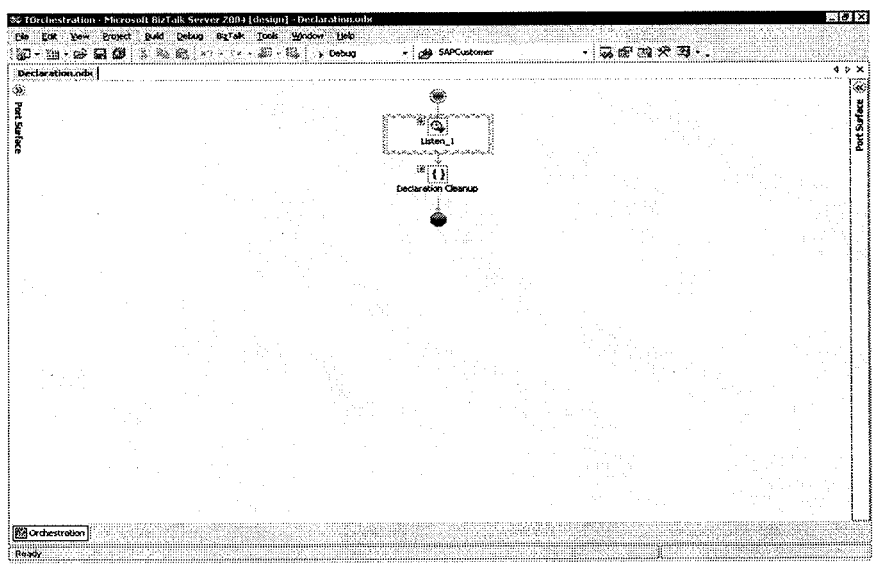

FIG. 82 shows a complete Workflow/Orchestrations for the Declaration Business Process. A similar workflow applies to instructions, with exception that the cancel scenario is not utilized. For the purposes of clarity, the entire workflow is explained initially with respect to an overall Orchestration, with each Applicable "scope" then being explained in detail. A scope is a logical grouping of certain actions and helps to modularize and give a clean look to the Orchestration to decipher.

Figure 83:
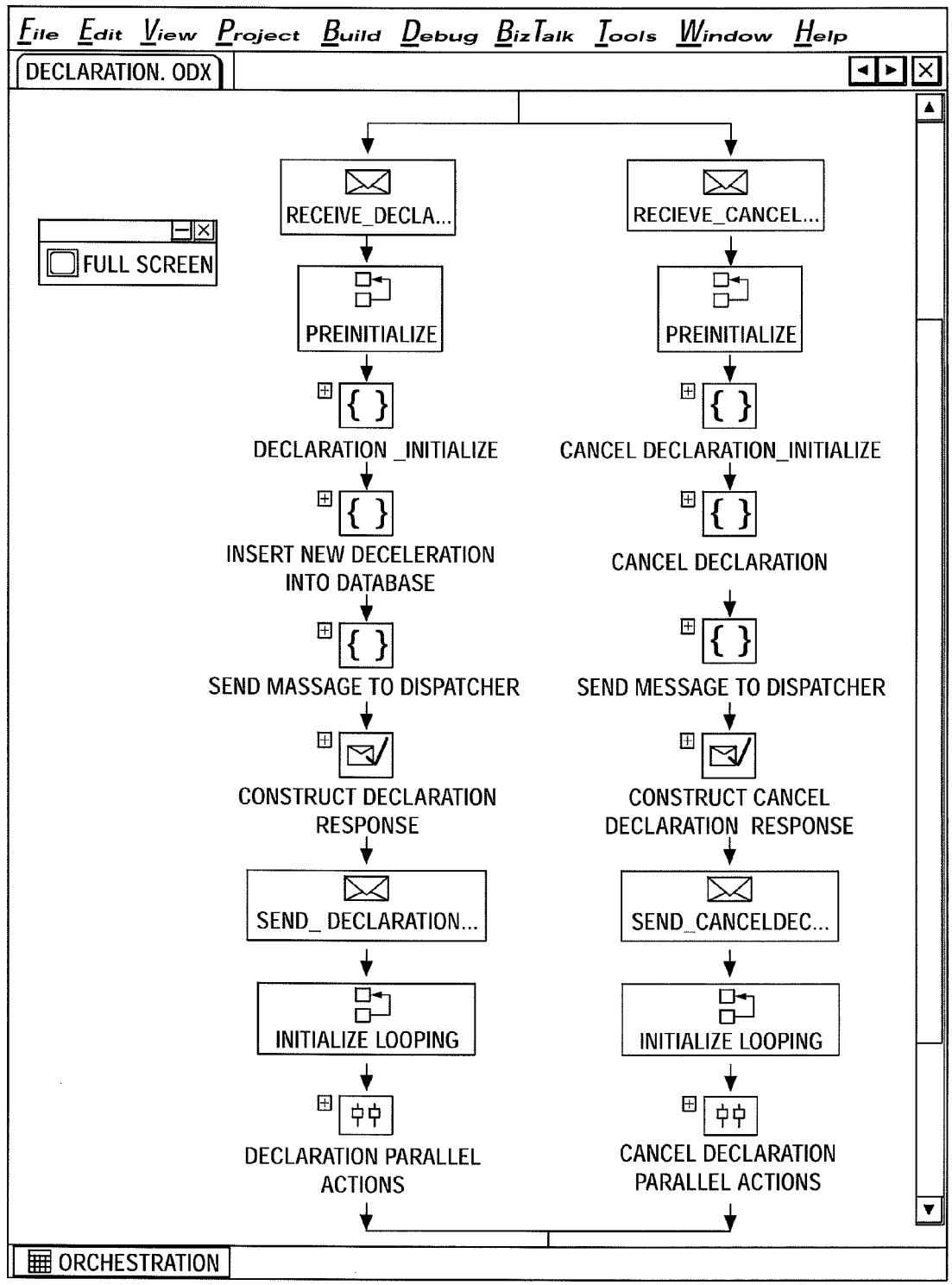

As shown in FIG. 83, the Orchestration gets split into two parts, each with an "Activate=True" receive functions. This is because there are logically two sub business processes within Instructions. Below is an explanation of the first sub process, called as CreateInstructions (which also includes acknowledge and accept reject of the same).

The one on the left waits for a new create declaration message.

As soon as a new message comes in the activate receive creates a new orchestration instance and execute the left path as shown below.

In the Declaration Initialize scope the connection variables required for SV database access are read form the TucsonConfig.xml file using the TucsonParameter.dll. After this a lot of variables are read from the SV database. Also a RTC logon is done after reading the requisite parameters to connect to RTC server from the SV database.

In the InsertNewDeclaration Scope the new declaration is created with a status called as "nonacknowledged" using the TucsonDataStore . . . Insert ( . . . ) interface.

In the SendMessageToDispatcher the dispatcher is contacted using RTC that a new declaration needs to be acknowledged. This logic is implemented in the RTCWSWrapper (to be renamed as TucsonOrchestartionHelper.dll) which extracts the dispatcher to be contacted from the DispatcherRoleUsers and tries to contact the first person who is online by calling the RTCWebService and returns back the NT domain names of this user (not the sipuri).

The ConstructDeclarationResponse prepares the message to be sent back to the dispatcher with the id of the declaration filled which was autogenerated during the insert.

Figure 84:
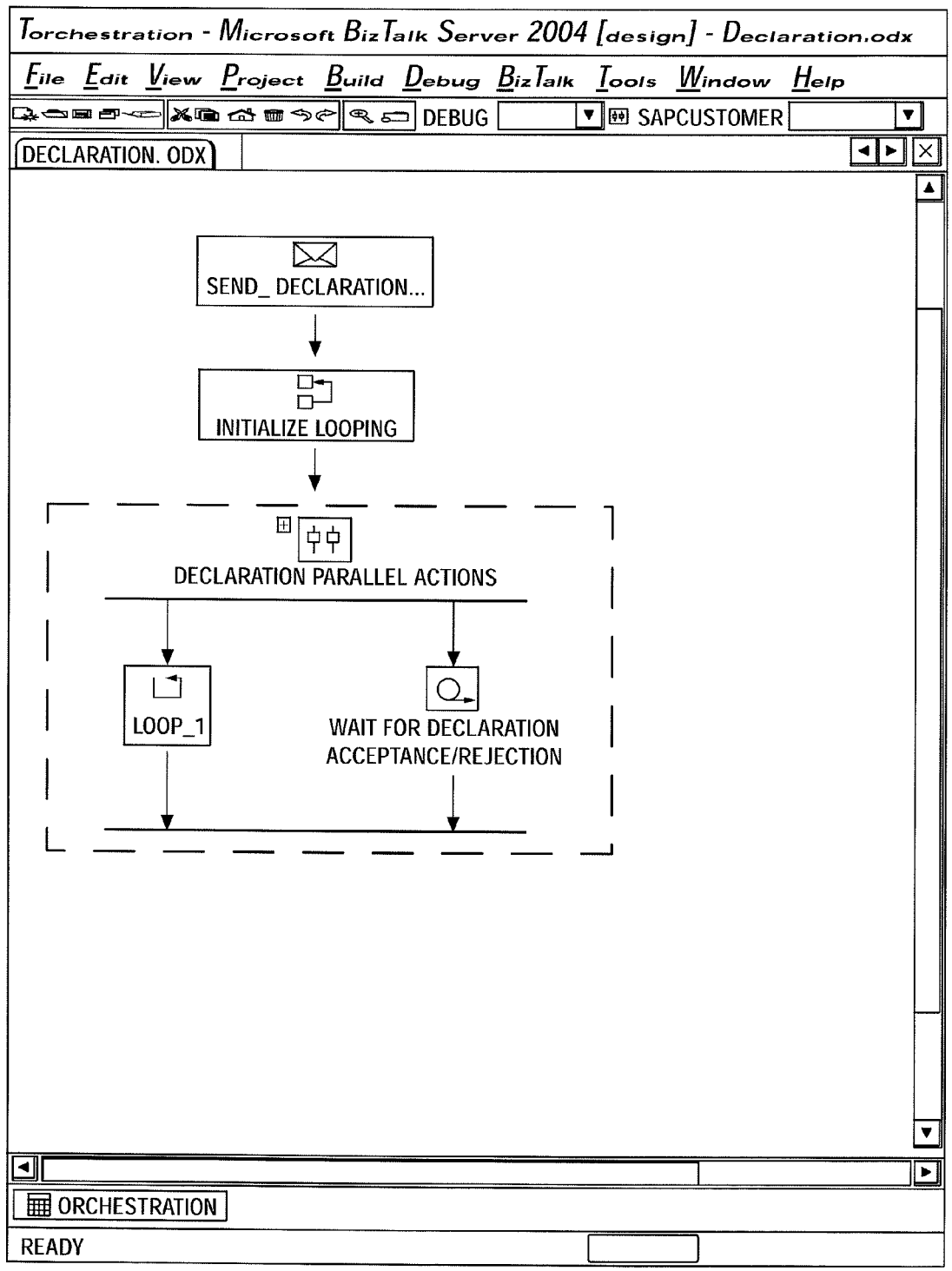

As shown in FIG. 84, the scope DeclarationParallelActions has two parallel branch actions 1) Listening for Acknowledge Declaration Message or Accept Reject Message each with it's own timer duration as per the configuration set in the SV database. (Timeout for Acceptance, timeout for Acknowledgement). Both of these branches are executed before the process terminates.

Figure 85:
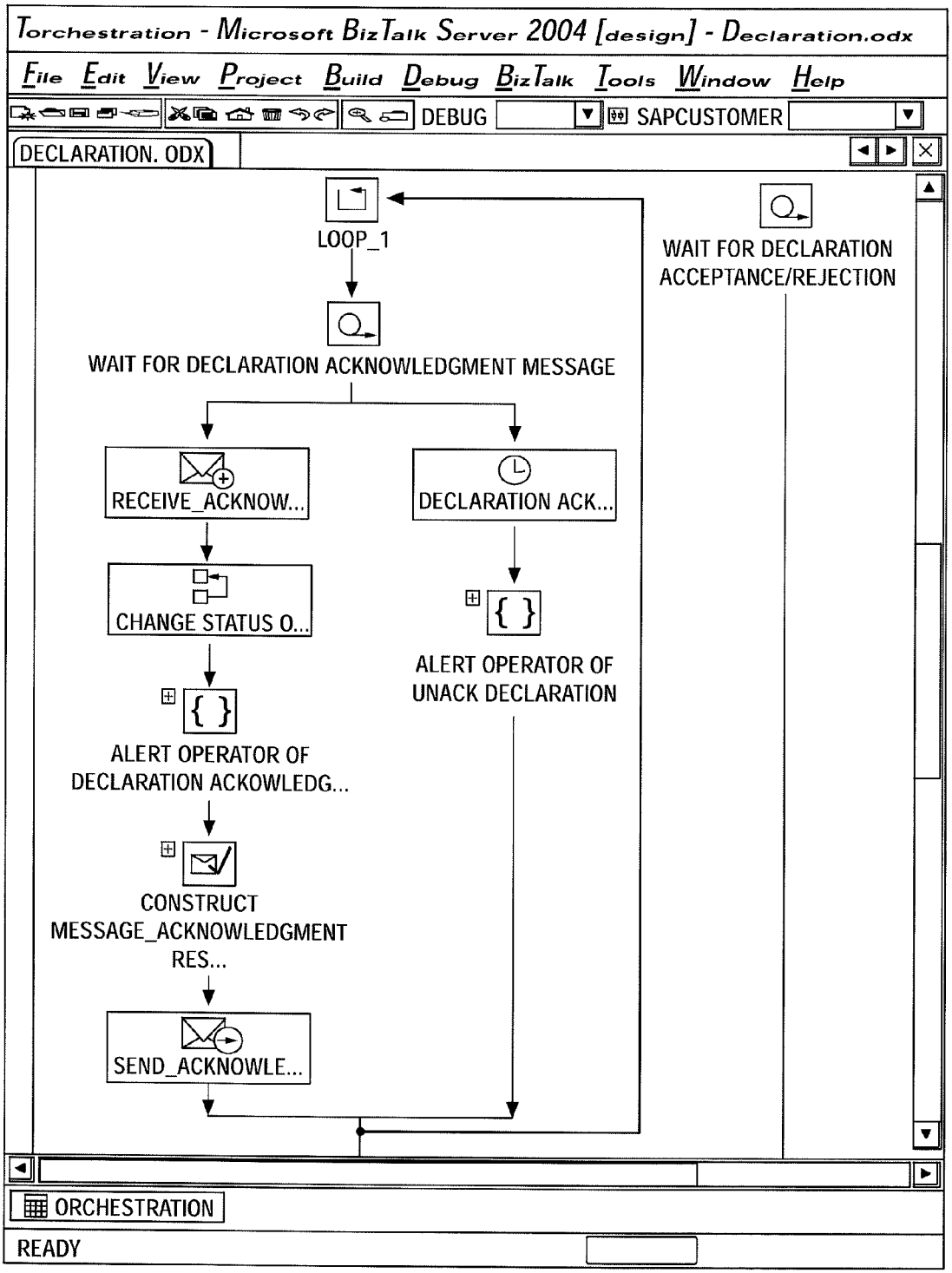

The first branch called a Loop_1 (to be renamed as WaitDeclarationAcknowledgeLoop) as shown in FIG. 85:

Has a Acknowledge (To be renamed) loop which keeps on looping until an acknowledge message is received (flag is set internally as an Orchestration variable when this happens) or until the timeout becomes equal to the maximum limit for waiting for Acknowledgement viz Accept/reject timeoeut. The implementation below the looping is the a listen shape called as WaitforDelcartartionAcknwoledfgeMessage with a parallel branch. One branch waits for a acknowledgement receive and other starts the timer for the acknowledgement using a delay shape As soon as the acknowledgement timeout happens and there's no acknowledgement message received the system send via RTC a message to the instructor to that acknowledgement is not yet received. This will happen until the looping ends.

In case acknowledgement happens the system goes and sends via RTC the operator that his declaration was acknowledgment and updates the status in database to acknowledge.

Also a response message is created and send back to the instructor who acknowledged the same indicating that the process was successful.

The system then comes out of the first branch execution.

Figure 86:
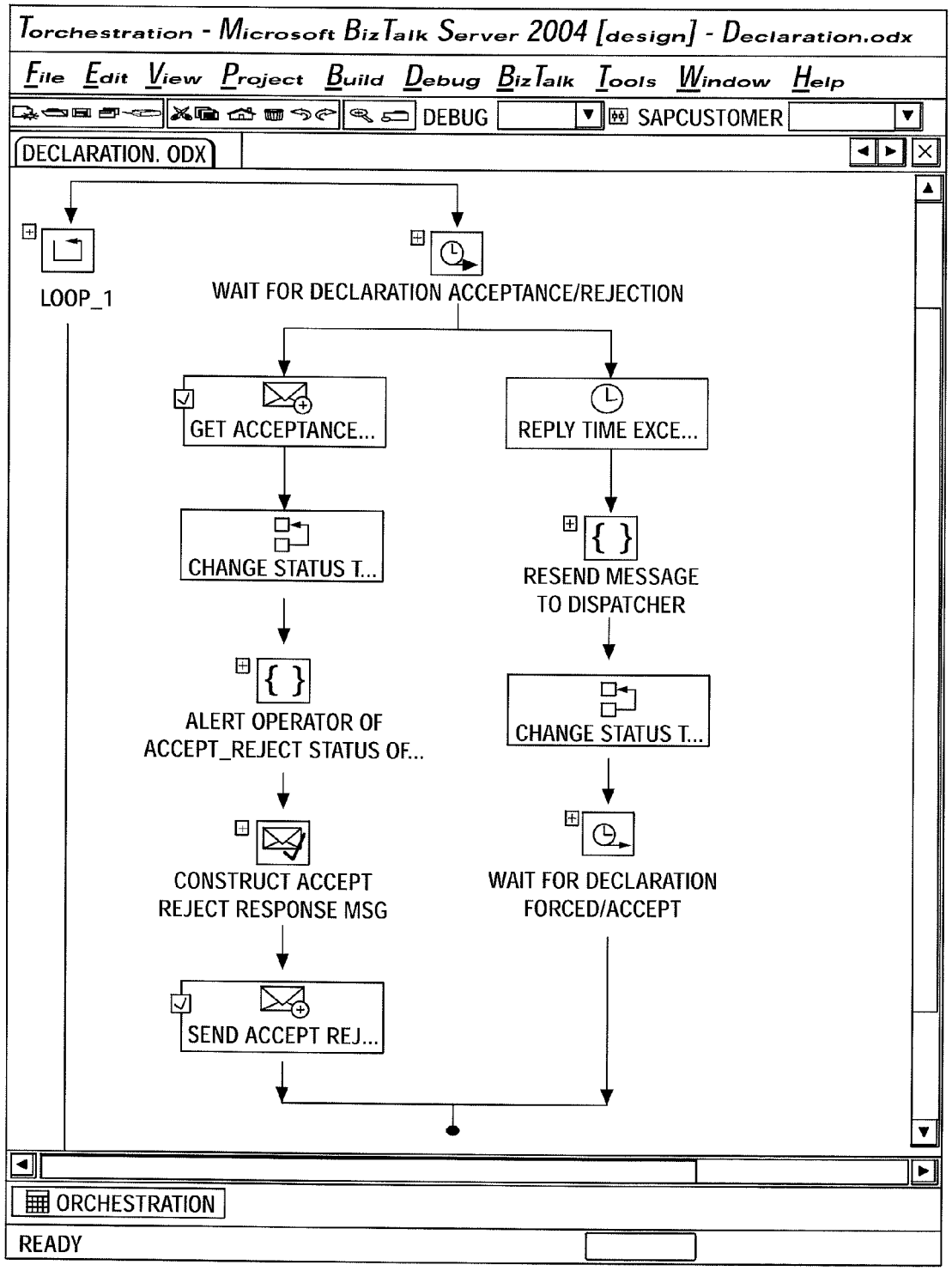

The second branch shown in FIG. 86 called as WaitDeclarationAcceptance/Rejection has 2 parallel branch both of which needs to be executed:

The left branch waits for an accept/reject message. As soon as it does it updates the database to reflect this status and also sends a message via RTC to the operator that his declaration was accepted. Also it creates a new message to indicate back to the instructor that his acceptance/rejection was successfully executed by the system The other branch is basically a delay shape which waits for the Accept/Reject Timeout. As soon as this is met it send a message via RTC to the instructor that the timeout for accept reject has exceeded and it goes and updates the status to "AcceptRejectTimeout" and then goes into a listening mode called as WaitforDeclarationForcedAccept wherein the system forces the operator himself if now to take action on the declaration.

Figure 87:
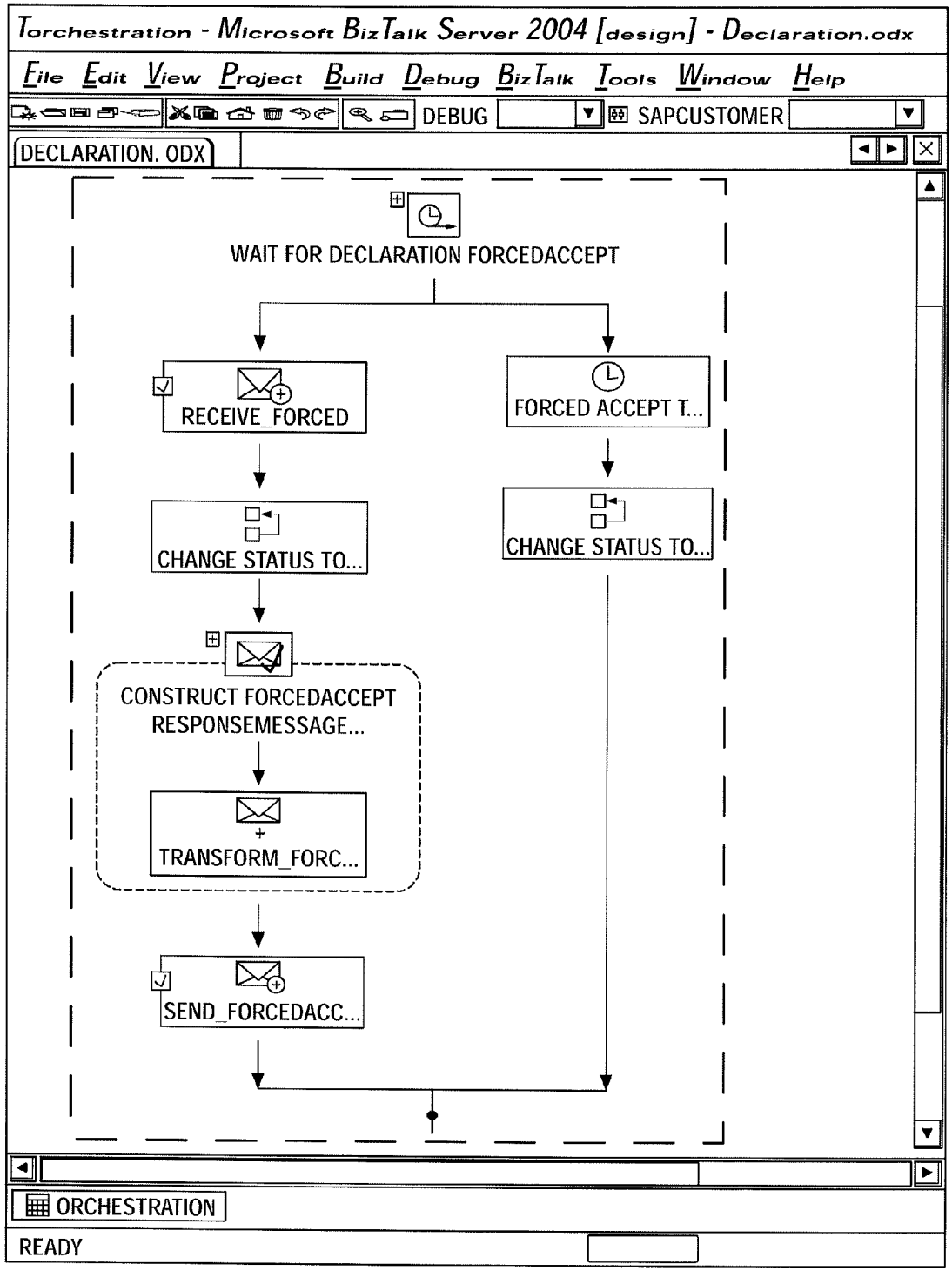

As shown in FIG. 87, the WaitforDeclarationForcedAccept has 2 branches itself. The left branch waits for the user to send a forced accept message. Once it gets this it updates the database to "forced accept" and accordingly updates the instructor about the same.

The right branch waits for the timeout for ForcedAccept. Once this is true the system goes and change the status to "cancelled".

The system then comes out of the second branch execution.

When both branches of DecarationParallelActions gets executed the system terminates gracefully and does an RTC logoff.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A method for collaborative management of a process, comprising:

accessing a portal server coupled to one or more external data sources and configured using a configuration database, said configuration database including linking information to the external data sources;

providing a data access subsystem at the portal server for retrieving and sending data in substantially real-time between a browser client at the portal server and the external data sources of the information, wherein the portal server delivers information defined using one or more data handlers through the portal server to the browser client;

electronically creating at least one declaration representative of the data collected at the external sources, said declaration containing information relating to one or more characteristics of an equipment unit involved in effecting the process;

electronically creating, at least partially based upon the information contained within the declaration, at least one instruction defining the operating requirements of the equipment unit;

electronically capturing, by an electronic dispatch and logging communications application, at least one of the declaration and the instruction between a first operation having capacity information and a second operation having load demands; and challenging, at the portal, a user updated declaration before communicating to a dispatcher and, in response to the portal challenge being accepted by the user, recording, at the portal, all parameters in the declaration and the date/time at which the updated declaration was sent and setting a declaration status to "not acknowledge" for the dispatcher to acknowledge within a defined time out period.

2. The method of claim 1, further comprising timing out access to the declaration by a dispatcher and messaging a unit operator that the instruction is available for a different equipment unit.

3. The method of claim 2, further comprising logging the declaration for acceptance or rejection by the dispatcher.

4. The method of claim 1, further comprising validating the declaration against an accepted declaration portal supplied range of valid inputs.

5. The method of claim 4, wherein the range comprises at least one of a maximum load, a minimum stable generation, and a warmth category.

6. The method of claim 1, alerting a dispatcher of the declaration and allowing the dispatcher to acknowledge said alert of the declaration, wherein said portal updates a status of the declaration to "acknowledged."

7. The method of claim 1, further comprising receiving the declaration at a first user.

8. The method of claim 7, wherein the first user is a plant operator.

9. The method of claim 8, wherein the plant operator needs power for equipment units.

10. The method of claim 1, further comprising receiving the instruction at a second user.

11. The method of claim 10, wherein the second user is a system dispatcher.

* * * * *